US012785912B2

(12) United States Patent
Keating et al.

(10) Patent No.: US 12,785,912 B2
(45) Date of Patent: Nov. 3, 2026

(54) PROCESSING TIME FOR FREQUENCY HOPPING

(71) Applicant: Ofinno, LLC, Reston, VA (US)

(72) Inventors: Ryan Keating, Chicago, IL (US); Ali Cagatay Cirik, Chantilly, VA (US); Esmael Hejazi Dinan, McLean, VA (US); Hua Zhou, Vienna, VA (US); Hyoungsuk Jeon, Centreville, VA (US); Mohammad Ghadir Khoshkholgh Dashtaki, Reston, VA (US); Gautham Prasad, Herndon, VA (US); Nazanin Rastegardoost, McLean, VA (US)

( * ) Notice: Subject to any disclaimer, the term of this patent is extended or adjusted under 35 U.S.C. 154(b) by 0 days.

(21) Appl. No.: 19/374,230

(22) Filed: Oct. 30, 2025

(65) Prior Publication Data

US 2026/0058784 A1 Feb. 26, 2026

Related U.S. Application Data

(63) Continuation of application No. PCT/US2024/041626, filed on Aug. 9, 2024.

(Continued)

(51) Int. Cl.

*H04W 4/00* (2018.01)
*H04B 1/7156* (2011.01)

(Continued)

(52) U.S. Cl.

CPC ......... *H04L 5/0094* (2013.01); *H04B 1/7156* (2013.01); *H04W 72/232* (2023.01)

(58) Field of Classification Search

CPC ... H04L 5/0094; H04W 72/232; H04B 1/7156
See application file for complete search history.

(56) References Cited

U.S. PATENT DOCUMENTS 10,820,353 B2 10/2020 Lin et al.
10,959,271 B2 3/2021 Yi et al.

(Continued)

FOREIGN PATENT DOCUMENTS

EP 4199622 A1 6/2023
WO 2024172444 A1 8/2024

OTHER PUBLICATIONS

3GPP TS 38.211 V17.5.0 (Jun. 2023); Technical Specification; 3rd Generation Partnership Project; Technical Specification Group Radio Access Network; NR; Physical channels and modulation; (Release 17).

(Continued)

*Primary Examiner* — Shantell L Heiber
(74) *Attorney, Agent, or Firm* — Patrick Moon; Kavon Nasabzadeh; Jacob L. Mangan

(57) ABSTRACT

A method can include transmitting, by a wireless device, a user equipment (UE) capability message indicating a switching time for a sounding reference signal (SRS) frequency hopping. The method can also include receiving one or more configuration parameters indicating an SRS resource for the SRS frequency hopping. The method can further include receiving, via a physical downlink control channel (PDCCH) monitoring occasion, a downlink control information (DCI) scheduling an uplink transmission. The method can additionally include transmitting the uplink transmission and dropping an SRS transmission, on one or more SRS symbols of the one or more SRS resources, based on a time interval being at least a preparation time for the uplink transmission plus a switching time. The time interval can be from a last symbol of the PDCCH monitoring occasion. The one or more SRS symbols can overlap with the uplink transmission.

20 Claims, 33 Drawing Sheets

Related U.S. Application Data

(60) Provisional application No. 63/531,656, filed on Aug. 9, 2023.

(51) Int. Cl.
*H04L 5/00* (2006.01)
*H04W 72/232* (2023.01)

(56) References Cited

U.S. PATENT DOCUMENTS

| | | | | |
|---|---|---|---|---|
| 11,018,822 | B2 | 5/2021 | Choi et al. | |
| 11,516,873 | B2 | 11/2022 | Kim et al. | |
| 11,664,845 | B2 | 5/2023 | Bhamri et al. | |
| 12,206,620 | B2 | 1/2025 | Pawar et al. | |
| 2016/0226639 | A1 | 8/2016 | Xiong et al. | |
| 2022/0022193 | A1 | 1/2022 | Zhang et al. | |
| 2022/0248430 | A1* | 8/2022 | Ly | H04L 1/08 |
| 2023/0170969 | A1* | 6/2023 | Kim | H04L 1/0057 375/267 |
| 2023/0208607 | A1 | 6/2023 | Lim et al. | |
| 2023/0246765 | A1* | 8/2023 | Rico Alvarino | H04L 5/0048 370/330 |
| 2025/0008500 | A1* | 1/2025 | Manolakos | H04W 72/0457 |

OTHER PUBLICATIONS

3GPP TS 38.213 V17.6.0 (Jun. 2023); Technical Specification; 3rd Generation Partnership Project; Technical Specification Group Radio Access Network; NR; Physical layer procedures for control; (Release 17).
3GPP TS 38.214 V17.6.0 (Jun. 2023); Technical Specification; 3rd Generation Partnership Project; Technical Specification Group Radio Access Network; NR; Physical layer procedures for data; (Release 17).
3GPP TS 38.331 V17.5.0 (Jun. 2023); Technical Specification; 3rd Generation Partnership Project; Technical Specification Group Radio Access Network; NR; Radio Resource Control (RRC) protocol specification; (Release 17).
3GPP TS 38.455 V17.5.0 (Jun. 2023); Technical Specification; 3rd Generation Partnership Project; Technical Specification Group Radio Access Network; NG-RAN; NR Positioning Protocol A (NRPPa); (Release 17).
R1-2304627; 3GPP TSG-RAN WG1 Meeting #113; Incheon, Korea, May 22-26, 2023; Agenda Item: 9.5.5; Source: Huawei, HiSilicon; Title: Remaining issues on positioning for RedCap UEs; Document for: Discussion and Decision.
R1-2304834; 3GPP TSG RAN WG1 #113; Incheon, Korea, May 22-May 26, 2023; Source: Intel Corporation; Title: On positioning for RedCap UEs; Agenda item: 9.5.5; Document for: Discussion and Decision.
R1-2305104; 3GPP TSG RAN WG1 #113; Incheon, Korea, May 22-May 26, 2023; Agenda item: 9.5.5; Source: CMCC; Title: Discussion on RedCap UE positioning; Document for: Discussion and Decision.
R1-2305180; 3GPP TSG RAN WG1 #113; Incheon, Korea, May 22-26, 2023; Source: Nokia, Nokia Shanghai Bell; Title: Views on Positioning for RedCap UEs; Agenda item: 9.5.5; Document for: Discussion and Decision.
R1-2305253; 3GPP TSG RAN WG1 #113; Incheon, Korea, May 22-May 26, 2023; Agenda Item: 9.5.5; Source: Apple Inc.; Title: On Positioning for Reduced Capability UEs; Document for: Discussion/Decision.
R1-2305347; 3GPP TSG RAN WG1 #113; Incheon, Korea, May 22-May 26, 2023; Agenda item: 9.5.5; Source: Qualcomm Incorporated; Title: Positioning for Reduced Capabilities UEs; Document for: Discussion and Decision.
R1-2305524; 3GPP TSG RAN WG1 #113; Incheon, Korea, May 22-May 26, 2023; Agenda item: 9.5.5; Source: Samsung; Title: Discussion on Positioning for RedCap UEs; Document for: Discussion and Decision.
R1-2305835; 3GPP TSG-RAN WG1 #113; Incheon, Korea, May 22-26, 2023; Agenda Item: 9.5.5; Source: Ericsson; Title: Positioning for RedCap UEs; Document for: Discussion, Decision.
R1-2305961; 3GPP TSG RAN WG1 #113; Incheon, Korea, May 22-May 26, 2023; Agenda item: 9.5.5; Source: Qualcomm Incorporated; Title: Positioning for Reduced Capabilities UEs; Document for: Discussion and Decision.
R1-2306115; 3GPP TSG-RAN WG1 #113; Incheon, Korea, May 22-26, 2023; Agenda Item: 9.5.5; Source: Ericsson; Title: Feature Lead summary #2 for Positioning for RedCap UEs; Document for: Discussion, Decision.
R1-2307205; 3GPP TSG RAN WG1 #114; Toulouse, France, Aug. 21-Aug. 25, 2023; Agenda item: 9.5.5; Source: CMCC; Title: Discussion on RedCap UE positioning; Document for: Discussion and Decision.
R1-2309077; 3GPP TSG RAN WG1 #114bis; Xiamen, China, Oct. 9-Oct. 13, 2023; Source: vivo; Title: Remaining issues on positioning for RedCap UEs; Agenda Item: 8.3.5; Document for: Discussion and Decision.
R1-2309674; 3GPP TSG RAN WG1 #114bis; Xiamen, China, Oct. 9-Oct. 13, 2023; Agenda item: 8.3.5; Source: CMCC; Title: Maintenance on RedCap UE positioning; Document for: Discussion and Decision.
3GPP TSG RAN WG1 #113; Incheon, Korea, May 22-May 26, 2023; Title: RAN1 Chair's Notes.
R1-2301985; 3GPP TSG-RAN WG1 Meeting #112; Athens, Greece, Feb. 27-Mar. 3, 2023; Agenda Item: 9.5.5; Source: Moderator (Ericsson); Title: Feature Lead Summary #2 for Positioning for RedCap UEs; Document for: Discussion, Decision.
R1-2302496; 3GPP TSG RAN WG1 #112bis-e; e-Meeting, Apr. 17-Apr. 26, 2023; Source: vivo; Title: Discussion on positioning for RedCap UEs; Agenda Item: 9.5.5; Document for: Discussion and Decision.
International Search Report and Written Opinion of the International Searching Authority mailed Feb. 11, 2025, in International Application No. PCT/US2024/041626.
R1-1911965; 3GPP TSG RAN WG1 #99; Reno, USA, Nov. 18-22, 2019; Source: ZTE; Title: PUSCH enhancements for NR URLLC; Agenda item: 7.2.6.3; Document for: Discussion and Decision.
R1-2106896; 3GPP TSG RAN WG1 #106-e; e-Meeting, Aug. 16-27, 2021; Agenda item: 8.6.1.3; Source: Samsung; Title: HD-FOO Operation for RedCap UEs; Document for: Discussion and Decision.
R1-2208229; 3GPP TSG RAN WG1 #110; Toulouse, France, Aug. 22-26, 2022; Agenda item: 8.17; Source: Moderator (China Telecom); Title: FL summary#2 of discussion on Rel-17 uplink Tx switching; Document for: Discussion.
R1-2202491; 3GPP TSG RAN WGI Meeting #108-e; E-meeting, Feb. 21-Mar. 3, 2022; Agenda Item: 5.1; Source: Huawei, HiSilicon; Title: Discussions on the remaining issues for UL Tx switching; Document for: Discussion and Decision.
R1-2001179; 3GPP TSG RAN WGI Meeting #100-e; Feb. 24-Mar. 6, 2020; Agenda Item: 6.2.3.1; Source: Huawei; Title: Feature summary #2 on LTE DL MIMO efficiency enhancement; Document for: Discussion and Decision.
R1-2003784; 3GPP TSG RAN WG1 #101; e-Meeting, May 25-Jun. 5, 2020; Agenda Item: 6.2.3.1.1; Source: Qualcomm Incorporated; Title: Maintenance for Additional SRS symbols; Document for: Discussion and Decision.
R1-2302807; 3GPP TSG RAN WG1 #112bis-e; e-Meeting, Apr. 17-Apr. 26, 2023; Source: Intel Corporation; Title: Positioning for RedCap UEs; Agenda item: 9.5.5; Document for: Discussion and Decision.
R1-2301684; 3GPP TSG-RAN WGI Meeting #112; Athens, Greece, Feb. 27-Mar. 3, 2023; Agenda Item: 9.5.5; Source: Ericsson; Title: Positioning for RedCap UEs; Document for: Discussion, Decision.
R1-2102964; 3GPP TSG-RAN WG1 Meeting #104b-e; e-Meeting, Apr. 12-20, 2021; Agenda Item: 8.1.3; Source: Xiaomi; Title: Discussion on SRS enhancements; Document for: Discussion and Decision.
R1-1911300; 3GPP TSG RAN WG1 #98bis; Chongqing, China, Oct. 14-20, 2019; Agenda Item: 7.2.6.5; Source: Motorola Mobility,

(56) References Cited

OTHER PUBLICATIONS

Lenovo; Title: Enhanced inter UE Tx prioritization/multiplexing for URLLC; Document for: Discussion.
R1-1906150; 3GPP TSG RAN WG1 #97; Reno, USA, May 13-17, 2019; Source: vivo; Title: UL inter-UE Tx prioritization for URLLC; Agenda Item: 7.2.6.5; Document for: Discussion and Decision.
R1-2104181; 3GPP TSG-RAN WG1 Meeting #105-e; e-Meeting, May 19-27, 2021; Agenda Item: 8.6.1.3; Source: Ericsson; Title: Duplex operation for RedCap; Document for: Discussion, Decision.

* cited by examiner

```
RequestCapabilities-r9-IEs ::= SEQUENCE {
  commonIEsRequestCapabilities
  ...,
  [[ ...]],
  [[nr-ECID-RequestCapabilities-r16
    nr-Multi-RTT-RequestCapabilities-r16
    nr-DL-AoD-RequestCapabilities-r16
    nr-DL-TDOA-RequestCapabilities-r16
    nr-UL-RequestCapabilities-r16 ]]
}
```

FIG. 18A

```
ProvideCapabilities-r9-IEs ::= SEQUENCE {
  commonIEsProvideCapabilities
  ...,
  [[nr-ECID-ProvideCapabilities-r16
    nr-Multi-RTT-ProvideCapabilities-r16
    nr-DL-AoD-ProvideCapabilities-r16
    nr-DL-TDOA-ProvideCapabilities-r16
    nr-UL-ProvideCapabilities-r16        ]]
}
```

FIG. 18B

```
RequestAssistanceData-r9-IEs ::= SEQUENCE {
  ...,
  [[nr-Multi-RTT-RequestAssistanceData-r16
    nr-DL-AoD-RequestAssistanceData-r16
    nr-DL-TDOA-RequestAssistanceData-r16
  ]]
}
NR-Multi-RTT-RequestAssistanceData-r16 ::= SEQUENCE {
  nr-PhysCellID-r16        NR-PhysCellID-r16
  nr-AdType-r16
  ...,
  [[
  nr-on-demand-DL-PRS-Request-r17
  nr-DL-PRS-ExpectedAoD-or-AoA-Request-r17
  pre-configured-AssistanceDataRequest-r17
  ]]
}
```

FIG. 18C

```
CommonIEsRequestLocationInformation ::= SEQUENCE {
  LocationInformationType,
  triggeredReporting     TriggeredReportingCriteria
  periodicalReporting    PeriodicalReportingCriteria
  additionalInformation    AdditionalInformation
  scheduledLocationTime-r17
...,
}
TriggeredReportingCriteria ::=    SEQUENCE {
  cellChange                  BOOLEAN,
  reportingDuration             ReportingDuration,
}

PeriodicalReportingCriteria ::=   SEQUENCE {
  reportingAmount
  reportingInterval
}


ResponseTime ::= SEQUENCE {
  time
  responseTimeEarlyFix-r12
  unit-r15
}

ScheduledLocationTime-r17 ::= SEQUENCE {
  utcTime-r17
  gnssTime-r17
  networkTime-r17
  relativeTime-r17  INTEGER (1..1024)
}
```

FIG. 19

```
NR-Multi-RTT-ProvideAssistanceData-r16 ::= SEQUENCE {
   nr-DL-PRS-AssistanceData-r16
   nr-SelectedDL-PRS-IndexList-r16
   ...,
   [[
   nr-On-Demand-DL-PRS-Configurations-r17
   nr-On-Demand-DL-PRS-Configurations-Selected-
IndexList-r17
   assistanceDataValidityArea-r17 AreaID-CellList-r17
   ]]
}
NR-DL-TDOA-ProvideAssistanceData-r16 ::= SEQUENCE {
   nr-DL-PRS-AssistanceData-r16
   nr-SelectedDL-PRS-IndexList-r16
   ...,
   [[
   nr-On-Demand-DL-PRS-Configurations-r17
   nr-On-Demand-DL-PRS-Configurations-Selected-
IndexList-r17
   assistanceDataValidityArea-r17 AreaID-CellList-r17
   ]]
}
AreaID-CellList-r17 ::= SEQUENCE
(SIZE(1..maxCellIDsPerArea-r17)) OF NR-Cell-IDs-r17
NR-Cell-IDs-r17 ::= SEQUENCE {
   nr-CellGlobalID-r17
   nr-PhysCellID-r17
   nr-ARFCN-r17
}
```

FIG. 20A

```
NR-Multi-RTT-RequestAssistanceData-r16 ::= SEQUENCE {
   nr-PhysCellID-r16
   nr-AdType-r16
   [[
   nr-on-demand-DL-PRS-Request-r17
   nr-DL-PRS-ExpectedAoD-or-AoA-Request-r17
   pre-configured-AssistanceDataRequest-r17
   ]]
}
```

FIG. 20B

```
NR-DL-PRS-AssistanceData-r16 ::= SEQUENCE {
  nr-SSB-Config-r16
  nr-DL-PRS-ReferenceInfo-r16     DL-PRS-ID-Info-r16,
  nr-DL-PRS-AssistanceDataList-r16  SEQUENCE (SIZE
  (1..nrMaxFreqLayers-r16)) OF NR-DL-PRS-
                          AssistanceDataPerFreq-r16,
}
NR-DL-PRS-AssistanceDataPerFreq-r16 ::= SEQUENCE {
  nr-DL-PRS-PositioningFrequencyLayer-r16
  nr-DL-PRS-AssistanceDataPerFreq-r16 SEQUENCE (SIZE
(1..nrMaxTRPsPerFreq-r16)) OF
                                NR-DL-PRS-
AssistanceDataPerTRP-r16,
}
NR-DL-PRS-AssistanceDataPerTRP-r16 ::= SEQUENCE {
  dl-PRS-ID-r16
  nr-PhysCellID-r16
  nr-CellGlobalID-r16
  nr-ARFCN-r16
  nr-DL-PRS-SFN0-Offset-r16  NR-DL-PRS-SFN0-Offset-r16,
  nr-DL-PRS-ExpectedRSTD-r16    INTEGER (-3841..3841),
  nr-DL-PRS-ExpectedRSTD-Uncertainty-r16 INTEGER
(0..246),
  nr-DL-PRS-Info-r16       NR-DL-PRS-Info-r16,
  prs-OnlyTP-r16
  nr-DL-PRS-ExpectedAoD-or-AoA-r17
}
NR-DL-PRS-SFN0-Offset-r16 ::= SEQUENCE {
  sfn-Offset-r16            INTEGER (0..1023),
  integerSubframeOffset-r16  INTEGER (0..9),
}
```

FIG. 21A

```
DL-PRS-ID-Info-r16 ::= SEQUENCE {
  dl-PRS-ID-r16
  nr-DL-PRS-ResourceID-List-r16 SEQUENCE (SIZE
(1..nrMaxResourceIDs-r16)) OF
                              NR-DL-PRS-ResourceID-r16
  nr-DL-PRS-ResourceSetID-r16
}
```

FIG. 21B

```
NR-DL-PRS-Info-r16 ::= SEQUENCE {
  nr-DL-PRS-ResourceSetList-r16   SEQUENCE (SIZE
(1..nrMaxSetsPerTrpPerFreqLayer-r16)) OF NR-DL-PRS-
                                          ResourceSet-r16,
}

NR-DL-PRS-ResourceSet-r16 ::= SEQUENCE {
  nr-DL-PRS-ResourceSetID-r16
  dl-PRS-Periodicity-and-ResourceSetSlotOffset-r16
  dl-PRS-ResourceRepetitionFactor-r16
  dl-PRS-ResourceTimeGap-r16
  dl-PRS-NumSymbols-r16
  dl-PRS-MutingOption1-r16
  dl-PRS-MutingOption2-r16
  dl-PRS-ResourcePower-r16
  dl-PRS-ResourceList-r16
}

NR-DL-PRS-Resource-r16 ::= SEQUENCE {
  nr-DL-PRS-ResourceID-r16      NR-DL-PRS-ResourceID-
r16,
  dl-PRS-SequenceID-r16
  dl-PRS-CombSizeN-AndReOffset-r16
  dl-PRS-ResourceSlotOffset-r16
  dl-PRS-ResourceSymbolOffset-r16
  dl-PRS-QCL-Info-r16           DL-PRS-QCL-Info-r16
}

DL-PRS-QCL-Info-r16 ::= CHOICE {
  ssb-r16               SEQUENCE {
    pci-r16                 NR-PhysCellID-r16,
    ssb-Index-r16           INTEGER (0..63),
    rs-Type-r16             ENUMERATED {typeC, typeD,
typeC-plus-typeD}
  },
  dl-PRS-r16            SEQUENCE {
    qcl-DL-PRS-ResourceID-r16
    qcl-DL-PRS-ResourceSetID-r16
  }
}
```

FIG. 22

| Elementary procedure (EP) | Initiating message | Response message (for successful outcome) | Response message (for unsuccessful outcome) |
|---|---|---|---|
| E-CID measurement initiation | E-CID MEASUREMENT INITIATION REQUEST | E-CID MEASUREMENT INITIATION RESPONSE | E-CID MEASUREMENT INITIATION FAILURE |
| OTDOA information exchange | OTDOA INFORMATION REQUEST | OTDOA INFORMATION RESPONSE | OTDOA INFORMATION FAILURE |
| Positioning information exchange | POSITIONING INFORMATION REQUEST | POSITIONING INFORMATION RESPONSE | POSITIONING INFORMATION FAILURE |
| TRP information exchange | TRP INFORMATION REQUEST | TRP INFORMATION RESPONSE | TRP INFORMATION FAILURE |
| measurement | MEASUREMENT REQUEST | TRP INFORMATION RESPONSE | TRP INFORMATION FAILURE |
| Positioning activation | POSITIONING ACTIVATION REQUEST | POSITIONING ACTIVATION RESPONSE | POSITIONING ACTIVATION FAILURE |
| PRS configuration exchange | PRS CONFIGURATION REQUEST | PRS CONFIGURATION RESPONSE | PRS CONFIGURATION FAILURE |
| Measurement pre-configuration | MEASREUEMNT RPECONFIGURATION REQUEST | MEASREUEMNT RPECONFIGURATION RESPONSE | MEASREUEMNT RPECONFIGURATION REFUSE |

FIG. 25

| Elementary Procedure (EP) | Initiating message |
|---|---|
| E-CID measurement failure indication | E-CID MEASUREMENT FAILURE INDICATION |
| E-CID measurement report | E-CID MEASUREMENT REPORT |
| E-CID measurement termination | E-CID MEASUREMENT TERMINATION |
| Error indication | OTDOA information exchange |
| Assistance information control | ASSISTANCE INFORMATION CONTROL |
| Assistance information feedback | ASSISTANCE INFORMATION FEEDBACK |
| Positioning information update | POSITIONING INFORMATION UPDATE |
| Measurement report | MEASUREMENT REPORT |
| Measurement update | MEASUREMENT UPDATE |
| Measurement abort | MEASUREMENT ABORT |
| Measurement failure indication | MEASUREMENT FAILURE INDICATION |
| Positioning Deactivation | POSITIONING DEACTIVATION |
| Measurement Activation | MEASUREMENT ACTIVATION |

FIG. 26

| Function | Elementary procedure(s) (EPs) |
|---|---|
| E-CID location information transfer | A) E-CID measurement initiation<br>B) E-CID measurement failure indication<br>C) E-CID measurement report<br>D) E-CID measurement termination |
| OTDOA information transfer | OTDOA information exchange |
| Assistance information transfer | A) assistance information control<br>B) assistance information feedback |
| Reporting of general error situations | Error indication |
| Positioning information transfer | A) positioning information exchange<br>B) positioning information update<br>C) positioning activation<br>D) positioning deactivation |
| TRP information transfer | TRP information exchange |
| Measurement information transfer | A) Measurement<br>B) Measurement update<br>C) Measurement report<br>D) Measurement abort<br>D) Measurement failure indication |
| PRS information transfer | PRS configuration exchange |
| Measurement pre-configuration information transfer | A) Measurement pre-configuration<br>B) Measurement activation |

FIG. 27

PROCESSING TIME FOR FREQUENCY HOPPING

CROSS-REFERENCE TO RELATED APPLICATIONS

This application is a continuation of International Application No. PCT/US2024/041626, filed Aug. 9, 2024, which claims the benefit of U.S. Provisional Application No. 63/531,656, filed Aug. 9, 2023, all of which are hereby incorporated by reference in their entireties.

BRIEF DESCRIPTION OF THE DRAWINGS

Examples of several of the various embodiments of the present disclosure are described herein with reference to the drawings.

FIG. 18A illustrates an example of requesting capabilities message as per an aspect of an embodiment of the present disclosure.

FIG. 18B illustrates an example of providing capabilities message as per an aspect of an embodiment of the present disclosure.

FIG. 18C illustrates an example of request assistance data message as per an aspect of an embodiment of the present disclosure.

FIG. 19 illustrates an example of configuration parameters of a request location information as per an aspect of an embodiment of the present disclosure.

FIG. 20A illustrates an example of configuration parameters of a provided assistance data message as per an aspect of an embodiment of the present disclosure.

FIG. 20B illustrates an example of configuration parameters of a request assistance data message as per an aspect of an embodiment of the present disclosure.

FIG. 21A illustrates an example of configuration parameters of downlink (DL) positioning reference signal (PRS) as per an aspect of an embodiment of the present disclosure.

FIG. 21B illustrates an example of configuration parameters of DL PRS as per an aspect of an embodiment of the present disclosure.

FIG. 22 illustrates an example of configuration parameters of DL PRS as per an aspect of an embodiment of the present disclosure.

FIG. 25 illustrates an example of NRPPa messages and corresponding NRPPa elementary procedures as per an aspect of an embodiment of the present disclosure.

FIG. 26 illustrates an example of NRPPa messages and corresponding NRPPa elementary procedures as per an aspect of an embodiment of the present disclosure.

FIG. 27 illustrates an example of NRPPa functions as per an aspect of an embodiment of the present disclosure.

DETAILED DESCRIPTION

Figure 1A:
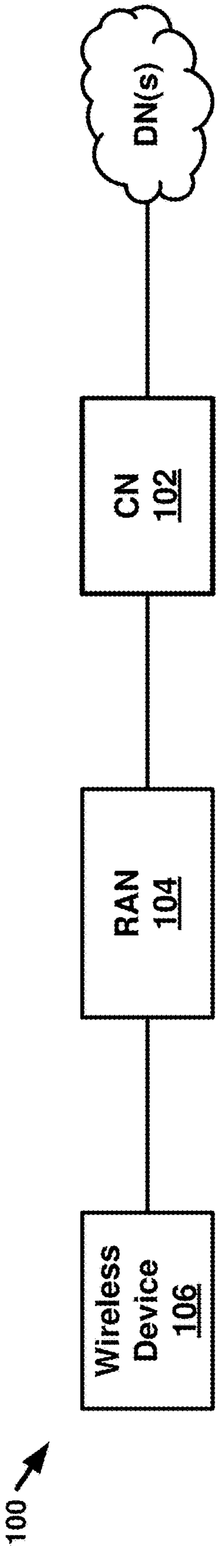
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNS), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
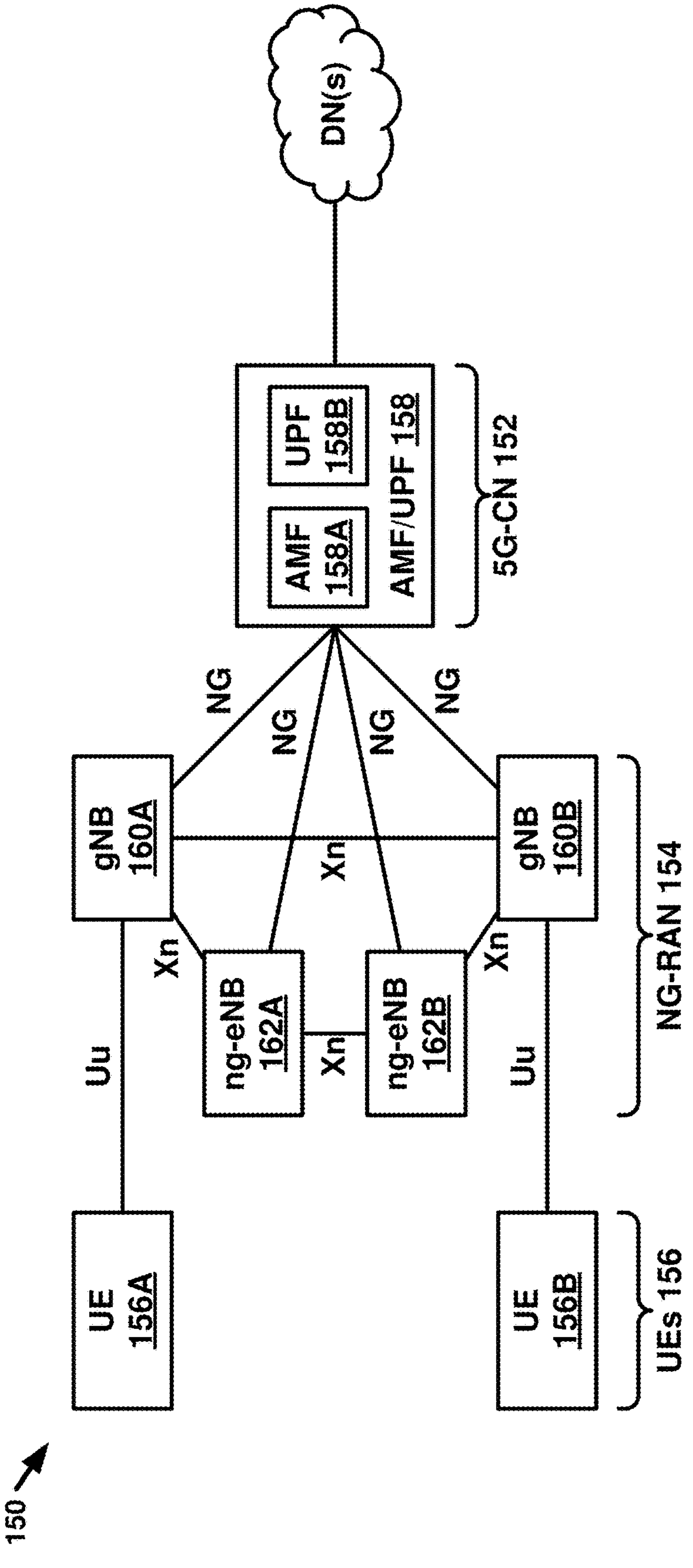

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
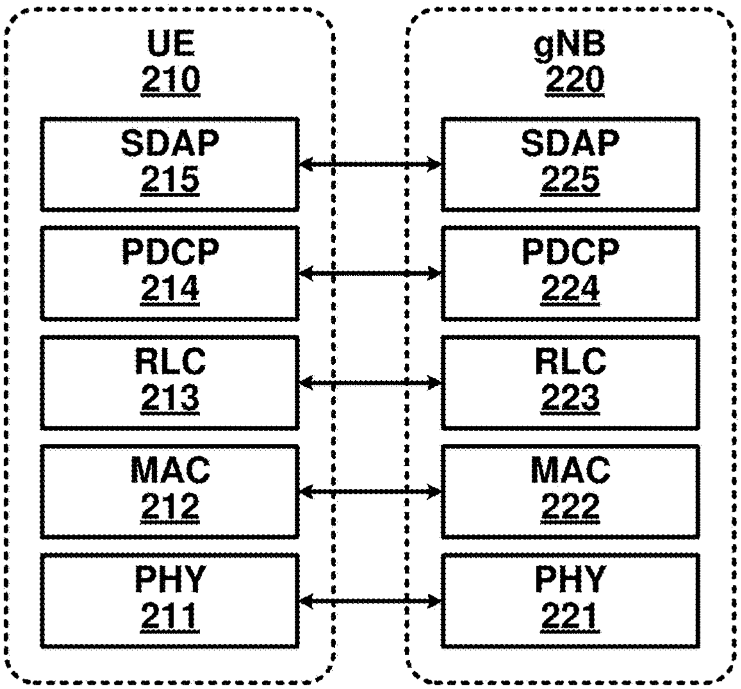
FIG. 2A and FIG. 2B respectively illustrate a New Radio (NR) user plane and control plane protocol stack.
Figure 2B:
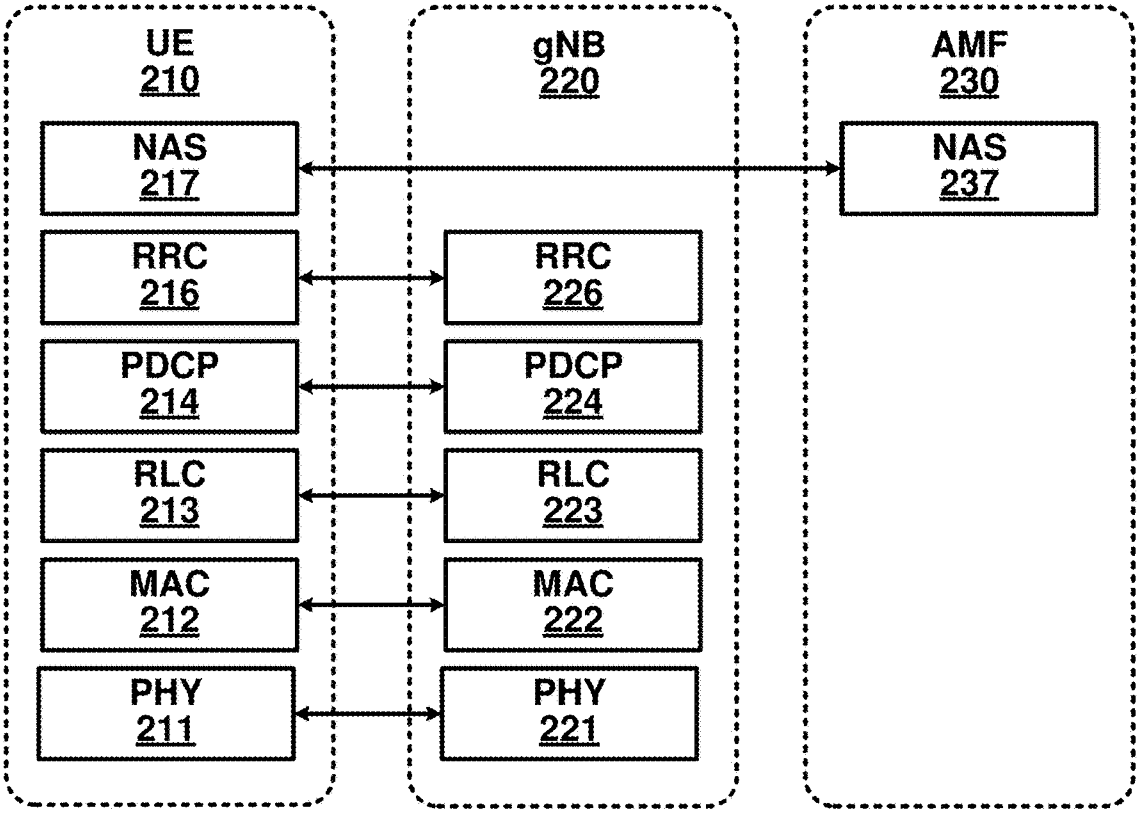

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
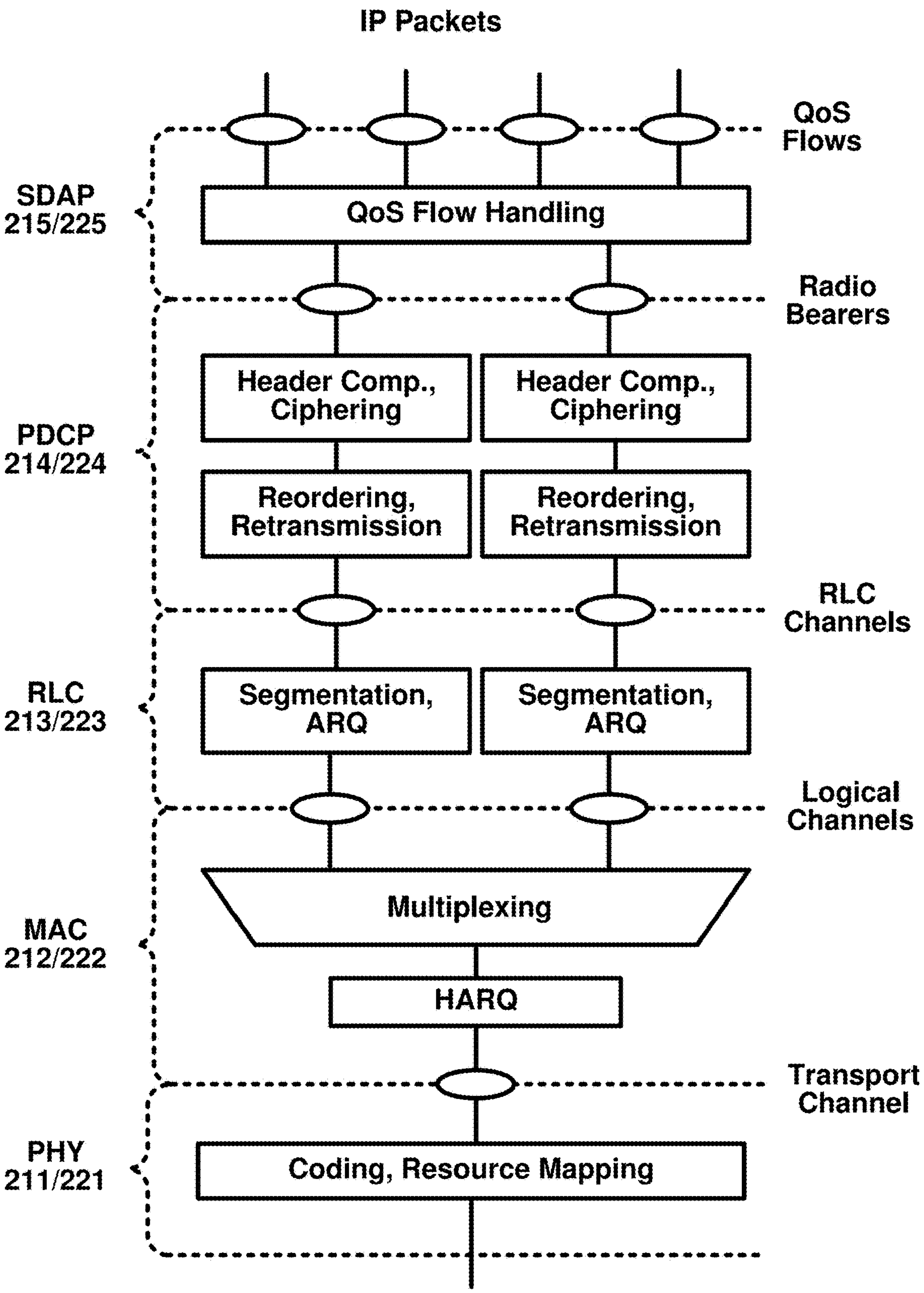
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
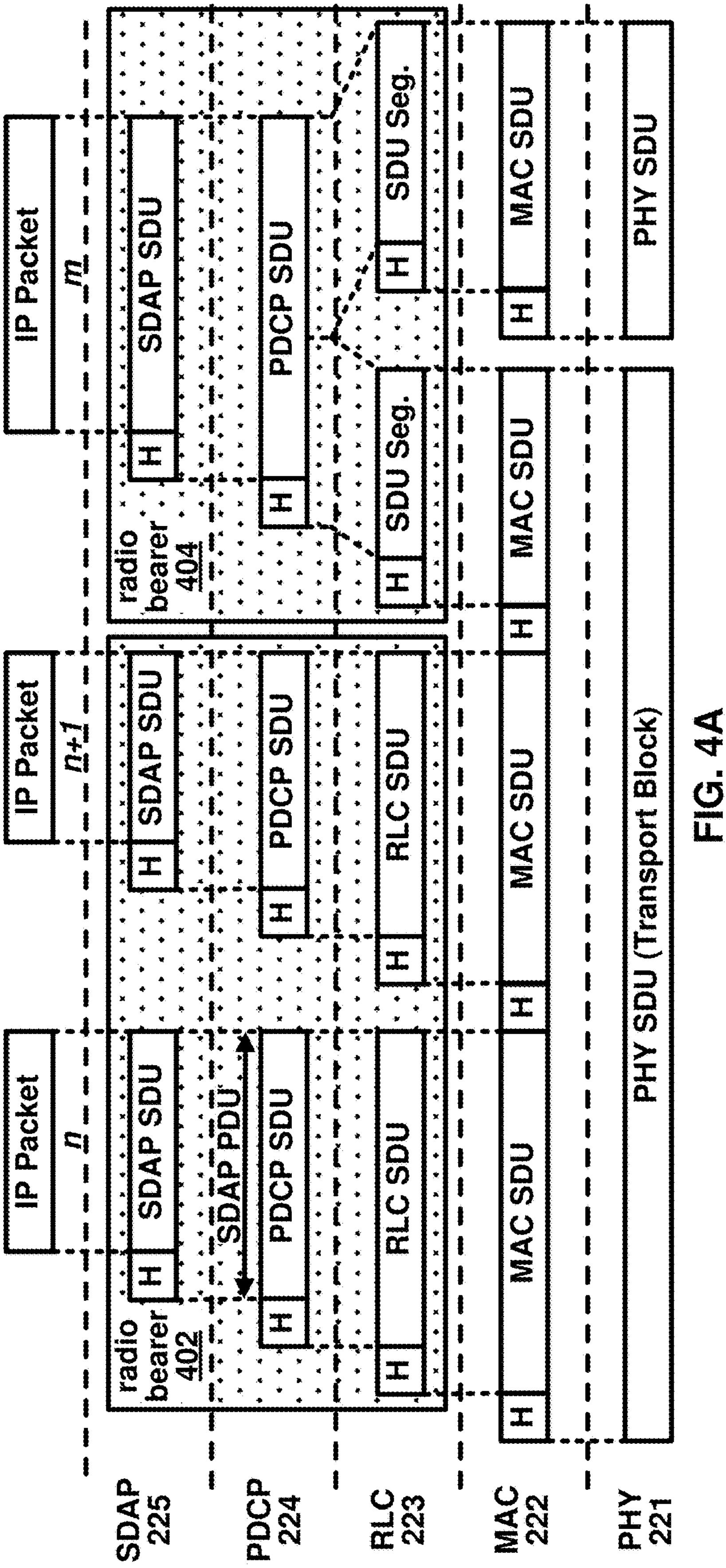
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
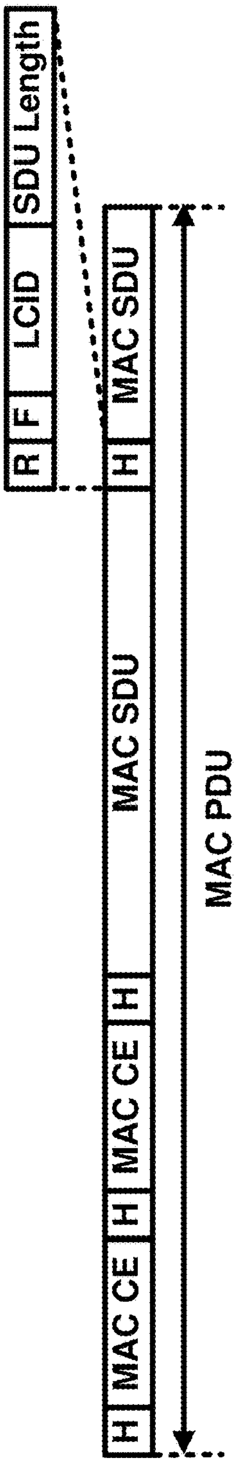
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
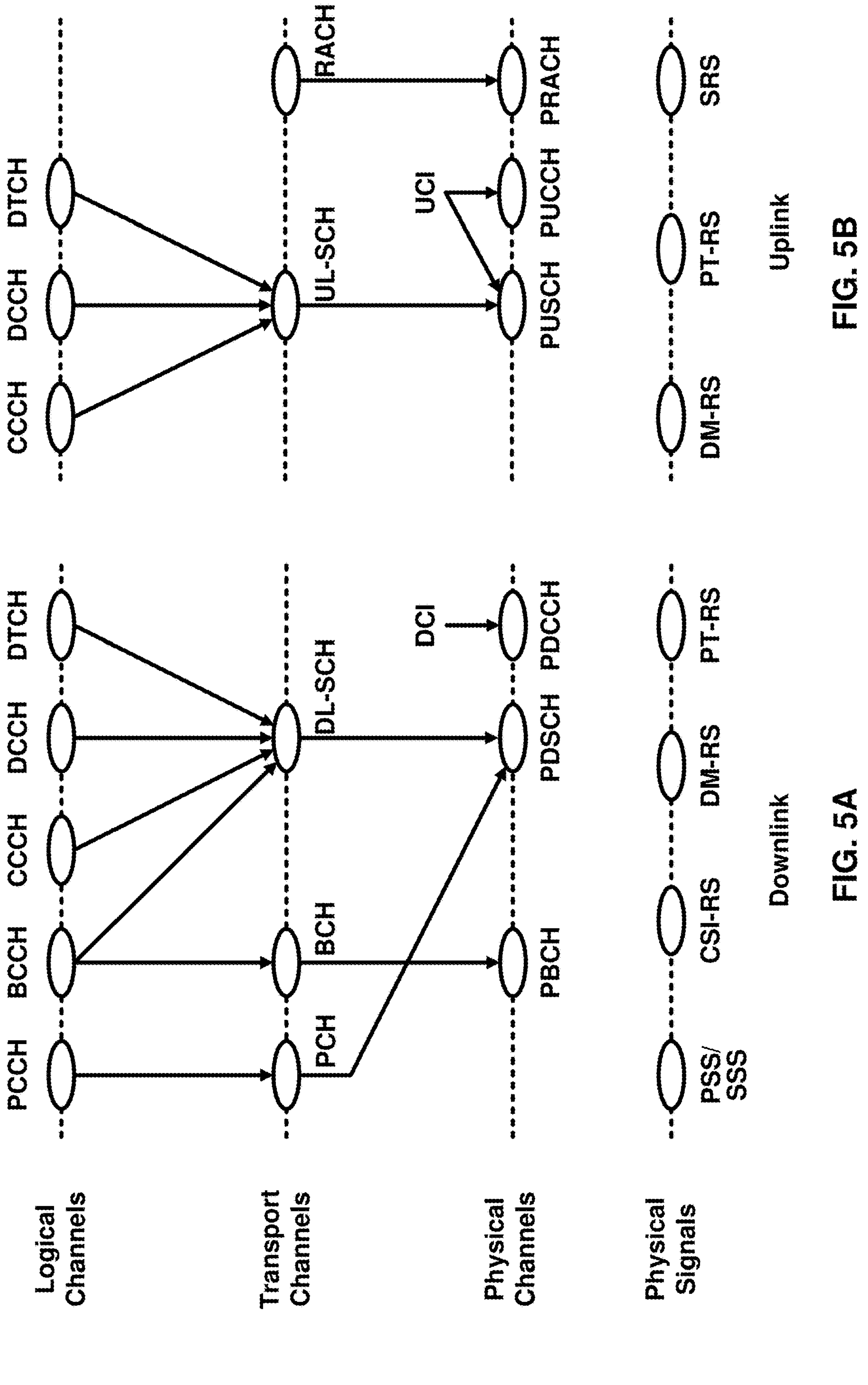
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
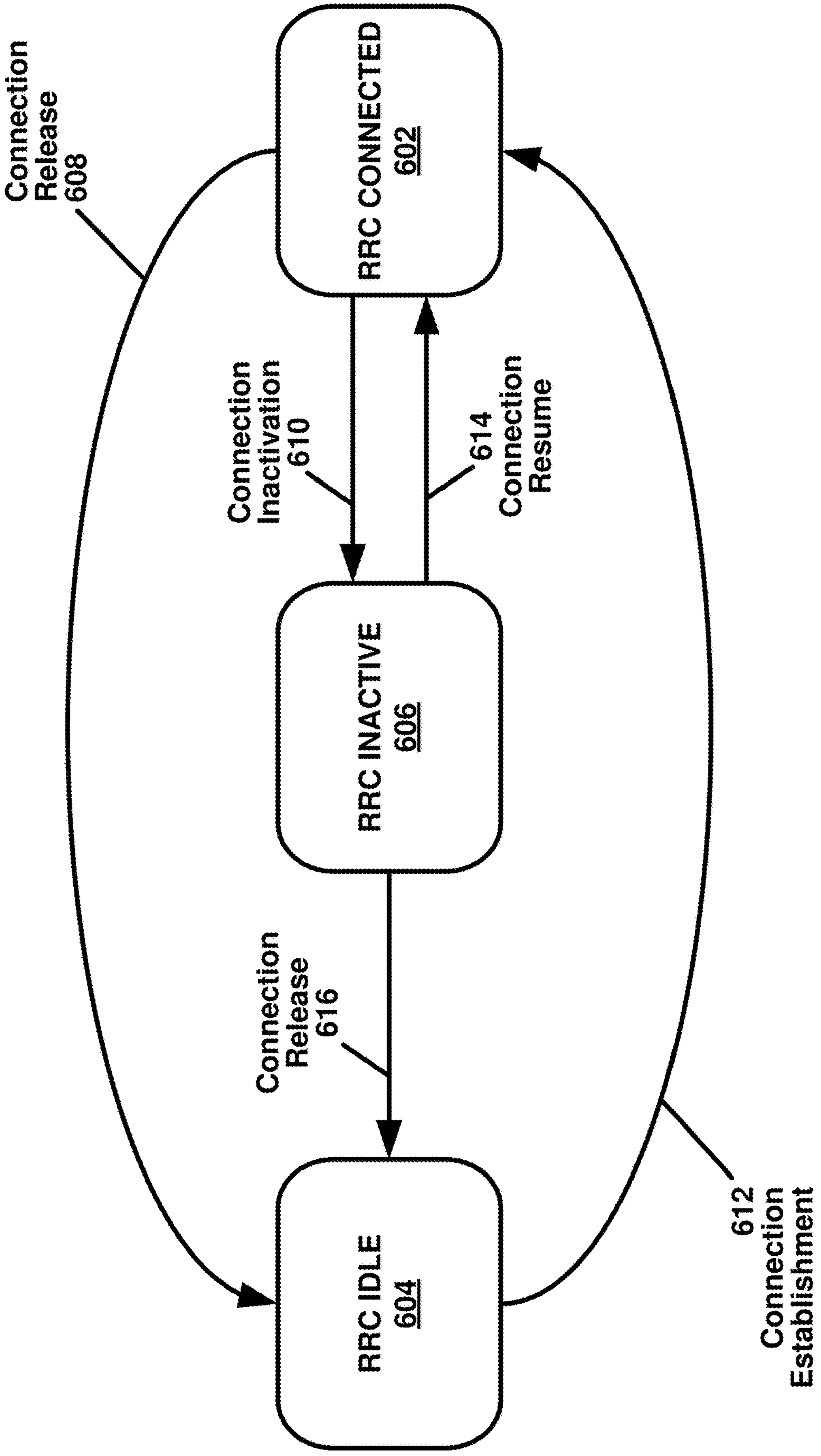
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
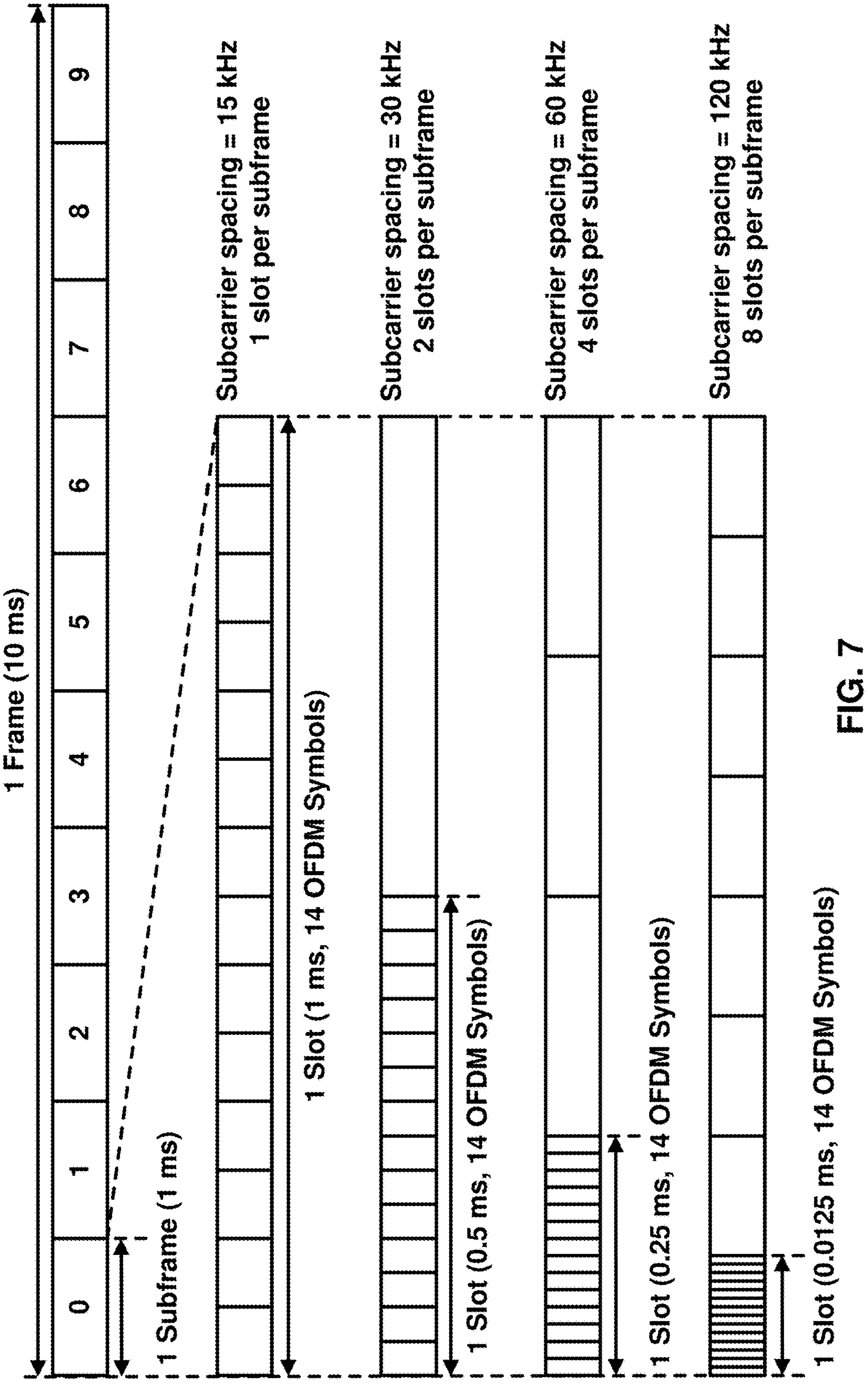
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 KHz/2.3 ρs; 60 KHz/1.2 ρs; 120 KHz/0.59 ρs; and 240 KHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
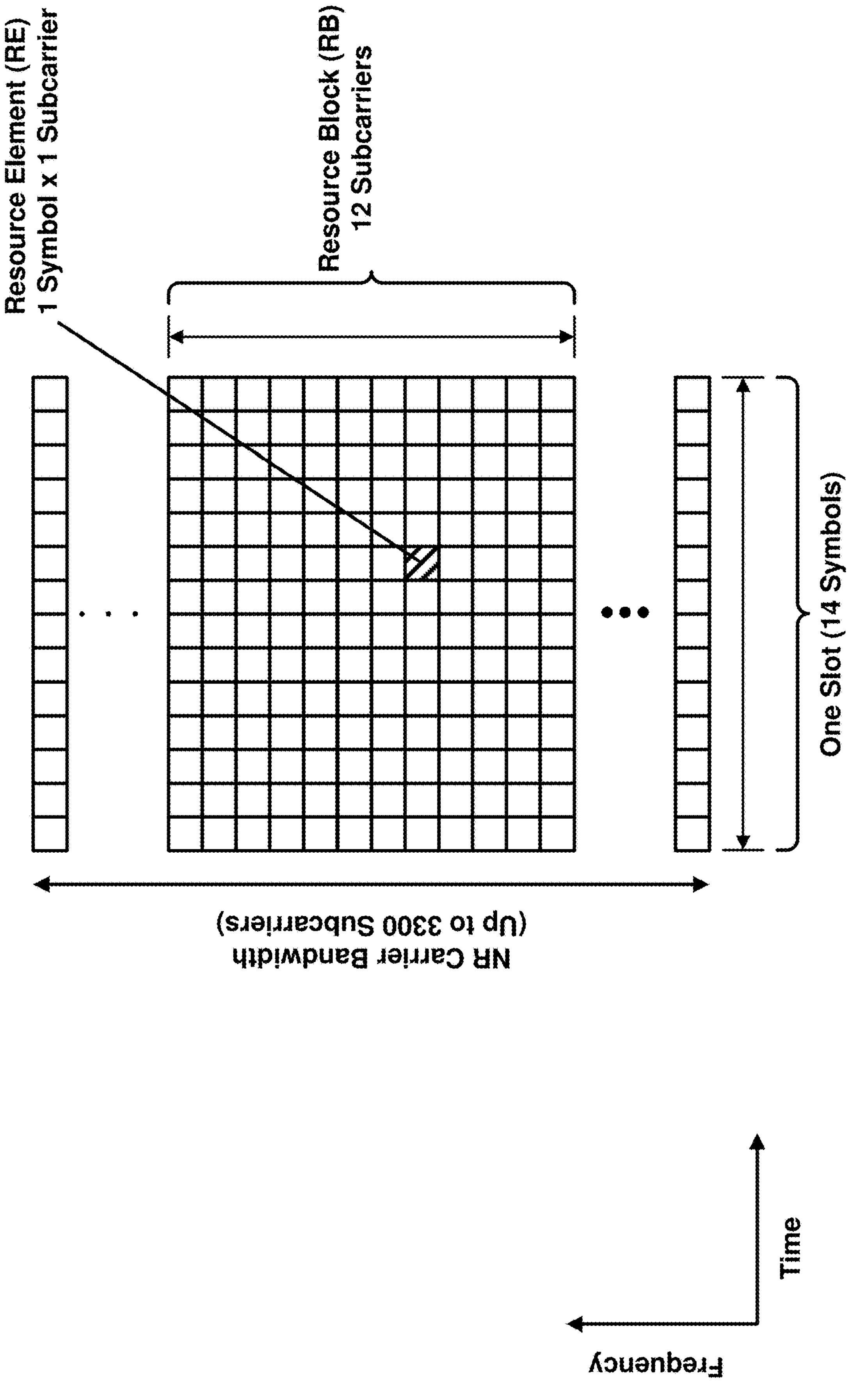
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
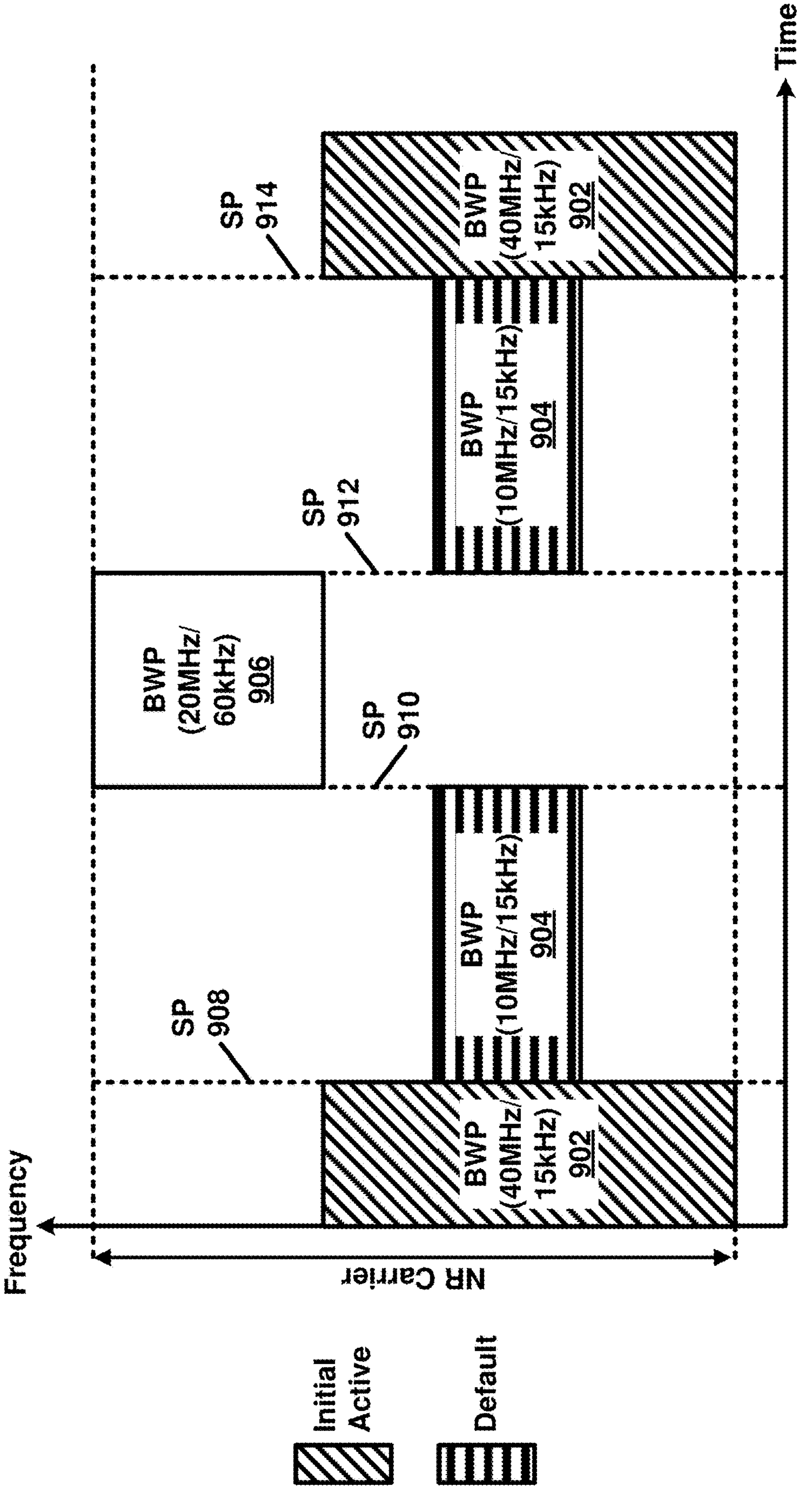
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
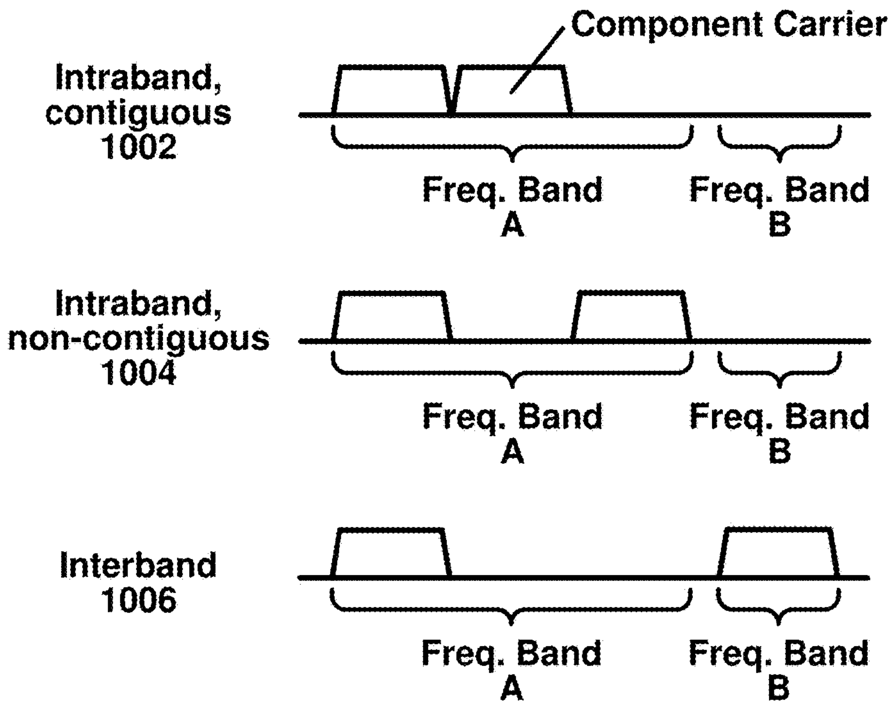
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
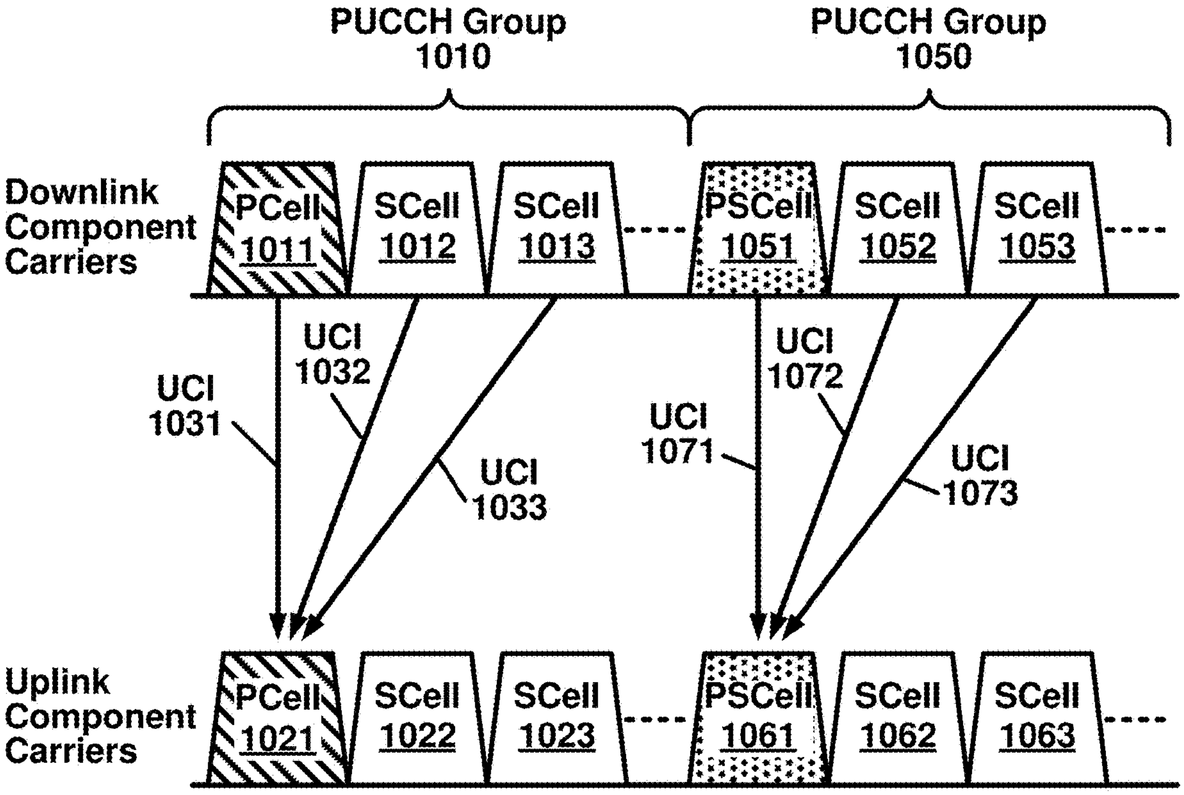
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
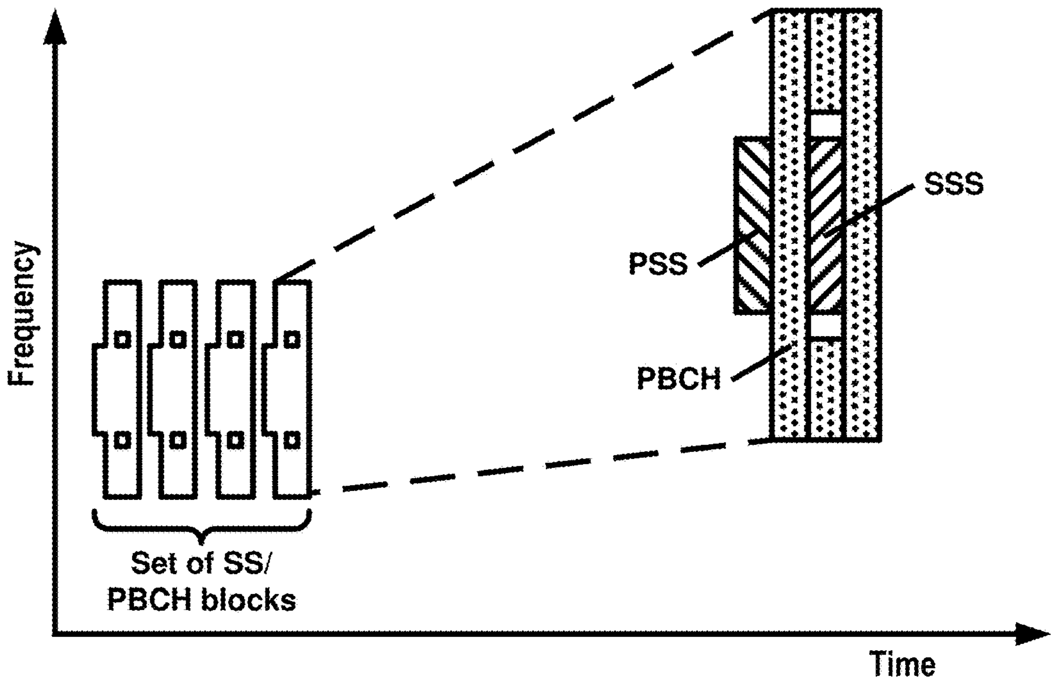
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate the remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: an SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
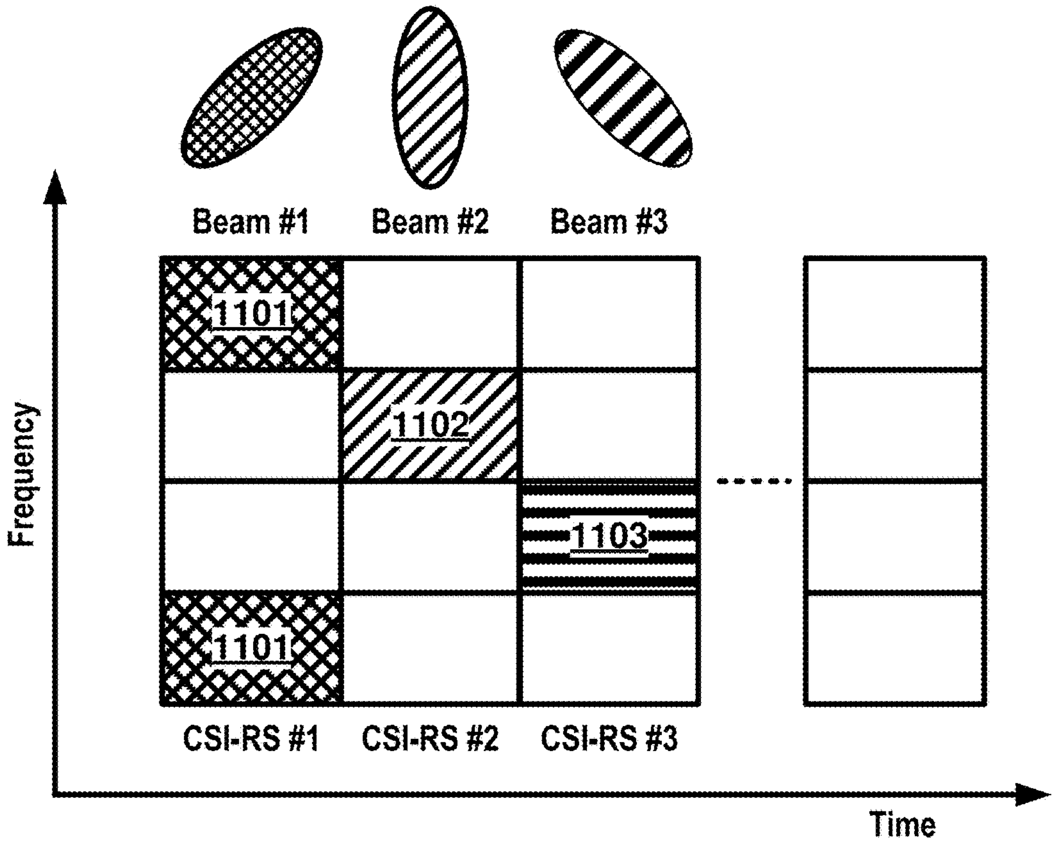
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
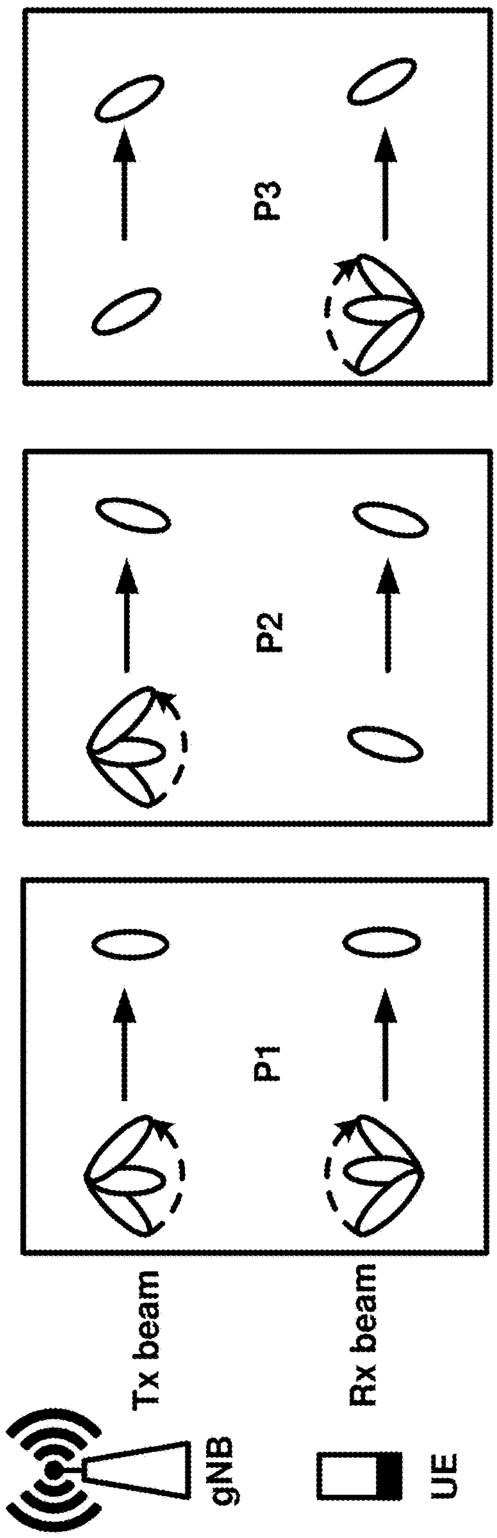
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
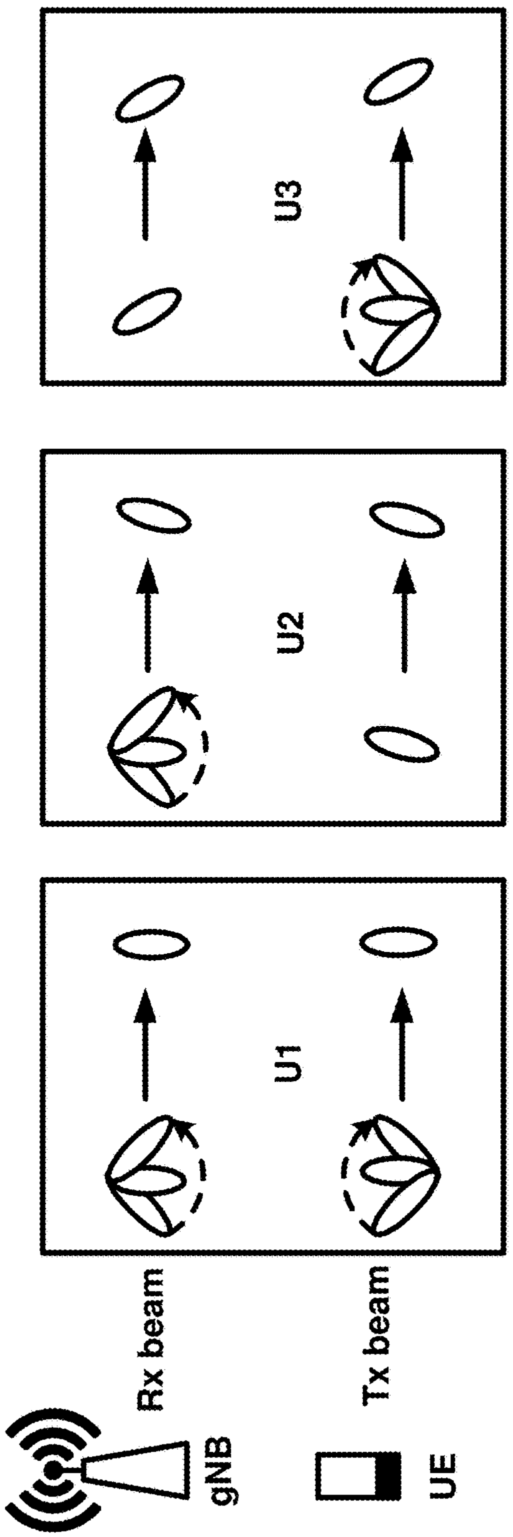

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
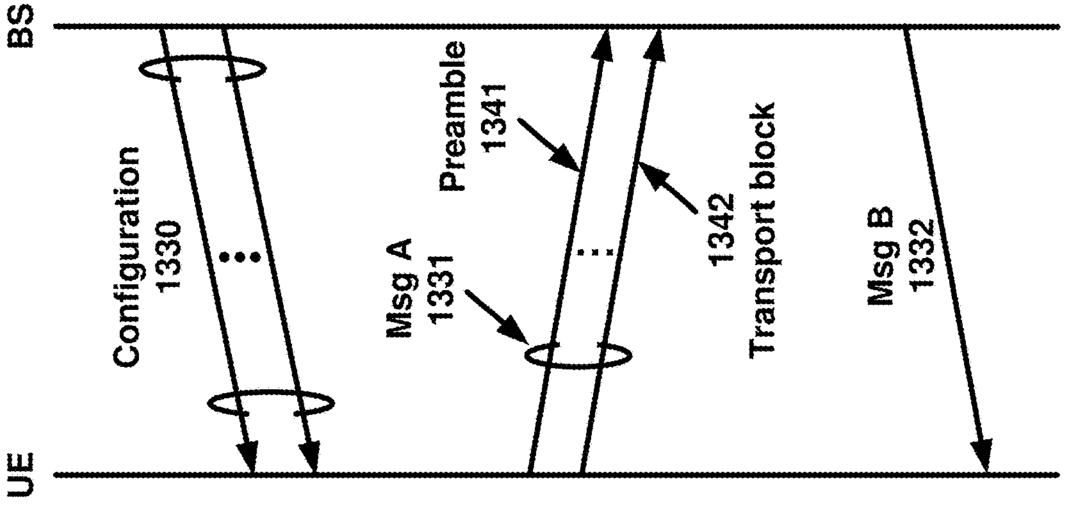
FIG. 13A, FIG. 13B, and FIG. 13C respectively illustrate a four-step contention-based random access procedure, a two-step contention-free random access procedure, and another two-step random access procedure.
Figure 13B:
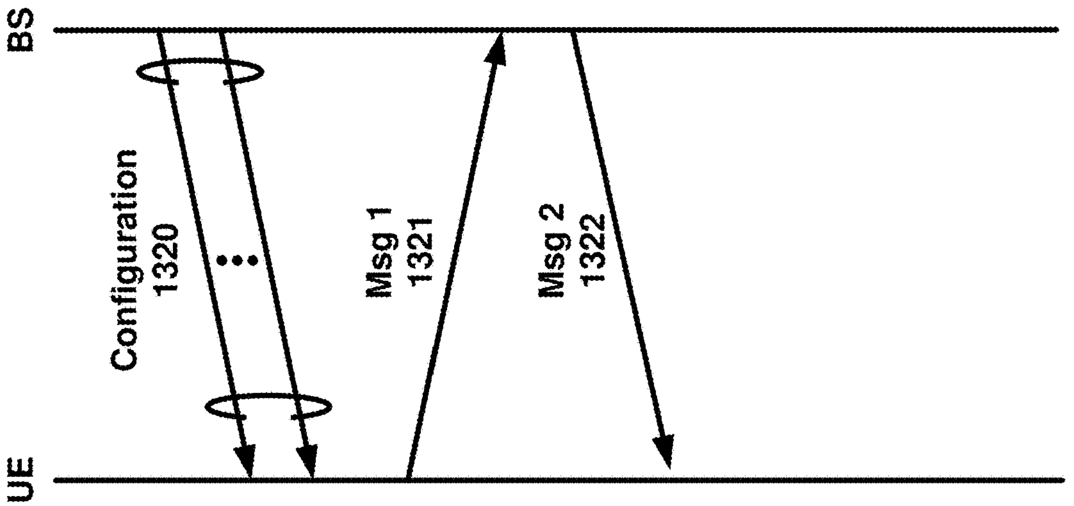
Figure 13A:
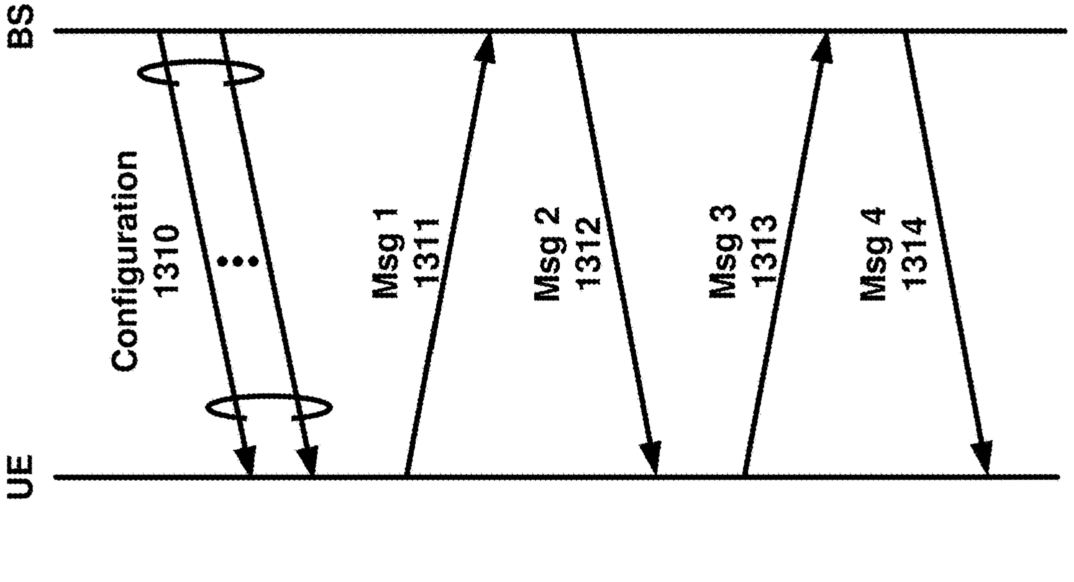

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preamble TransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
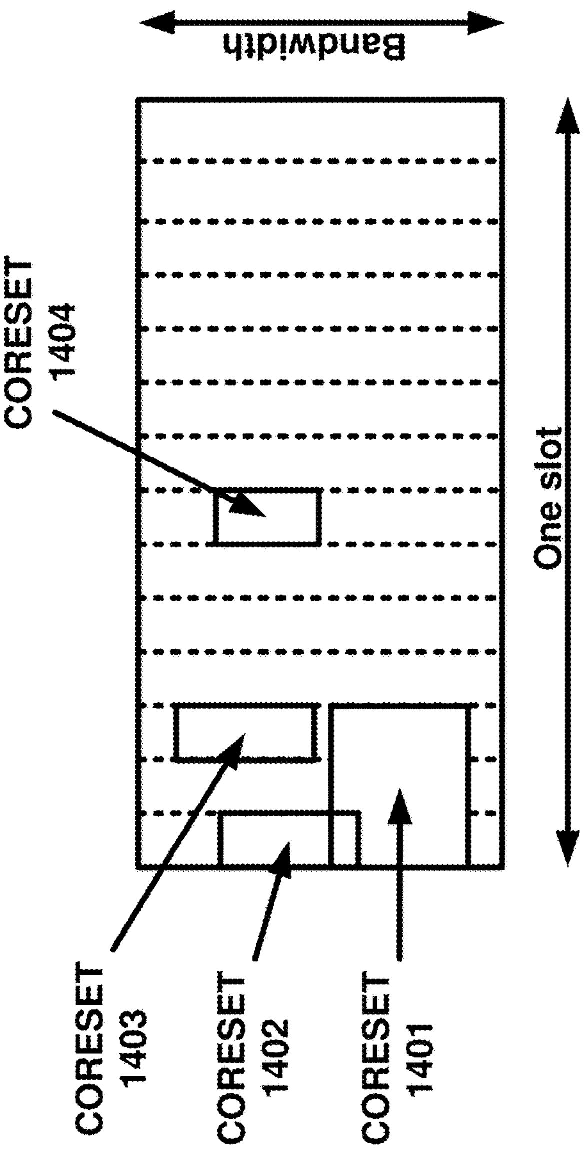
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
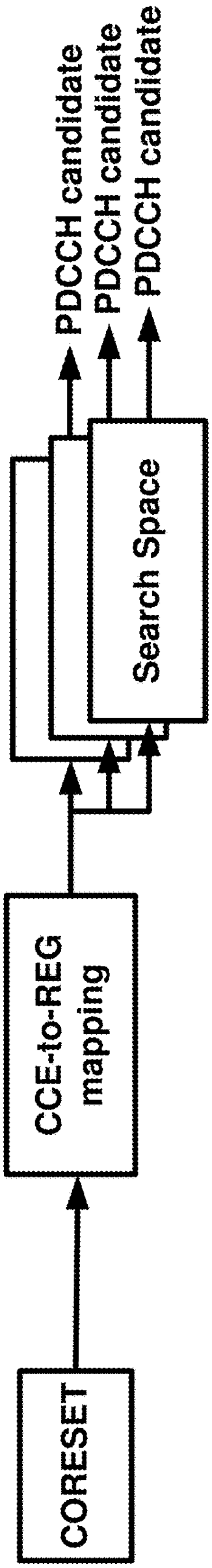
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved, or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
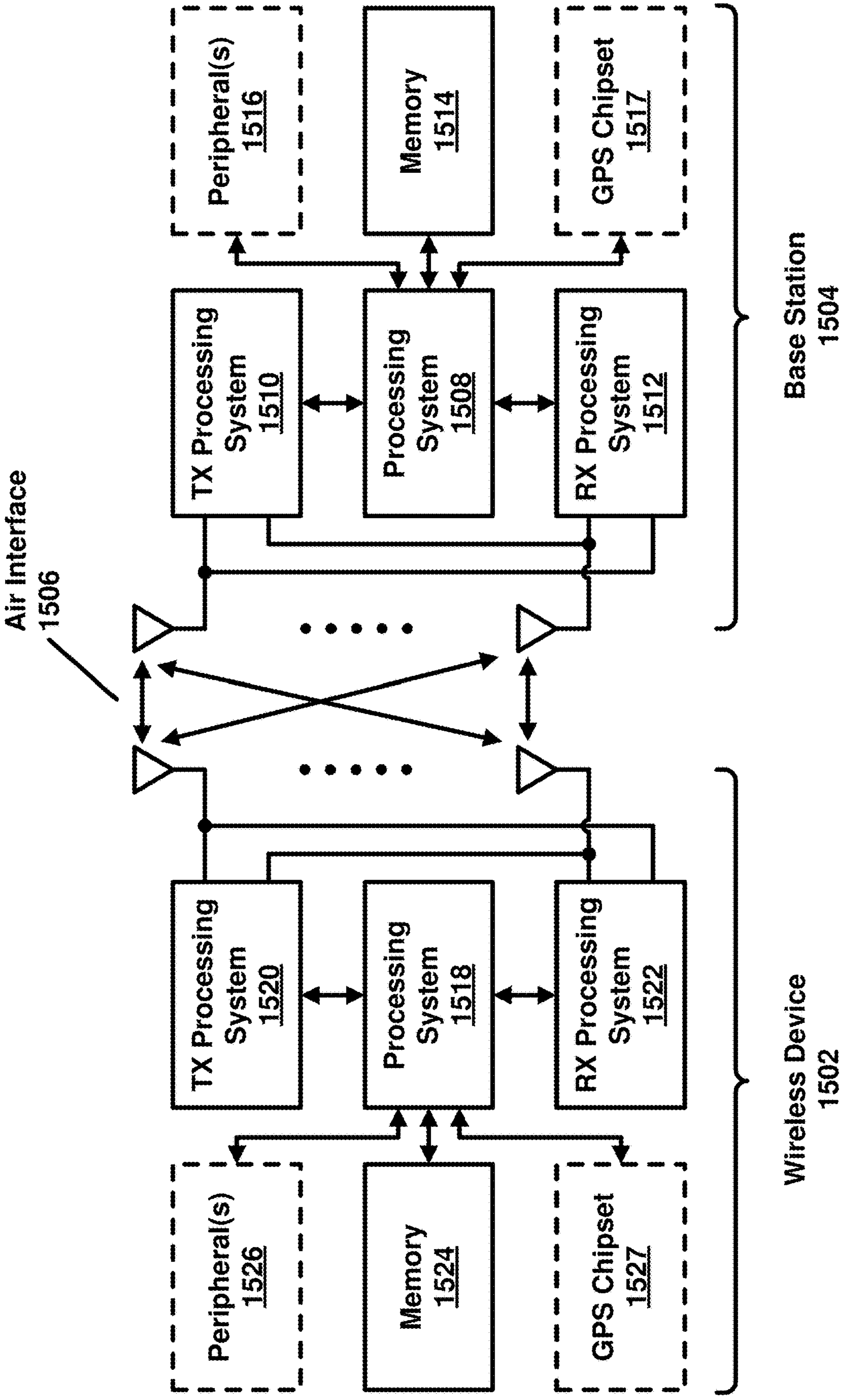
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO, or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
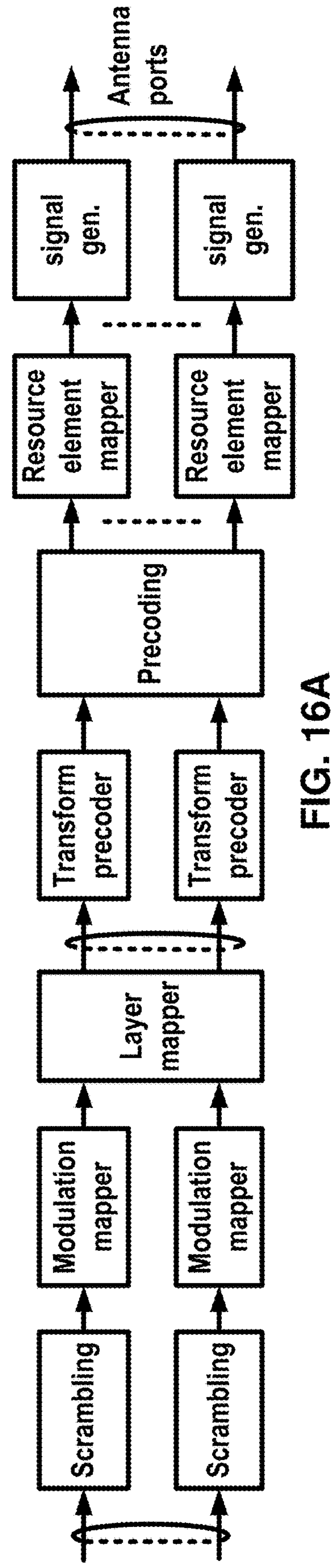
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

Figure 16B:
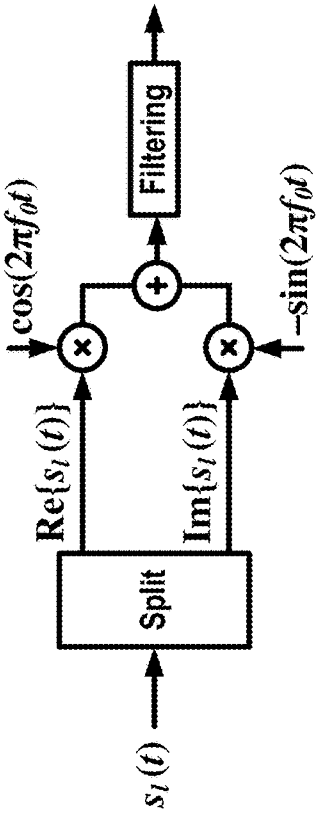

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
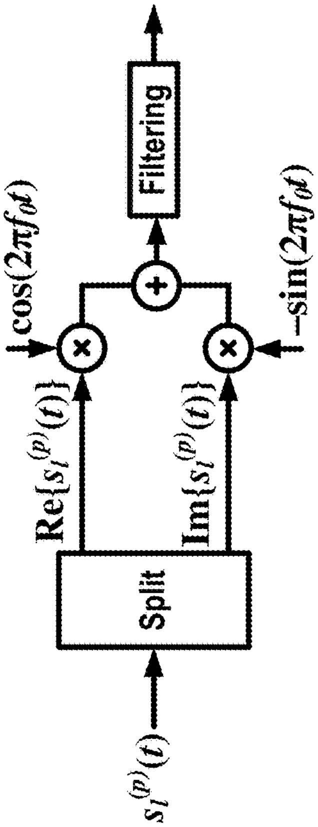
Figure 16C:
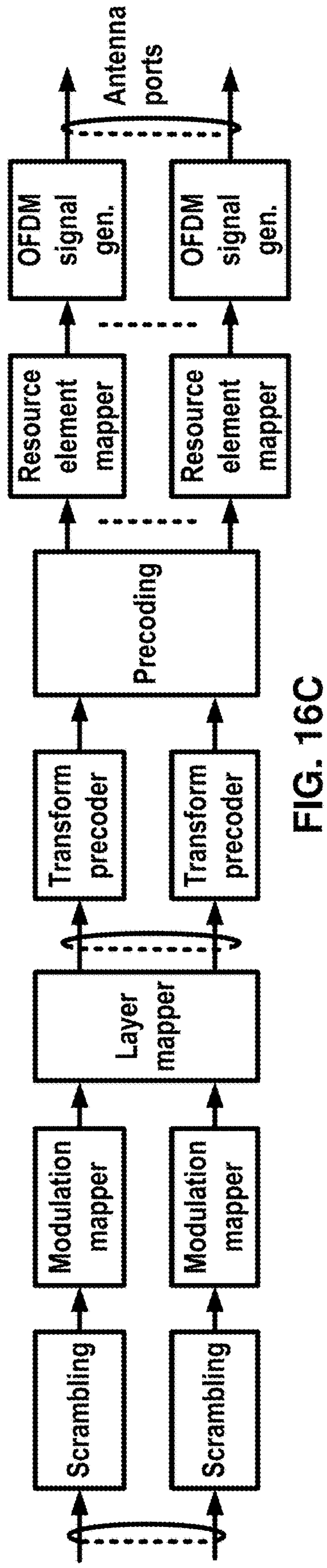

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g., two or more base stations in dual connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17A:
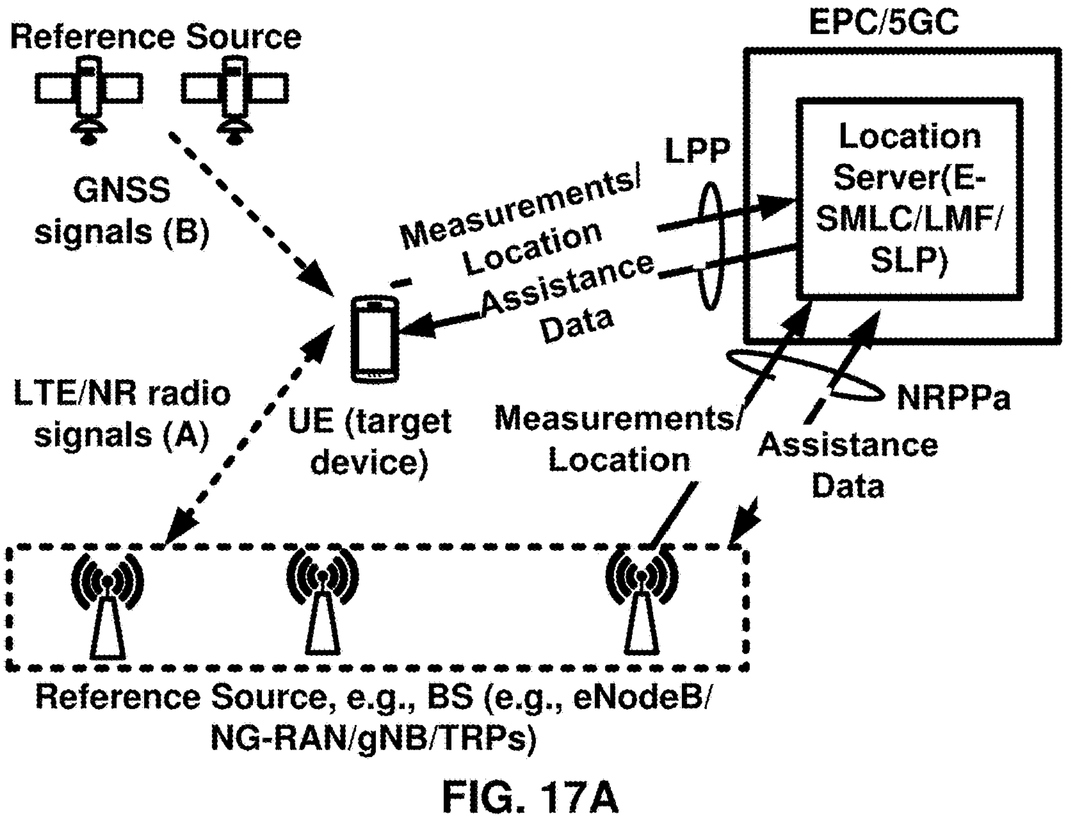
FIG. 17A illustrates an example of positioning as per an aspect of an embodiment of the present disclosure.

FIG. 17A illustrates an example of positioning as per an aspect of an embodiment of the present disclosure. The AMF may receive a request for a location service associated with a wireless device (e.g., a particular target UE, e.g., a Positioning Reference Unit (PRU) from another entity (e.g., Gateway Mobile Location Centre (GMLC) or the wireless device). In another example, the AMF itself may decide to initiate the location service corresponding to the wireless device (e.g., on behalf of the wireless device, e.g., for an IMS emergency call from the wireless device). The AMF may send a location services request to a location server, e.g., location management function (LMF), e.g., via NL1 interface. The NL1 interface between the LMF and the AMF may be transparent to the (all) wireless device and/or the base station. The LMF processes the location services request which may include transferring/transmitting assistance data to the wireless device to assist with UE-based (i.e., the UE estimating its own location) and/or UE-assisted positioning (i.e., the network estimating the UE location) and/or may include positioning of the wireless device. The LMF may return/transmit/send a result of the location service (e.g., measurements/location data/information, e.g., a position estimate for the wireless device) back to the AMF. In the case of the location service requested by an entity other than the AMF (e.g., the GMLC or the wireless device), the AMF may return/transmit/send the location service result to the entity. The LMF may have a proprietary signaling connection to a secure user plane location (SUPL) location platform (SLP). The SLP is the SUPL entity responsible for positioning over the user plane.

In some implementations, when the AMF receives the location service request in case of the wireless device is in an CM-IDLE state, the AMF may establish a signaling connection with the wireless device and assign a specific serving gNB or ng-eNB. The wireless device may be in the RRC connected state/mode before the beginning of a positioning procedure. For example, the wireless device may transit from the RRC idle state to the RRC connected state to perform the positioning procedure (corresponding to the location service). In other implementations, the wireless device may transmit to the RRC inactive state to perform the positioning procedure.

As shown in FIG. 17A, positioning the wireless device (e.g., the positioning procedure) may involve/comprise (signal) measurements (e.g., GNSS signals and/or LTE/NR radio signals) and a position estimate (e.g., the location) and an optional velocity computation based on the (signal) measurements. Although not shown in FIG. 17A, the measurements may be performed/made by the wireless device and/or by a (serving/non-serving) base station (e.g., ng-eNB or gNB or TRP). The measurements may be positioning measurements (e.g., reference signal time difference (RSTD) or non-positioning measurements (e.g., SSB/CSI-RS/TRS measurements).

FIG. 17A may show an example of an LTE positioning protocol (LPP) configuration between a location server (e.g., an Enhanced Serving Mobile Location Centre (E-SMLC), the LMF or the SLP), resided in core network (e.g., EPC or 5GC), and a wireless device (e.g., target device, e.g., a UE or a SUPL Enabled Terminal (SET)). The LPP may be used in 4G LTE and/or 5G NR systems. The LPP configuration may be used to position the wireless device using position-related measurements (e.g., GNSS signals and/or LTE/NR radio signals) obtained by one or more reference sources. The one or more reference resources may comprise one or more base stations (e.g., eNodeB/NG-RAN node/gNB), transmitting LTE/NR radio signals, and/or Global Navigation Satellites Systems (GNSSs) transmitting general radio navigation signals (GNSS signals). The GNSSs systems may comprise at least one of the following: GPS, Modernized GPS, Galileo, GLONASS, and BeiDou Navigation Satellite System (BDS). Regional navigation satellite systems include Quasi Zenith Satellite System (QZSS), and NAVigation with Indian Constellation (NavIC). The one or more reference resources may comprise one or more transmission points (TPs) and/or transmission reception points (TRPs). Example of FIG. 17A may show an example of the configuration as applied to the control-plane and/or user-plane location solutions for E-UTRAN and NG-RAN.

A positioning session (e.g., an LPP session, see FIG. 17B for an example) may be used between the location server and the wireless device in order to obtain (e.g., by the wireless device and/or the base station and/or the location server) location related measurements or a location estimate or to transfer assistance data. A single positioning session (e.g., a single LPP session) may be used to support a single location request (e.g., for a single Mobile Terminated Location Request (MT-LR), Mobile Originated Location Request (MO-LR) or Network Induced Location Request (NI-LR). Multiple positioning sessions (e.g., multiple LPP sessions) may be used between the wireless device and the location server to support multiple different location requests. An (or each) positioning session may comprise one or more positioning transactions (e.g., one or more LPP transactions), with each positioning transaction performing a single operation/function/procedure (e.g., a capability exchange procedure/operation, an assistance procedure/operation, and/or a location information transfer operation/procedure). The positioning transactions within the positioning session may occur serially or in parallel. Positioning transactions may be indicated at the LPP protocol level with a transaction ID in order to associate one or more positioning messages (e.g., LPP messages) with one another (e.g., a request message and a response message). For example, the positioning session may correspond to (or associated with) the positioning procedure. The positioning session may be for performing the positioning procedure by the wireless device and/or the base station and/or the location server.

LPP messages are carried as transparent (LPP) PDUs across intermediate network interfaces using the appropriate protocols (e.g., NGAP over the NG-C interface, NAS/RRC over the LTE-Uu and NR-Uu interfaces). The RRC protocol may provide transport for the LPP messages over the NR-Uu/LTE-Uu interfaces and/or configuring the wireless device with SRS resources/resource sets for positioning (e.g., via one or more SRS configuration parameters such as SRS-Resource/SRS-ResourceSet and/or SRS-PosResource/SRS-PosResourceSet). The activation/deactivation of configured semi-persistent SRS resource sets may be via MAC protocol over the NR-Uu/LTE-Uu interfaces. The activation of a configured aperiodic SRS resource set may be via a DCI.

An SRS which is configured with IEs SRS-ResourceSet/SRS-Resource may be called a MIMO SRS or SRS for MIMO. An SRS which is configured with IEs SRS-PosResourceSet/SRS-PosResource may be called a positioning SRS or SRS for positioning. A positioning SRS may have different configuration parameter values (e.g., comb size or number of symbols) than a MIMO SRS. A MIMO SRS may be configured on one or multiple antenna ports. A MIMO SRS may be configured within a BWP of a UE. A MIMO SRS may be configured with frequency hopping which is within the BWP of the configuration (e.g., within the BWP on which SRS-ResourceSet is configured).

A positioning transaction of the positioning session (e.g., an LPP transaction of the LPP session) may comprise communicating/exchanging (transmitting/receiving) the one or more positioning messages (e.g., the LPP messages comprising LPP PDUs) between the location server and the wireless device (e.g., based on LTE-Uu/NR-Uu interface). For example, the location server may interact (e.g., for transmitting/receiving the one or more positioning messages) with the wireless device based on the LPP. The wireless device may exchange/communicate with the location server (e.g., receive or transmit) the LPP messages (or the one or more positioning messages) via the base station based on/via/using NAS/RRC messages/protocol (e.g., RRC DL information transfer and/or RRC UL information transfer) over the LTE-Uu and NR-Uu interfaces. The LPP PDUs of the LPP messages (carried by the RRC DL information transfer and/or RRC UL information transfer) may be transparent to the base station (e.g., the base station may not attempt to decode the LPP messages). The base station may transmit/send the LPP messages received from the wireless device (using/based on the RRC/NAS messages/protocol) to the core network (AMF/LMF) using a format/protocol (e.g., NGAP messages, e.g., NGAP downlink NAS transport and/or NGAP uplink NAS transport). The base station may transmit/send the LPP messages received from the core network (AMF/LMF) to the wireless device using/based on the RRC/NAS messages/protocol (e.g., NGAP messages, e.g., NGAP downlink NAS transport and/or NGAP uplink NAS transport). The NGAP uplink/downlink NAS transport messages may comprise LPP PDUs of the LPP messages.

The one or more positioning messages may comprise assistance data messages/information (e.g., to set up the wireless device to perform positioning measurements) and/or measurements (e.g., A, B, or A+B)/locations messages. The wireless device may receive the assistance data messages/information based on/via LPP messages/signaling and/or RRC messages and/or (RRC) broadcasting (e.g., at least one positioning System Information Block (posSIB or SIBpos)).

The positioning procedure may comprise one or more RRC procedures for positioning. The one or more RRC procedures may comprise a UE Positioning Assistance Information procedure (e.g., used by a wireless device to report the UE Positioning Assistance Information for UL-TDOA, e.g., to report association between UL-SRS resources for positioning and the UE Tx TEG ID); and/or a location measurement indication procedure (e.g., used by the wireless device to request measurement gaps for OTDOA RSTD measurements, for subframe and slot timing detection for inter-RAT E-UTRA RSTD measurements, or for NR downlink positioning reference signals (DL-PRS) measurements). The one or more RRC procedures for positioning may comprise communicating one or more RRC message between the wireless device and the base station. The one or more RRC messages may comprise the RRC reconfiguration message; and/or an RRC Location Measurement Indication message; and/or (RRC) UE Positioning Assistance Info message; and/or (RRC) Inter-frequency RSTD measurement indication; and/or RRC system information message (e.g., SIBpos). For example, the base station may broadcast assistance data information/messages, received from the location server (e.g., via NRPPa messages of the one or more positioning messages), in positioning System Information messages. The one or more positioning messages may comprise posSIBs.

The wireless device may receive one or more configuration parameters (e.g., via a service cell and/or a base station). The one or more configuration parameters may comprise configurations indicated by the LPP messages (e.g., the one or more positioning messages) and/or the positioning SIBs and/or the one or more RRC messages and/or other SIBs (e.g., SIBx, x=1, 2, . . . , 19, . . . ).

An NG-RAN node (e.g., a base station of the one or more base stations) may control/mange several TRPs/TPs, such as remote radio heads, or DL-PRS-only TPs for support of PRS-based Terrestrial Beacon System (TBS). A gNB-DU may include TRP functionality where the TRP functionality may support functions for a TP, RP or both TP and RP. For example, a gNB-DU which includes TRP functionality may not offer cell services to the wireless device.

As shown in FIG. 17A, the location server may interact with a base station (e.g., gNB or TRP) in order to obtain location related information to support the positioning procedure (e.g., an NR RAT-Dependent positioning method/procedure), for example, via NR Positioning Protocol A (NRPPa). The assistance data may comprise the location related information. For example, the location related information may comprise timing information for a TRP (e.g., in relation to either absolute GNSS time or timing of other TRPs) and information about the supported cells and TRPs including DL PRS and/or sidelink (SL) PRS schedule. The TRP may be a reference TRP (e.g., an assistance data reference TRP) or a neighbor TRP (e.g., non-assistance data reference TRP). The reference TRP may be the serving TRP. The reference TRP may be a serving TRP that the wireless device is able to determine/obtain corresponding frame configuration (e.g., DL/UL frame configuration, e.g., SFN).

In some examples, the LMF may determine one or more positioning methods for the wireless device. The one or more positioning methods (or procedures) may be at least one of the following: network-assisted GNSS methods; observed time difference of arrival (OTDOA) positioning based on LTE signals; enhanced cell ID (E-CID/ECID) methods based on LTE signals; WLAN positioning; Bluetooth positioning; terrestrial beacon system (TBS) positioning; sensor based methods (e.g., barometric Pressure Sensor and/or motion sensor); NR enhanced cell ID methods (NR E-CID) based on NR signals; Multi-Round Trip Time Positioning (Multi-RTT based on NR signals); Downlink Angle-of-Departure (DL-AoD) based on NR signals; Downlink Time Difference of Arrival (DL-TDOA) based on NR signals; Uplink Time Difference of Arrival (UL-TDOA) based on NR signals; Uplink Angle-of-Arrival (UL-AoA), including A-AoA and Z-AoA based on NR signals; and/or NR carrier phase positioning (CPP) based on NR signals.

The DL-AoD positioning method/procedure may use measured DL-PRS-RSRP (and optionally DL-PRS-RSRPP (reference signal received path power)) of downlink signals (e.g., DL PRSs) received from multiple TPs/TRPs (e.g., the one or more TRPs), at the wireless device. The DL-TDOA positioning method may use measured DL RSTD (and optionally DL-PRS-RSRP and/or DL-PRS-RSRPP) of the downlink signals received from multiple TPs/TRPs, at the wireless device. The UL-TDOA positioning method may use uplink relative time of arrival (UL-RTOA) (and optionally UL-SRS-RSRP and/or UL-SRS-RSRPP) at multiple RPs/TRPs of uplink signals (e.g., SRS) transmitted from wireless device. The UL-AoA positioning method may use measured azimuth angle of arrival (A-AoA) and zenith angle of arrival (Z-AoA) at multiple RPs/TRPs of uplink signals (SRS) transmitted from the wireless device. The Multi-RTT positioning method may use measured UE Rx-Tx time difference measurements (and optionally DL-PRS-RSRP and/or DL-PRS-RSRPP) of the downlink signals received from multiple (e.g., one or more or at least one) TRPs (e.g., comprising the reference TRP and/or neighbor TRPs), measured by the wireless device and/or the measured gNB Rx-Tx time difference measurements (and optionally UL-SRS-RSRP and/or UL-SRS-RSRPP) at multiple TRPs of the uplink signals transmitted from wireless device. The NR CPP positioning method may use downlink reference signal carrier phase (DL RSCP), downlink reference signal carrier phase difference (DL RSCPD), and/or uplink reference signal carrier phase (UL RSCP).

The measurements (e.g., to perform the positioning procedure of the one or more positioning procedures) at the wireless device may comprise the DL-PRS-RSRP measurement(s) of the (received) downlink signals and/or the DL-PRS-RSRPP measurement(s) of the (received) downlink signals and/or the DL RSTD measurement(s) of the received signals and/or the UE Rx-Tx time difference measurements of the received signals and/or DL RSCP measurement(s) of the received downlink signals and/or DL RSCPD measurement(s) of the received downlink signals. The measurements of the downlink signals at the wireless device may be based on the assistance data (received from the positioning server).

The measurements (e.g., to perform the positioning procedure) at the base station(s)/RPs/TRPs may comprise the UL-SRS-RSRP measurement(s) of uplink signals (e.g., SRS) and/or the UL-SRS-RSRPP measurement(s) of the uplink signals and/or the gNB Rx-Tx time difference measurements and/or UL-RTOA measurements of the uplink signals and/or A-AoA and/or Z-AoA measurement(s) of the uplink signals and/or UL RSCP measurement(s) of the uplink signals.

The positioning procedure (e.g., at the wireless device and/or the base station) may be a hybrid positioning using the one or more positioning methods from the list of positioning methods above. The positioning procedure may be a UE-based positioning procedure, a UE-assisted/LMF-based positioning procedure, and/or an NG-RAN node assisted positioning procedure.

For example, the positioning procedure may require the base station (e.g., gNB) measurements. The NG-RAN (e.g., the base station) may utilize the one or more positioning methods (e.g., listed above) in order to determine the position of the wireless device. As shown in FIG. 17A, as part of the positioning procedure, the LMF may interact/communicate with the base station via the NRPPa to support the positioning method (or procedure), e.g., by transmitting/receiving the one or more positioning messages. The one or more positioning messages may comprise NRPPa messages.

Figure 17B:
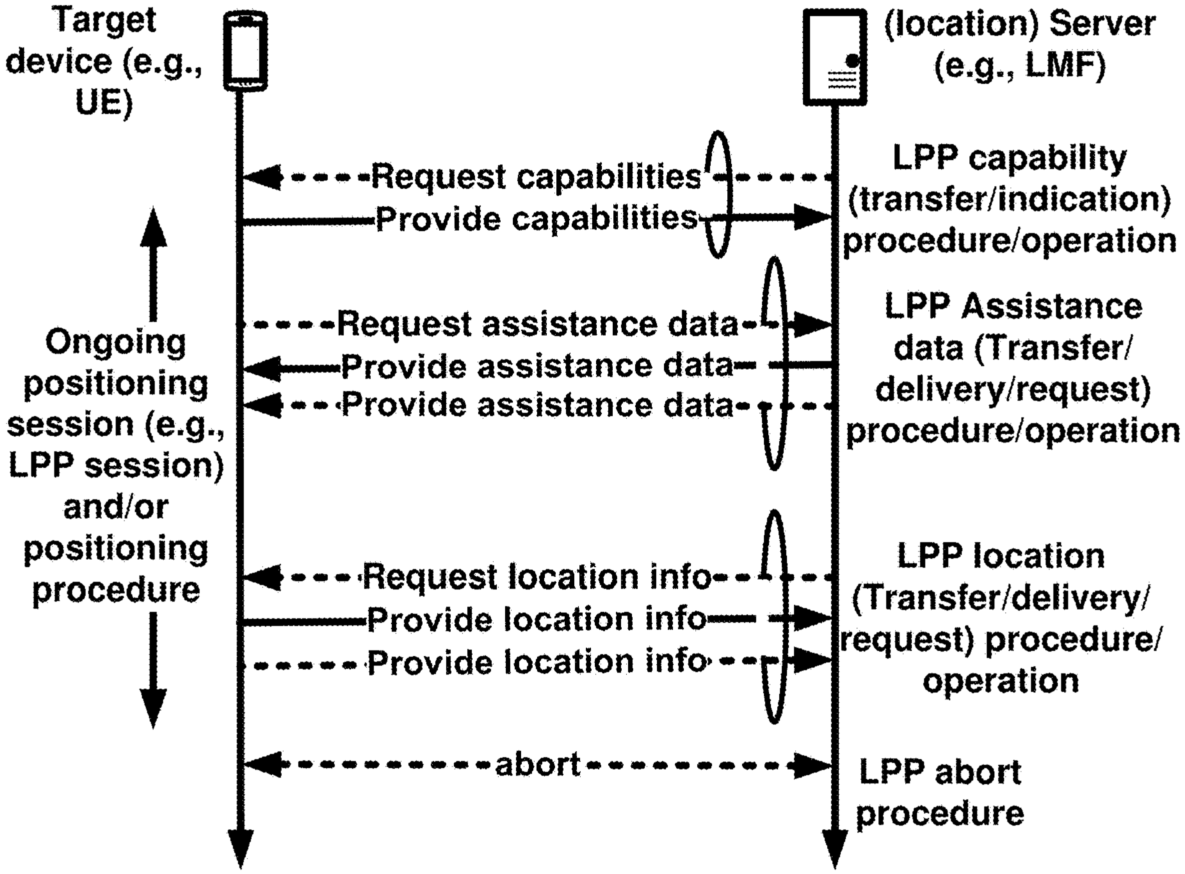
FIG. 17B illustrates an example of LTE positioning protocol (LPP) messages and LPP procedures as per an aspect of an embodiment of the present disclosure.

FIG. 17B shows an example of LPP messages and LPP procedures as per an aspect of an embodiment of the present disclosure. The interaction/communication between the wireless device and the location server may comprise communicating LPP messages of the one or more positioning messages, e.g., during the (ongoing) positioning procedure. As shown in FIG. 17B, the positioning procedure (and/or the positioning session) may comprise at least one of the following: a capability procedure (e.g., an LPP capability procedure); and/or an (LPP) assistance data procedure; and/or a location procedure (e.g., an LPP location procedure); and/or an (LPP) abort (or cancel or terminate) procedure. The purpose of the abort procedure may be to allow the wireless device or the location server to abort the (ongoing) positioning procedure (e.g., cancellation of a location request by an LCS client). For example, the abort procedure may stop (or terminate or finish) the (ongoing) positioning procedure.

The capability procedure may be (or comprise) an LPP capability transfer procedure. The server may send/transmit request capabilities (e.g., RequestCapabilities) message of the one or more positioning messages to the wireless device. For example, the wireless device may transmit provide capabilities (e.g., ProvideCapabilities) message to the location server (e.g., in response to the request capabilities message). Upon receiving the RequestCapabilities message, the wireless device may generate the ProvideCapabilities message. For each positioning method for which a request for capabilities is included RequestCapabilities message and if the wireless device supports the requested positioning method, the wireless device may include the capabilities of the wireless device for the supported positioning method in the ProvideCapabilities message. In some implementations, the capability procedure may be an LPP capability indication procedure allowing the wireless device to provide unsolicited capabilities (e.g., to transmit the ProvideCapabilities message) to the location server (e.g., without receiving the request capability message).

The assistance data procedure may comprise one or more (LPP) procedures related to assistance data transfer. The assistance data procedure may enable/allow the wireless device to request assistance data (e.g., by transmitting a request assistance data message of the one or more positioning messages) from the location server to assist in positioning corresponding to the positioning procedure. The location server may respond with a provide assistance data (e.g., ProvideAssistanceData) message (of the one or more positioning messages) to the wireless device containing/comprising (requested) assistance data. The assistance data procedure may be a periodic assistance data transfer procedure. The assistance data procedure may enable/allow the location server to transfer assistance data to the wireless device in the absence of a request of assistance data (e.g., without receiving a request assistance data message or an assistance data delivery procedure).

For example, assistance data that may be transferred from the location server to the wireless device (e.g., via the one or more positioning messages) may comprise at least one of the following: cell information (e.g., Physical cell IDs (PCIs), global cell IDs (GCIs), and PRS IDs, ARFCNs of candidate NR TRPs for measurement); and/or Timing relative to the TRP of the candidate NR TRPs; and/or DL-PRS configuration of candidate NR TRPs (e.g., as shown in FIG. 21A); and/or SSB information of the (one or more) TRPs (the time/frequency occupancy of SSBs); and/or PRS-only TP indication; On-Demand DL-PRS-Configurations; Validity Area of the Assistance Data. The candidate NR TRPs may comprise the one or more TRPs.

The location procedure may comprise procedures related to location information transfer/report. The location procedure may enable/allow the location server to request location measurement data (or positioning measurements or measurements or positioning measurement data) and/or a location estimate from the wireless device. The location server may send a request location information (e.g., RequestLocationInformation) message (of the one or more positioning messages) to the wireless device to request location information (e.g., indicating a type of location information needed and potentially an associated QoS). The request location information message may indicate a request for the location information/position (or measurements of the positioning procedure) of the wireless device. The wireless device may (in response to the request location information message) send/transmit a provide location information (e.g., ProvideLocationInformation) message (of the one or more positioning messages) to the location server to transfer the location information data (or simply location data or location information or location). For example, the location procedure may enable/allow the wireless device to transfer/transmit/send the (unsolicited) location measurement data and/or the location estimate to the location server in the absence of a request of location measurement data from the location server (e.g., the location information delivery procedure). The location procedure may comprise (periodically) transmitting/sending location information report(s) (e.g., comprising the location information data) to the location server by the wireless device.

FIG. 18A shows an example of request capabilities message. The request capabilities message (of the one or more positioning messages) may indicate types of capability needed for the ongoing positioning procedure. The RequestCapabilities message body in a LPP message (e.g., the request capabilities message) of the LPP messages is used by the location server to request the wireless device capability information for LPP and the supported individual positioning methods. The request capabilities message may comprise RequestCapabilities-r9-IEs indicating one or more capabilities, e.g., common request capabilities (e.g., commonIEsRequestCapabilities), and/or NR ECID request capabilities (e.g., nr-ECID-RequestCapabilities-r16), and/or NR multi-RTT request capabilities (e.g., nr-Multi-RTT-RequestCapabilities-r16), and/or NR DL TDOA request capabilities (e.g., nr-DL-TDOA-RequestCapabilities-r16), and/or NR UL request capabilities (e.g., nr-UL-RequestCapabilities-r16), and/or the like. The RequestCapabilities-r9-les may indicate other capabilities (e.g., a-gnss-RequestCapabilities and/or wlan-RequestCapabilities-r13, and/or the like) not shown in FIG. 18A.

FIG. 18B shows an example of providing capabilities message. The provide capabilities message (of the one or more positioning messages) may indicate types of capability needed for the ongoing positioning procedure (e.g., for each positioning method whose capabilities are to be indicated or request by the request capabilities). The ProvideCapabilities message body in an LPP message (e.g., the provide capabilities message) may indicate the LPP capabilities of the wireless device to the location server. The provide capabilities message may comprise ProvideCapabilities-r9-les indicating one or more capabilities, e.g., common provide capabilities (e.g., commonIEsProvideCapabilities), and/or NR ECID request capabilities (e.g., nr-ECID-ProvideCapabilities-r16), and/or NR multi-RTT request capabilities (e.g., nr-Multi-RTT-ProvideCapabilities-r16), and/or NR DL TDOA request capabilities (e.g., nr-DL-TDOA-ProvideCapabilities-r16), and/or NR UL request capabilities (e.g., nr-UL-ProvideCapabilities-r16), and/or the like. The ProvideCapabilities-r9-les may indicate other capabilities (e.g., a-gnss-ProvideCapabilities and/or wlan-ProvideCapabilities-r13, and/or the like) not shown in FIG. 18A.

FIG. 18C shows an example of request assistance data message. The request assistance data message (of the one or more positioning messages) may comprise RequestAssistanceData-r9-les comprising at least one of the following, e.g., common request assistance data (e.g., commonIEsRequestAssistanceData), and/or NR multi-RTT request assistance data (e.g., nr-Multi-RTT-RequestAssistanceData-r16), and/or NR DL TDOA request assistance data (e.g., nr-DL-TDOA-RequestAssistanceData-r16), and/or NR DL AoD request assistance data (e.g., nr-DL-AoD-RequestAssistanceData-r16), and/or the like. For example, the request assistance data message (e.g., CommonIEsRequestAssistanceData) may comprise/indicate a primary cell ID/index (e.g., primaryCellID) indicating a primary cell of the wireless device. A provide assistance data message (of the one or more positioning messages) may comprise ProvideAssistanceData-r9-les comprising at least one of the following, e.g., common provide assistance data (e.g., commonIEsProvideAssistanceData), and/or NR multi-RTT provide assistance data (e.g., nr-Multi-RTT-ProvideAssistanceData-r16, see FIG. 20A for an example), and/or NR DL TDOA provide assistance data (e.g., nr-DL-TDOA-ProvideAssistanceData-r16), and/or NR DL AoD provide assistance data (e.g., nr-DL-AoD-ProvideAssistanceData-r16), and/or the like.

A request location information message (of the one or more positioning messages) may comprise RequestLocationInformation-r9-les comprising at least one of the following, e.g., common request location information (e.g., commonIEsRequestLocationInformation, see FIG. 19 for an example), and/or NR multi-RTT request location information (e.g., nr-Multi-RTT-RequestLocationInformation-r16), and/or NR DL TDOA request location information (e.g., nr-DL-TDOA-RequestLocationInformation-r16), and/or NR DL AoD request location information (e.g., nr-DL-AoD-RequestLocationInformation-r16), and/or the like.

FIG. 19 shows an example of configuration parameters of a request location information. The request location information may comprise the common request location information (e.g., commonIEsRequestLocationInformation). As shown in FIG. 19, the common request location information (e.g., commonIEsRequestLocationInformation) may comprise at least one of the following: locationInformationType (e.g., whether the location server requires the location estimate or the measurements); and/or a triggered reporting (e.g., triggeredReporting); and/or a periodic reporting (e.g., periodicalReporting); and/or an additional information; and/or a response time (e.g., responseTime or responseTimeNB); and/or a scheduled location time (e.g., scheduledLocationTime).

The additional information may indicate whether the wireless device is allowed to transmit/send additional information (e.g., besides requested information) to the location server. If the additional information indicates 'onlyReturnInformationRequested', the wireless device may not return (or transmit) any additional information to the location server. If additional information indicates 'mayReturnAdditionalInformation', the wireless device may return (or transmit) additional information to the location server. The additional information may comprise a velocity (e.g., corresponding to the location estimate) and/or E-CID measurements.

The triggered reporting may indicate that triggered reporting is requested (by the location service). For example, the triggered reporting may indicate/configure one or more reporting triggers/criteria (e.g., via TriggeredReportingCriteria) for (performing/triggering) the location (transfer/delivery) procedure. The triggered reporting may comprise cellChange and reportingDuration. If the cellChange field of the triggered reporting is set to 'TRUE', the wireless device may transmit the (requested) location information each time the primary cell changes (e.g., due to handover procedure), e.g., the one or more reporting triggers may comprise the (primary) cell change. The reportingDuration may indicate a maximum duration of the triggered reporting (e.g., in seconds/milliseconds). A value of zero of the reportingDuration may indicate an unlimited (i.e., "infinite") duration. In an example, the wireless device may continue transmitting/sending the location information (or the location data/positioning measurements) to the location server (e.g., based on the one or more reporting triggers) for the reportingDuration or until the ongoing positioning procedure being aborted/canceled/stopped (e.g., in response to the abort message or an error message of the one or more positioning message). The wireless device may ignore the triggeredReporting field of the commonIEsRequestLocationInformation if the commonIEsRequestLocationInformation comprises/configures at least one of the following: the perioding reporting (e.g., periodicalReporting IE) and/or the response time (e.g., responseTime IE or responseTimeNB IE).

The periodic reporting (e.g., periodicalReporting) may indicate that periodic reporting (of the location information data/measurements) is requested by the location server. The periodic reporting may comprise a reporting amount (e.g., reportingAmount) and/or a reporting interval (e.g., reportingInterval). The reporting amount may indicate a number of the (periodic) location information data/reports. If the reporting amount is 'infinite/indefinite', the wireless device may continue periodic reporting of the location information (to the location server) until the abort message is received from the location server. The reporting interval may indicate an interval between the (consecutive) location information reports and/or a response time requirement for a first/starting/initial/earliest location information report. For example, the location information reports (or measurement reports) may contain no measurements or no location estimate when a reporting interval expires before the wireless device is able to obtain new measurements or obtain a new location estimate.

The response time may comprise at least one of the following: a time; and/or a response TimeEarlyFix; and/or a unit. The time may indicate a maximum/largest/greatest response time (e.g., based on the indicated unit or seconds) as measured between receipt of the RequestLocationInformation message and transmission of the ProvideLocationInformation message. The response TimeEarlyFix may indicate a maximum/largest/greatest response time (e.g., based on the indicated unit or seconds) as measured between receipt of the RequestLocationInformation message and transmission of the ProvideLocationInformation message containing an early location measurement or an early location estimate.

The scheduledLocationTime may indicate that the wireless device is requested (by the location server) to obtain the location information data (or the positioning/location measurements or location estimate) valid at the scheduledLocationTime $T_{scheduledLocationTime}$. $T_{scheduledLocationTime}$ may be in UTC format, or GNSS system time, or a network time (e.g., networkTime, e.g., in a E-UTRA or NR network time, or a relativeTime (e.g., $T_{scheduledLocationTime}$ in seconds from current time, where current time is defined as the time the CommonIEsRequestLocationInformation is received). The NR network time may be based on system frame number (nr-SFN) and/or a (physical) cell ID/identity (e.g., nr-PhysCellID, nr-ARFCN, nr-CellGlobalID) and/or a slot number (e.g., nr-Slot for an indicated subcarrier spacing (SCS), e.g., the NR network time may be nr-SFN+nr-Slot.

The provide location information message may comprise ProvideLocationInformation-r9-les comprising at least one of the following, e.g., common provide location information (e.g., commonIEsProvideLocationInformation), and/or NR multi-RTT provide location information (e.g., nr-Multi-RTT-ProvideLocationInformation-r16), and/or NR DL TDOA provide location information (e.g., nr-DL-TDOA-ProvideLocationInformation-r16), and/or NR DL AoD provide location information (e.g., nr-DL-AoD-ProvideLocationInformation-r16), and/or the like.

For example, the provide location information message (e.g., IE NR-Multi-RTT-ProvideLocationInformation) may comprise signal measurement information configuration(s) (e.g., NR-Multi-RTT-SignalMeasurementInformation and/or NR-DL-TDOA-SignalMeasurementInformation-r16 and/or NR-DL-AoD-SignalMeasurementInformation-r16 and/or the like). The signal measurement information configurations may comprise at least one of the following: nr-NTA-Offset (e.g., $N_{TAoffset}$ used by the wireless device); and/or SRS for Positioning Resources associated with a UE Tx time error group (TEG); and/or a list of multi-RTT measurement elements (e.g., nr-Multi-RTT-MeasList-r16 or nr-AdditionalPathListExt-r17). Each multi-RTT measurement element (e.g., NR-Multi-RTT-MeasElement-r16 or NR-Multi-RTT-AdditionalMeasurementElement-r16) of the list of multi-RTT measurement elements may comprise at least one of the following: associated/corresponding nr-UE-RxTxTimeDiff (indicating a UE Rx-Tx time difference measurement); and/or associated/corresponding PRS configuration (e.g., comprising dl-PRS-ID and/or a DL-PRS Resource Set ID and a DL-PRS Resources ID); and/or associated/corresponding additional measurements (e.g., nr-DL-PRS-RSRP-Result-r16); and/or associated/corresponding time stamp (e.g., nr-TimeStamp-r16). The dl-PRS-ID and/or the DL-PRS Resource Set ID and the DL-PRS Resources ID may uniquely identify a DL-PRS Resource. The dl-PRS-ID may be associated with multiple DL-PRS Resource Sets associated with a single TRP (e.g., the reference TRP or a neighbor TRP). Each TRP (e.g., the reference TRP or a neighbor TRP) may only be associated with one the dl-PRS-ID. Each multi-RTT measurement element may correspond to a path (a first/initial detected path or an additional detected path) and/or the TEG. Each multi-RTT measurement element may comprise accompanied DL-PRS RSRP measurements and/or LOS-NLOS indicator.

The UE Rx-Tx (or reception-transmission) time difference measurement may be measured/calculated/determined (by the wireless device) as TUE-RX-TUE-TX, wherein TUE-RX is the received timing of downlink subframe #i (at the wireless device) from a TRP/TP (e.g., corresponding to the PRS configuration identified by the dl-PRS-ID and/or the DL-PRS Resource Set ID and the DL-PRS Resources ID) defined by the first detected path in time and TUE-TX is the transmit timing of uplink subframe #j (at the wireless device) that is closest in time to the subframe #i received from the TP/TP. The wireless device may (corresponding to the first detected path) receive/measure DL PRS of the PRS configuration (e.g., corresponding to the dl-PRS-ID and/or the DL-PRS Resource Set ID and the DL-PRS Resources ID) during/within downlink subframe #i. The wireless device may transmit SRS (for positioning) during/with the uplink subframe #j.

FIG. 20A shows an example of configuration parameters of the provide assistance data message. The provide assistance data message (of the one or more positioning message) may comprise the multi-RTT provide assistance data (NR-Multi-RTT-ProvideAssistanceData) message and/or the DL-TDOA provide assistance data (NR-DL-TDOA-ProvideAssistanceData) message. As shown in FIG. 20A, the provide assistance data message may comprise a cell list of a network area (e.g., IE AreaID-CellList). The cell list of the network area may provide (NR) Cell-IDs (e.g., nr-PhysCellID-r17) of the multiple TRPs belonging to the network area where the (associated) assistance data are valid (e.g., indicated by the corresponding provide assistance data message). The provide assistance data message may comprise one or more PRS configuration parameters. The one or more PRS configuration parameters may comprise at least one of the following: DL PRS assistance data (e.g., nr-DL-PRS-AssistanceData-r16) and/or nr-SelectedDL-PRS-IndexList (indicating DL-PRS Resources applicable for the NR-Multi-RTT-ProvideAssistanceData message) and/or nr-On-Demand-DL-PRS-Configurations (indicating a set of available DL-PRS configurations requested by the wireless device on-demand) and/or nr-On-Demand-DL-PRS-Configurations-Selected-IndexList (indicating available on-demand DL-PRS configurations applicable for the NR-Multi-RTT-ProvideAssistanceData message). For example, the wireless device may request the nr-On-Demand-DL-PRS-Configurations by transmitting the request assistance data message (e.g., NR-Multi-RTT-RequestAssistanceData-r16) to the location server. If DL PRS assistance data (e.g., nr-DL-PRS-AssistanceData-r16) is absent but the nr-SelectedDL-PRS-IndexList field is present, the nr-DL-PRS-AssistanceData may be provided in IE NR-DL-TDOA-ProvideAssistanceData or NR-DL-AoD-ProvideAssistanceData.

FIG. 20B shows an example of configuration parameters of the request assistance data message. For example, the request assistance data message may comprise the NR-Multi-RTT-RequestAssistanceData-r16. Although not shown in FIG. 20B, similar configurations (to the configurations of FIG. 20B) for NR-DL-TDOA-RequestAssistance-Data and/or NR-DL-AoD-RequestAssistanceData or the like may exist. The request assistance data message may comprise at least one of the following: nr-PhysCellID (e.g., the NR physical cell identity of the (current) primary cell of the wireless device); and/or nr-AdType (e.g., indicating the requested assistance data and/or configuration: nr-DL-PRS-AssistanceData, for PRS assistance data, or UL SRS configuration, for SRS configuration); and/or the nr-on-demand-DL-PRS-Request-r17; and/or the nr-DL-PRS-ExpectedAoD-or-AoA-Request-r17 (indicating that IE NR-DL-PRS-ExpectedAoD-or-AoA in NR-DL-PRS-AssistanceData is requested); and/or the pre-configured-AssistanceDataRequest-r17 (indicating that the wireless device requests pre-configured assistance data with the area validity, e.g., the network area); and/or the like. For example, when the nr-AdType of the request assistance data message indicates nr-DL-PRS-AssistanceData, the wireless device/base station may request (from the location server) configuration of the PRS for the positioning procedure.

FIG. 21A, FIG. 21B, and FIG. 22 show examples of configuration parameters of downlink (DL) positioning reference signal (PRS). For example, the one or more configuration parameters may comprise the configuration parameters of the DL PRS (e.g., one or more DL PRS configuration parameters). The DL PRS may sometimes be called simply the PRS. The one or more DL PRS configuration parameters may comprise one or more DL PRS resource set configuration(s) (e.g., indicated by IE NR-DL-PRS-ResourceSet and NR-DL-PRS-Resource in FIG. 22). The one or more DL PRS resource set configuration(s) may configure one or more DL PRS resource sets. The one or more DL PRS resource sets may comprise one or more collections (or lists or sets or subsets) of DL PRS resource sets. Each collection of DL PRS resource sets (of the one or more collections of DL PRS resource sets) may correspond to (or associated with) a DL PRS positioning frequency layers of one or more DL PRS positioning frequency layers. A collection of DL PRS resource sets may comprise one or more first DL PRS resource sets (e.g., configured via nr-DL-PRS-Resource-SetList of the nr-DL-PRS-Info), e.g., corresponding to a TRP (e.g., the reference TRP or a neighbor TRP), e.g., DL PRS resources sets of the TRP. For example, a DL PRS resource set of the one or more DL PRS resource sets may correspond to a (unique) nr-DL-PRS-ResourceSetID).

The one or more DL PRS configuration parameters may configure/indicate DL-PRS configuration (e.g., DL PRS resources and/or DL PRS resource sets) corresponding to the multiple (e.g., the one or more) TRPs (e.g., comprising the reference TRP and/or at least one neighbor TRP). The DL PRS assistance data (e.g., nr-DL-PRS-AssistanceData-r16) may (implicitly or explicitly) indicate/configure the assistance data reference TRP (e.g., the reference TRP) and/or the at least one neighbor TRP.

As shown in FIG. 21A, the DL PRS assistance data comprises IE nr-DL-PRS-ReferenceInfo that indicates ID(s) of the reference TRP. FIG. 21B shows configuration parameter(s) of a PRS reference information (e.g., the IE DL-PRS-ID-Info). For example, the IE DL-PRS-ID-Info may configure/indicate one or more IDs (or indexes or identifications or indices) of the reference TRPs' PRS Resource(s) and/or PRS resource set(s) of the one or more PRS resource sets. The one or more IDs may indicate IDs of DL PRS Resource(s) and/or DL PRS resource set(s) that are associated with the reference TRP. The DL-PRS-ID-Info (e.g., via nr-DL-PRS-ResourceID-List-r16) indicates/configures a list of DL-PRS Resource IDs under a same DL-PRS Resource Set (e.g., indicated/configured by nr-DL-PRS-Resource-SetID-r16), e.g., a list of PRS resource(s) that are associated with a PRS resource set with index/ID of nr-DL-PRS-ResourceSetID-r16. The wireless device may, using the IE DL-PRS-ID-Info (e.g., dl-PRS-ID and/or the one or more IDs and/or the nr-DL-PRS-ResourceSetID), determine/distinguish/identify the reference TRP. The wireless device may use DL PRS resource(s) corresponding to the IE DL-PRS-ID-Info as a reference for the DL RSTD, DL PRS-RSRP, DL PRS-RSRPP, and UE Rx-Tx time difference measurements. In some examples, the wireless device may use different DL PRS resources or a different DL PRS resource set (e.g., than the DL PRS resource(s) corresponding to the IE DL-PRS-ID-Info) to determine the reference for the RSTD measurement. If the wireless device chooses to use a different reference than indicated by the IE DL-PRS-ID-Info, the wireless device may report/transmit (e.g., via the LPP messages, e.g., the provided location info message) to the location server the dl-PRS-ID, the DL PRS resource ID(s) or the DL PRS resource set ID used to determine the reference.

As shown in FIG. 21A, the one or more PRS configuration parameters (e.g., the DL PRS assistance data (e.g., nr-DL-PRS-AssistanceData-r16)) may configure/indicate (e.g., via nr-DL-PRS-AssistanceDataList-r16) one or more DL PRS positioning frequency layers (e.g., via IE nr-DL-PRS-AssistanceDataList). Each DL PRS positioning frequency layer (of the one or more DL PRS positioning frequency layers) may define/configure/indicate a collection of DL PRS resource sets of the one or more collections of DL PRS resource sets (e.g., via nr-DL-PRS-Info in NR-DL-PRS-AssistanceDataPerTRP). For example, NR-DL-PRS-PositioningFrequencyLayer may comprise common parameters that are shared across the collection of the DL PRS resource sets per each frequency layer. In an example, a DL PRS positioning frequency layer (e.g., that is configured by NR-DL-PRS-PositioningFrequencyLayer) may configure/indicate at least one of the following: dl-PRS-Subcarrier-Spacing (indicating a subcarrier spacing for a (corresponding) DL PRS resource; and/or a dl-PRS-CyclicPrefix indicating a cyclic prefix for the DL PRS resource; and/or dl-PRS-PointA indicating an absolute frequency of a reference resource block; and/or dl-PRS-ResourceBandwidth indicating a number of PRBs allocated for the DL-PRS Resource (allocated DL-PRS bandwidth); and/or the like.

As shown in FIG. 21A, a dl-PRS-ID corresponding to a DL PRS positioning frequency layer (e.g., via NR-DL-PRS-AssistanceDataPerTRP of the NR-DL-PRS-AssistanceData-PerFreq) may correspond (or associate with) multiple DL PRS resource sets (or a collection of DL PRS resource sets) via IE DL-PRS-Info.

As shown in FIG. 22, a DL PRS resource set (with/corresponding to nr-DL-PRS-ResourceSetID), e.g., of the multiple DP PRS resource sets (or the collection of DL PRS resource sets), may comprise of a list of DL PRS resource(s) (e.g., via IE dl-PRS-ResourceList). The DL PRS resource set may correspond to a dl-PRS-ID and/or nr-PhysCellID (and/or nr-CellGlobalID and/or nr-ARFCN) as indicated by the NR-DL-PRS-AssistanceDataPerTRP in FIG. 21A. Each DL PRS resource of the list of DL PRS resource(s) may correspond to a nr-DL-PRS-ResourceID and/or an associated spatial transmission filter (e.g., configured by dl-PRS-QCL-Info). The wireless device may expect that one of these dl-PRS-ID along with a nr-DL-PRS-ResourceSetID and a nr-DL-PRS-ResourceID-r16 uniquely identify a DL PRS resource (and/or an associated TRP).

For example, the dl-PRS-QCL-Info may configure/indicate SSB(s) (or other RS signal(s)) that are quasi-collocated with a DL PRS resource of the list of DL PRS resource(s) and/or a type of the QCL (e.g., rs-Type). For example, the dl-PRS-QCL-Info may indicate physical cell ID of the SSB(s).

In some examples, the DL PRS (corresponding to a DL PRS resource set or a DL PRS resource) is transmitted via/from a serving cell (e.g., a TRP of the serving cell, e.g., the reference TRP or a neighbor TRP) or a non-serving cell (e.g., a TRP of the non-serving cell, e.g., a neighbor TRP). If nr-PhysCellID or nr-CellGlobalID is provided, and if nr-PhysCellID, nr-CellGlobalID and nr-ARFCN associated with the dl-PRS-ID, if provided, are the same as the corresponding information of a serving cell, the wireless device may assume/determine that the DL PRS is transmitted from the serving cell; otherwise the wireless device may assume/determine that the DL PRS is not transmitted from/via the serving cell (e.g., is transmitted via/from the non-serving cell). If the wireless device assumes/determines that the DL PRS is transmitted from the serving cell, and if the serving cell is the same as the serving cell defined by the SS/PBCH block of the corresponding DL PRS resource, the wireless device may assume/determine that the DL PRS and the SS/PBCH block are transmitted from/via the same serving cell. If the assumes/determines that the DL PRS is not transmitted from the serving cell, and if nr-PhysCellID is provided, and is the same as physical cell ID of the SS/PBCH block from the non-serving cell of the same band as the DL PRS, the wireless device may assume/determine that the DL PRS and the SS/PBCH block are transmitted from/via the same non-serving cell.

The wireless device may assume that the DL PRS from the serving cell is not mapped to any symbol that contains SS/PBCH block from the serving cell. If the time frequency location of the SS/PBCH block transmissions from non-serving cells are provided to the wireless device (e.g., via the LPP messages or RRC messages), the wireless device may assume that the DL PRS from the non-serving cell is not mapped to any symbol that contains the SS/PBCH block of the same non-serving cell.

Figure 23A:
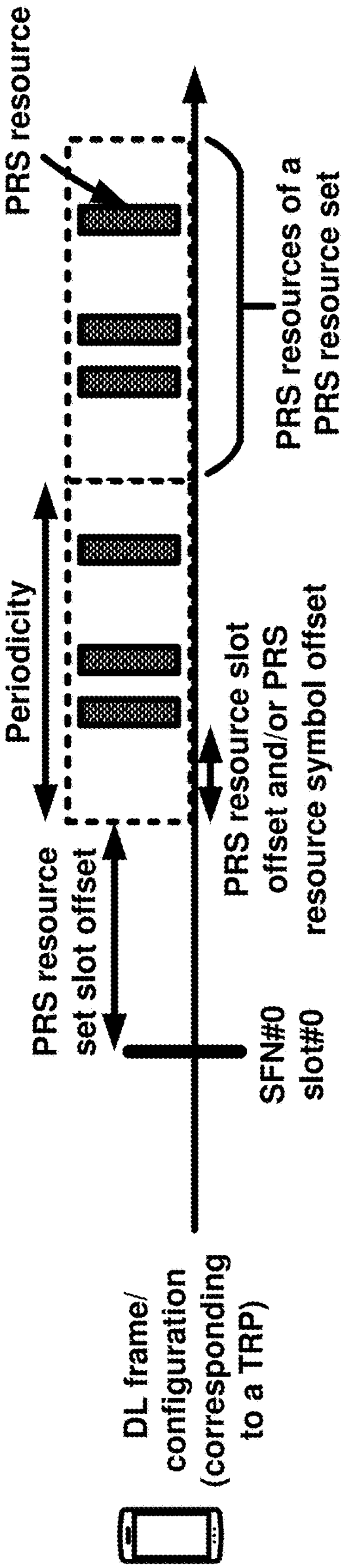
FIG. 23A illustrates an example of configuration of DL PRS resource set with respect to a DL frame (corresponding to a TRP) of the wireless device as per an aspect of an embodiment of the present disclosure.

FIG. 23A shows an example of configuration of DL PRS resource set with respect to a DL frame (corresponding to a TRP) of the wireless device. The PRS resources of a DL PRS resource set (of the collection of the DL PRS resource sets), corresponding to a TRP (e.g., the reference TRP or a neighbor TRP), may comprise time/frequency resources for measuring the DL PRSs. As shown in FIG. 22, a DL PRS resource set (of the collection of the PRS resource sets) may comprise at least one of the following: a corresponding nr-DL-PRS-ResourceSetID defining/indicating an identity (or ID) of the DL PRS resource set (configuration); and/or a periodicity and resource set slot offset (e.g., dl-PRS-Periodicity-and-ResourceSetSlotOffset); and/or a PRS resource repetition factor (e.g., dl-PRS-ResourceRepetitionFactor) defining/indicating how many times each DL-PRS resource is repeated for a single instance of the DL-PRS resource set (e.g., to improve reliability of measurements); and/or a PRS resource gap (e.g., dl-PRS-ResourceTimeGap) defining/indicating a time/gap (or an offset) in number of slots between two repeated instances of a DL PRS resource with the same nr-DL-PRS-ResourceID within a single instance of the DL PRS resource set; and/or at least one muting option (e.g., dl-PRS-MutingOption1 and/or dl-PRS-MutingOption2) defining/indicating time locations where the DL PRS resource is expected to not be transmitted for a DL PRS resource set; and/or dl-PRS-NumSymbols defining/indicating number of symbols of the DL PRS resource within a slot. As shown in FIG. 23A, the periodicity and resource set slot offset (e.g., dl-PRS-Periodicity-and-ResourceSetSlotOffset) may define/indicate a (DL PRS resource) periodicity (e.g., corresponding to dl-PRS-SubcarrierSpacing) and a slot offset for DL PRS resource set, e.g., with respect to SFN0 slot 0 of a corresponding TRP (e.g., the reference TRP or a neighbor TRP). DL PRS resources (e.g., configured by dl-PRS-ResourceList) within the DL PRS resource set are configured with the same DL PRS resource periodicity. As shown in FIG. 21A, the (corresponding TRP) may be a PRS-only TP/TRP, e.g., when field prs-OnlyTP of the NR-DL-PRS-AssistanceDataPerTRP (of the TRP) is present. When the field prs-OnlyTP of the NR-DL-PRS-AssistanceDataPerTRP (of the TRP) is present, the wireless device may not assume that any other signals or physical channels are present for the TRP other than DL-PRS. A PRS from a PRS-only TP may be treated/consider as PRS from a non-serving cell.

FIG. 22 also shows an example of configuration parameters of a DL PRS resource of a DL PRS resource set of the collection of the PRS resource sets (e.g., NR-DL-PRS-Resource). For example, the of configuration parameters of a DL PRS resource of the DL PRS resource set may comprise at least one of the following: a nr-DL-PRS-ResourceID determining/indicating the DL PRS resource configuration identity; and/or dl-PRS-SequenceID used in pseudo random generator for generation of DL PRS sequence for a given DL PRS resource; and/or dl-PRS-CombSizeN-AndReOffset defining/indicating a starting RE offset of a first symbol within a DL PRS resource in frequency; and/or a PRS resource slot offset (e.g., dl-PRS-ResourceSlotOffset) determining/indicating/defining a starting slot of the DL PRS resource with respect to corresponding DL PRS resource set slot offset (e.g., see FIG. 23A); and/or a PRS resource symbol offset (e.g., dl-PRS-ResourceSymbolOffset) determining/indicating/defining a starting symbol of a slot configured with the DL PRS resource; and/or dl-PRS-QCL-Info defining any quasi co-location information of the DL PRS resource with other reference signals (e.g., SSBs).

Figure 23B:
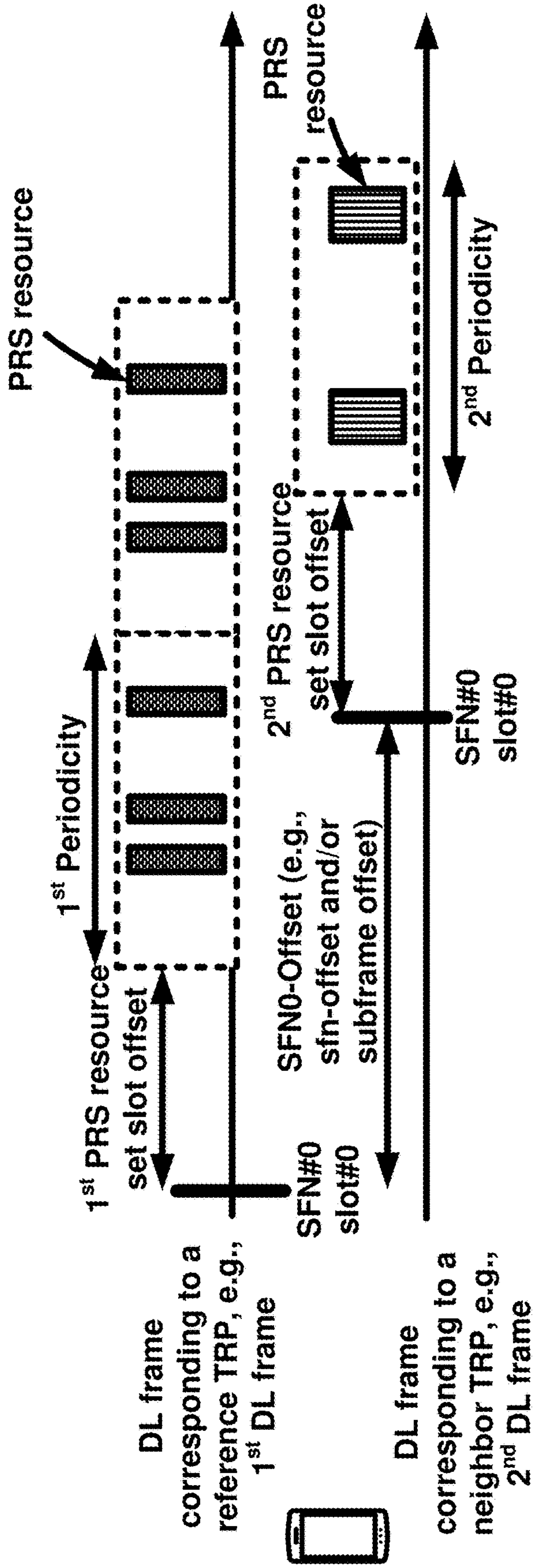
FIG. 23B illustrates an example of configurations of DL PRS resource sets corresponding to TRPs as per an aspect of an embodiment of the present disclosure.

FIG. 23B shows an example of configurations of DL PRS resource sets corresponding to TRPs. For example, a first DL frame of the wireless device may correspond to a first TRP (e.g., the reference TRP). A second DL frame (or configuration) of the wireless device with respect to a second DL frame corresponding to a second TRP (e.g., a neighbor TRP). As shown in FIG. 21A, the one or more PRS configuration parameters (e.g., the DL PRS assistance data) may configure/indicate an SFN0-Offset (e.g., NR-DL-PRS-SFN0-Offset) per a TRP (e.g., the first TRP or the second TRP). As shown in FIG. 21A, the SFN0-Offset may comprise a sfn-offset and/or a subframe offset (e.g., integerSubframeOffset). The sfn-offset of the SFN0-Offset may indicate/specify an SFN offset at the TRP antenna location between the assistance TRP and the neighbor TRP. The sfn-offset of the SFN0-Offset may correspond to a number of full radio frames counted from the beginning/starting/initial/earliest of a radio frame #0 of/associated with the assistance TRP to a beginning starting/initial/earliest of a closest subsequent radio frame #0 of the neighbor TRP. The integerSubframeOffset of the SFN0-Offset may specify/indicate a frame boundary offset at the TRP antenna location between the assistance TRP and the neighbor TRP counted in full subframes. The integerSubframeOffset of the SFN0-Offset may correspond to a number of full subframes counted from the beginning/starting/initial/earliest of a subframe #0 of the assistance TRP to the beginning/starting/initial/earliest of a closest subsequent subframe #0 of the neighbor TRP. The location server may set/configure/determine the value of the SFN0-Offset (e.g., sfn-offset and/or IntegerSubframeOffset) in accordance with a search window for the wireless device (e.g., using nr-DL-PRS-ExpectedRSTD and nr-DL-PRS-ExpectedRSTD-Uncertainty of the DL PRS assistance data).

For example, for the reference TRP the corresponding SFN0-Offset (or the sfn-offset and/or the subframe offset) may be 0. For each neighbor TRP (e.g., the second TRP) the corresponding SFN0-Offset may indicate a relative SFN offset with respect to the SFN #0 slot #0 (or SFN0 slot 0 or SFN 0) of the reference TRP, e.g., a time offset (e.g., in number of subframes and/or slots) of the SFN0 slot 0 for a DL PRS resource set (corresponding to the second TRP) with respect to SFN0 slot 0 of a reference provided by nr-DL-PRS-ReferenceInfo (e.g., corresponding to the reference TRP). As shown in FIG. 23B, the wireless device may determine SFN0 slot 0 of the neighbor TRP based on the indicated SFN0-offset (corresponding to the neighbor TRP).

As shown in FIG. 21A, the one or more PRS configuration parameters (e.g., the DL PRS assistance data) may configure/indicate per each TRP (e.g., the reference TRP and/or the neighbor TRP) a PRS expected RSTD (e.g., nr-DL-PRS-ExpectedRSTD) and/or a PRS expected-RSTD uncertainty (e.g., nr-DL-PRS-ExpectedRSTD-Uncertainty). For example, corresponding to the reference TRP, the location server (e.g., the network) may signal/configure a value of zero for the nr-DL-PRS-expectedRSTD, and/or nr-DL-PRS-expectedRSTD-uncertainty in nr-DL-PRS-AssistanceDataList. For the neighbor TRP, the corresponding PRS expected RSTD (e.g., nr-DL-PRS-ExpectedRSTD) may indicate/define a time difference with respect to a received DL subframe timing the wireless device is expected to receive DL PRS (e.g., from the neighbor TRP). For example, the PRS expected RSTD of the neighbor TRP may indicate a reference signal time difference (RSTD) value that the wireless device is expected to measure between the neighbor TRP and the assistance TRP. The nr-DL-PRS-ExpectedRSTD field may take into account an expected propagation time difference as well as transmit time difference of PRS positioning occasions between the neighbor TRP and the reference TRP. For example, the nr-DL-PRS-ExpectedRSTD field of the NR-DL-PRS-AssistanceDataPerTRP may indicate a value in range of (−3841 . . . 3841) (e.g., (−0.5 ms, 0.5 ms) considering the resolution R). The resolution of the nr-DL-PRS-ExpectedRSTD may be R=4×Ts, with Ts=1/(15000*2048) seconds.

Figure 24A:
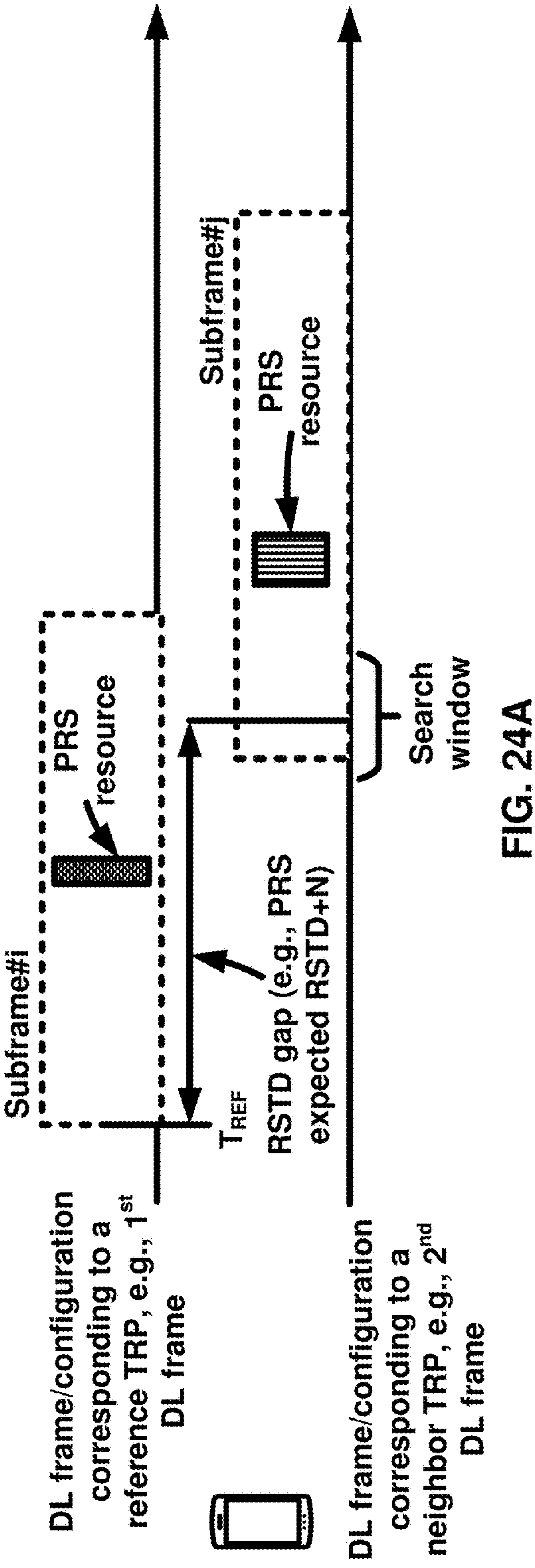
FIG. 24A illustrates an example of a search window for receiving PRS from a neighbor TRP as per an aspect of an embodiment of the present disclosure.

FIG. 24A shows an example of a search window for receiving PRS from a neighbor TRP. As shown in FIG. 24A, the wireless device may (based on the one or more PRS configuration parameters) determine an RSTD gap and/or the search window. The PRS expected-RSTD uncertainty of the neighbor TRP (e.g., nr-DL-PRS-ExpectedRSTD-Uncertainty) may define/indicate a search window around the nr-DL-PRS-ExpectedRSTD, e.g., the nr-DL-PRS-ExpectedRSTD and nr-DL-PRS-ExpectedRSTD-Uncertainty together define the search window for the wireless device. For example, The PRS expected-RSTD uncertainty of the neighbor TRP may indicate an uncertainty in the nr-DL-PRS-ExpectedRSTD value of the neighbor TRP. In some implementations, the indicated uncertainty is related to the location server's a-priori estimate of the wireless device location. For example, the nr-DL-PRS-ExpectedRSTD-Uncertainty field of the NR-DL-PRS-AssistanceDataPerTRP may indicate a value in range of 0 to 246 (e.g., [0 ms, 0.032 ms] considering the resolution R). The resolution of the nr-DL-PRS-ExpectedRSTD-Uncertainty may be R=4×Ts seconds.

For example, as shown in FIG. 24A, the wireless device may assume/determine that a beginning/starting of a (DL) subframe for the PRS (corresponding to/of the neighbor TRP), e.g., subframe #j in FIG. 24A, is received within the search window of size [−nr-DL-PRS-ExpectedRSTD-Uncertainty×R; nr-DL-PRS-ExpectedRSTD-Uncertainty×R] centered at $T_{REF}$+1 millisecond×N+nr-DL-PRS-ExpectedRSTD×4×TS. $T_{REF}$ is a reception time of a beginning/starting of a subframe for the PRS of the assistance TRP (e.g., subframe #i in FIG. 24A) at the wireless device antenna connector. Parameter N may be calculated (e.g., by the wireless device) based on the nr-DL-PRS-SFN0-Offset (of the neighbor TRP) and/or dl-PRS-Periodicity-and-ResourceSetSlotOffset and/or dl-PRS-ResourceSlotOffset. For example, the RSTD gap may be based on the PRS expected RSTD of the neighbor TRP and parameter N (e.g., the RSTD gap=1 millisecond×N+nr-DL-PRS-ExpectedRSTD×4×Ts after/from the $T_{REF}$).

In some implementations, the positioning procedure may be based on/via gap-based measurements, e.g., measuring DL PRS resources during/within (positioning) measurement gap(s). The wireless device may measure a DL PRS resource outside an active DL BWP or with a numerology different from a numerology of the active DL BWP (e.g., if the measurement is made/performed during a configured measurement gap). For example, the one or more configuration parameters may configure the wireless device with one or more measurement gaps. The one or more measurement gaps may comprise one or more preconfigured measurement gaps (e.g., for positioning) each associated with a measPosPreConfigGapId. In some implementations, the wireless device may (e.g., when the wireless device is expected to measure the DL PRS resource) request from the location server a (preconfigured) measurement gap (e.g., via an LPP message of the LPP messages, e.g., via NR-PRS-MeasurementInfoList message, by transmitting a MAC CE (e.g., Positioning Measurement Gap Activation/deactivation request MAC CE) or by requesting on using a RRC message. The MAC CE may indicate a measPosPreConfigGapId of a preconfigured measurement gap of the one or more preconfigured measurement gaps.

The wireless device may receive a command for a preconfigured Measurement Gap for Positioning activation/deactivation (e.g., Positioning Measurement Gap Activation/Deactivation Command MAC CE), e.g., via the serving cell. The command may indicate a first preconfigured measurement gap. The wireless device may transmit a PUCCH with HARQ-ACK information in slot n corresponding to the PDSCH carrying the command (Positioning Measurement Gap Activation/Deactivation Command MAC CE). For example, the wireless device may activate/deactivate the first preconfigured measurement gap (and apply corresponding assumptions) starting from a first/initial/starting slot that is after slot $$n + 3N_{slot}^{subframe,\mu}$$

where μ is an SCS configuration for the PUCCH.

In some implementations, the positioning procedure may be based on/via gap-less measurements positioning, e.g., measuring DL PRS resources during/within one or more DL PRS processing windows (PPWs). The wireless device may (to perform the positioning procedure) measure the DL PRS outside a measurement gap if a DL PRS is inside the active DL BWP and has the same numerology as the active DL BWP and is within/during the PPW. For example, the one or more configuration parameters (e.g., DL-PPW-PreConfig) configure/indicate the one or more PPWs.

The wireless device may receive a command for PPW (of the one or more PPWs) activation/deactivation (e.g., PPW Activation/Deactivation Command MAC CE), e.g., via the serving cell. The activation command may indicate the PPW. The wireless device may transmit a PUCCH with HARQ-ACK information in slot n corresponding to the PDSCH carrying the command (PPW Activation/Deactivation Command MAC CE). For example, the wireless device may activate/deactivate the PPW (and apply corresponding assumptions) starting from a first/initial/starting slot that is after slot $$n + 3N_{slot}^{subframe,\mu}$$

where μ is an SCS configuration for the PUCCH. The wireless device may not expect to be indicated with more than 4 activated PPWs of the one or mor PPWs across all active DL BWPs and may not expect to be indicated with the activated PPWs that overlap in time.

Inside/withing the PPW the wireless device may measure a single DL PRS positioning frequency layer. The wireless device may not expect to measure the DL PRS outside the measurement gap if an expected received timing difference between the DL PRS from the non-serving cell (e.g., the neighbor TRP) and that from the serving cell (e.g., the reference TRP), determined by the nr-DL-PRS-ExpectedRSTD and/or nr-DL-PRS-ExpectedRSTD-Uncertainty corresponding to the neighbor TRP, is larger than a threshold (e.g., a maximum Rx timing difference that is provided by UE capability, e.g., IE prs-MeasurementWithoutMG). The threshold (e.g., THR) may indicate a UE capability for support of Rx timing difference between the serving cell (e.g., the reference TRP) and non-serving cell (e.g., the neighbor TRP) for PRS measurement within the PPW. The wireless device may, for receiving/measuring the DL PRS outside the measurement gap and within the PPW, determine max $|\Delta T| \leq THR$, where ΔT may be a time difference between a start/beginning of a slot/subframe containing PRS from the neighbor cell/TRP (e.g., slot/subframe #j in FIG. 24A) and a start/beginning of a closest slot/subframe from the serving cell/reference TRP (e.g., slot/subframe #i in FIG. 24A). the wireless device may determine a range of ΔT by the expected RSTD (e.g., nr-DL-PRS-ExpectedRSTD) and expected RSTD uncertainty (e.g., nr-DL-PRS-ExpectedRSTD-Uncertainty) in the assistance data.

For receiving/measuring the DL PRS outside the measurement gap and within the PPW, the wireless device may consider a priority between DL PRS and SSB or other DL signals (e.g., PDSCH or PDCCH). For example, the one or more configuration parameters may indicate a priority of the DL PRS.

A PPW of the one or more PPWs may be with a type1A or type1B or type2. For performing the positioning procedure and when the wireless device is expected to measure the DL PRS outside the measurement gap in a PPW with type1A and if the DL PRS is determined to be higher priority than a DL signal/channel (e.g., CSI-RS/PDCCH/PDSCH) inside the PPW, the wireless device may not receive/measure the DL signal/channel.

For performing the positioning procedure and when the wireless device is expected to measure the DL PRS outside the measurement gap in a PPW with type1B and if the DL PRS is determined to be higher priority than the DL signal/channel inside the PPW, the wireless device may not receive/measure the DL signal/channel.

For performing the positioning procedure and when the wireless device is expected to measure the DL PRS outside the measurement gap in a PPW with type2 if the DL PRS is determined to be higher priority than the DL signal/channel inside the PPW, the wireless device may not receive/measure the DL signal/channel overlapping with the DL PRS.

For example, the one or more positioning configuration parameters (e.g., the LPP messages) may configure the wireless device to measure and report to the location server (e.g., during the positioning procedure) a number of (e.g., up to 4) DL RSTD measurements per pair of dl-PRS-ID with each measurement between a different pair of DL PRS resources or DL PRS resource sets within the DL PRS configured for those dl-PRS-ID. The one or more positioning configuration parameters (e.g., the LPP messages) may configure the wireless device, for performing the positioning procedure, to measure and report (to the location server) a number of (e.g., up to 24) DL PRS-RSRP (and/or DL PRS-RSRPP) measurements on DL PRS resources associated with a same dl-PRS-ID. The one or more positioning configuration parameters (e.g., the LPP messages) may configure the wireless device (e.g., for performing the positioning procedure) to measure and report (to the location server) a number of (e.g., up to 4) UE Rx-Tx time difference measurements corresponding to a single configured SRS resource for positioning (via the one or more SRS configuration parameters of the one or more configuration parameters) or DL PRS resource set. Each measurement may correspond to a single received DL PRS resource or resource set (e.g., from the reference TRP and/or the neighbor TRP) which may be in different DL PRS positioning frequency layers. For example, associated with each RSTD and/or UE Rx-Tx time difference, the wireless device may (e.g., for performing the positioning procedure) measure and report (to the location server) timing and quality metrics of a number of (up to 8) additional detected. In some implementations, the one or more positioning configuration parameters (e.g., the LPP messages) may configure the wireless device, for performing the positioning procedure, to report (e.g., via the LPP messages) to the location server quality metrics NR-TimingQuality corresponding to the DL RSTD and UE Rx-Tx time difference measurements.

For example, to perform the positioning procedure, the wireless device may measure multiple DL RSTD measurements and/or PRS-RSRP (P) measurements and/or UE Rx-Tx time difference measurements during at least one measurement period. The at least one measurement period may, for example, be/comprise an RSTD measurement period ($T_{RSTD,Total}$). The at least one measurement period may, for example, be/comprise an PRS-RSRP measurement period ($T_{PRS\text{-}RSRP,total}$) and/or a UE Rx-Tx (time different) measurement period ($T_{UERxTx,Total}$). A length of the at least one measurement period (in ms) may depend on a total number of configured positioning frequency layers and/or a periodicity of the (PRS RSTD and/or PRS-RSRP (P) and/or UE Rx-Tx time difference) measurement in a positioning frequency layer.

The wireless device may start a measurement period of the at least one measurement period after/from receiving an indication from higher layers (e.g., LPP layer) of the wireless device and/or a positioning event occur. The indication may be in response to receiving (by the higher layers of the wireless device) an LPP message (e.g., NR-TDOA-ProvideAssistanceData message and/or NR-TDOA-RequestLocationInformation message and/or NR-DL-AoD-ProvideAssistanceData message and/or NR-DL-AoD-RequestLocationInformation message and/or NR-Multi-RTT-ProvideAssistanceData message and/or NR-Multi-RTT-RequestLocationInformation message) of the one or more positioning messages from the LMF. The indication may be the delivery of the LPP message from the higher layers to the physical layer of the wireless device. In an example, the wireless device may start the measurement period from/after a first/earliest/starting (configured/activated) measurement gap/PPW instance aligned with a DL PRS resource(s) in the assistance data. The positioning event may correspond to a deferred MT-LR and/or MO-LR and/or NI-LR or the like.

In an example, in response to/upon/based on an event of at least one event is occurred during performing the ongoing positioning procedure and/or while performing/measuring one or more measurements (e.g., RSTD/RSRP/UE Rx-Tx time difference, and/or the like) measurements during a measurement period of the at least one measurement period (e.g., the RSTD measurement period), the wireless device may determine whether to continue measurements (e.g., not stop/restart the measurement period and/or complete the on-going RSTD measurements) or restart the measurement period. The determination may be based on the event and/or the measurement period (e.g., whether the measurement period is the RSTD measurement period or the PRS-RSRP measurement period or the UE Rx-Tx time difference measurement period).

An event of the at least one event may correspond to/be (execution/occurrence/performing/triggering) handover, e.g., a handover event, to handover from a first cell/source cell to a second cell/target cell. The first cell may be different than the second cell (e.g., the PCI of the first cell is different than the PCI of the second cell). For example, the handover may comprise layer 3 (e.g., RRC/PDCP/RLC/NAS layers) procedures. For example, the handover may be an RRC reconfiguration procedure. For example, the handover event may occur when the wireless device receives an RRC reconfiguration message (e.g., RRCReconfiguration), e.g., comprising reconfiguration with sync configurations (e.g., reconfigurationWithSync), via the source cell indicating the handover from the source cell to the target cell, e.g., as part of a reconfiguration with sync procedure. In another example, the handover event may occur when the wireless device triggers a conditional handover. The reconfiguration with sync (reconfigurationWithSync) may comprise cell common parameters (spCellConfigCommon) of the target cell, a RNTI (newUE-Identity) identifying the wireless device in the target cell, a value of a handover timer (e.g., T304), a dedicated RACH resource (rach-ConfigDedicated), and/or rach-skip configuration parameters (e.g., per-allocated UL grant(s)).

For example, the RRC reconfiguration message may configure at least one conditional handover (CHO) execution condition. For example, a CHO execution condition (or an RRC reconfiguration condition) of the at least one CHO execution condition may correspond to a candidate target cell of the candidate target cells. CHO execution condition may be an execution condition that needs to be fulfilled in order to trigger the execution of a conditional reconfiguration for CHO, CPA, intra-SN CPC without MN involvement or MN initiated inter-SN CPC. In an example, a CHO execution condition of the at least one CHO execution condition may comprise at least one of the following: a measurement event D1 (e.g., condEventD1) for a candidate cell; and/or a measurement event T1 (e.g., condEventT1) for a candidate cell; and/or a measurement event A3 (e.g., condEventA3) for a candidate cell; and/or a measurement event A4 (e.g., condEventA4) for a candidate cell; and/or a measurement event A5 (e.g., condEventA5) for a candidate cell. For example, a first CHO execution condition (e.g., the measurement event T1) of the at least one CHO execution condition may be a time-based (or time-dependent) event for triggering/executing the (conditional) handover. In some cases, a second CHO execution condition of the at least one CHO execution condition may be a distance-based (or distance-dependent) event for triggering/executing the (conditional) handover. In response to a CHO execution condition of the at least one CHO execution condition being satisfied/fulfilled, the wireless device may start the conditional handover (e.g., the handover event).

The handover procedure may be a RACH-based handover (comprising performing a random access procedure, e.g., using the dedicated RACH resource) or a RACH-less handover (not comprising performing a random access procedure, e.g., using the rach-skip configuration parameters). For example, the wireless device may, based on starting the handover (e.g., the handover event being occurred), start a handover timer (T304). The wireless device may stop the handover timer in response to successfully completing the handover (e.g., successfully completing the random access procedure). The wireless device, after completing the handover, may apply a first part of CQI reporting configuration, SR configuration and/or SRS configuration that do not require the wireless device to know a system frame number (SFN) of the target base station. The wireless device, after completing the handover procedure toward a PCell, may apply second parts of measurement and radio resource configuration that require the wireless device to know the SFN of the target base station (e.g., measurement gaps, periodic CQI reporting, SR configuration, SRS configuration), upon acquiring the SFN of the target gNB.

In an example, if handover occurs (e.g., the handover event occurs) while performing/measuring RSTD measurements (for performing the ongoing positioning procedure) during a first measurement period (e.g., the RSTD measurement period) of the at least one measurement period, the wireless device may continue (e.g., not stop/restart the first measurement period) and complete the on-going RSTD measurements. In another example, if handover occurs while performing/measuring PRS-RSRP (P) measurements (for performing the ongoing positioning procedure) during a second measurement period (e.g., the PRS-RSRP measurement period) of the at least one measurement period, the wireless device may continue (e.g., not stop/restart the measurement period) and complete the on-going PRS-RSRP measurements. In yet another example, the wireless device may, for performing the ongoing positioning procedure, restart a third measurement period (e.g., the UE Rx-Tx time difference measurement period) of the at least one measurement period if handover occurs during the measurement period and after SRS reconfiguration on the target cell is complete.

An event of the at least one event may correspond to/be a cell (e.g., PSCell or SCell) addition/release or a cell change, e.g., a serving cell change. When PSCell or SCell addition or release does not cause SRS reconfiguration during the third measurement period (e.g., when the PSCell/SCell addition/release using the RRC connection reconfiguration message is without (or is not based on) the reconfigurationWithSync message or mobilityControlInfo message), the wireless device may continue the UE Rx-Tx time difference measurement, e.g., not stopping/restarting the third measurement period of the at least one measurement period.

When the cell addition or release causes SRS reconfiguration during the third measurement period (e.g., when the PSCell/SCell addition/release using the RRC connection reconfiguration message is with/based on the reconfigurationWithSync message or mobilityControlInfo message), the wireless device may restart the UE Rx-Tx time difference measurement (e.g., restart the third measurement period) after the SRS reconfiguration on the cell is complete. When the serving cell change occurs during the third measurement period, the wireless device may continue (e.g., not stop/restart the third measurement period) and complete the UE Rx-Tx time difference measurement based on the serving cell change not impacting (e.g., not changing) SRS configuration for the UE Rx-Tx time difference measurement.

An event of the at least one event may correspond to change of the SRS configuration. For example, when SRS is reconfigured without serving cell change during the third measurement period of the at least one measurement period, the wireless device may restart the UE Rx-Tx time difference measurement (e.g., restart the third measurement period) after the SRS reconfiguration is complete.

An event of the at least one event may correspond to a change in an uplink transmission timing of the wireless device. For example, when an uplink transmission timing changes due to receiving a Timing Advance command (e.g., TAC MAC CE) during the third measurement period (e.g., the UE Rx-Tx time difference measurement period), the wireless device may restart the third measurement period after uplink transmission timing changes (e.g., after applying the TAC MAC CE). If the uplink transmission timing changes due to a change in a $N_{TA\text{-}offset}$ (e.g., receiving a new $N_{TA\text{-}offset}$) during the third measurement period, the wireless device may restart the third measurement period after uplink transmission timing changes (e.g., after applying the new $N_{TA\text{-}offset}$). For example, if the uplink transmission timing changes due to (or as a result of or because of) a first autonomous timing adjustment by the wireless device during the third measurement period, the wireless device may restart the third measurement period based on whether a cell (e.g., the serving cell) is a downlink reference cell for SRS transmission or not. The cell may be a reference cell.

The wireless device may follow a frame timing change of the reference cell, e.g., in the RRC connected state/mode. The uplink frame (for uplink transmissions) may be $(N_{TA}+N_{TA\text{-}offset}+)\times T_c$ before a reception of a first/earliest detected path (in time) of the corresponding downlink frame from the reference cell. For serving cell(s) in pTAG, the wireless device may use the SpCell as the reference cell for deriving the uplink transmit timing for cells in the pTAG. For serving cell(s) in sTAG, the wireless device may use any of the activated SCells as the reference cell for deriving the UE transmit timing for the cells in the sTAG.

The first autonomous timing adjustment may comprise a first gradual timing adjustment procedure based on (or to achieve/satisfy/fulfill) TA accuracy requirement(s). The TA accuracy requirements may correspond to/comprise a first transmission timing error. The first transmission timing error may be an initial (or first) transmission timing error ±T_e. When the transmission timing error (e.g., between the wireless device and a first reference timing exceeds first transmission timing error), the wireless device may (autonomously) adjust a transmission timing to within the first transmission timing error ±T_e, e.g., first autonomous timing adjustment. The first reference timing may be $(N_{TA}+N_{TA\text{-}offset}+)\times T_c$ before/prior to the downlink timing of the reference cell. For example, the first autonomous timing adjustment may comprise (autonomously) adjusting the transmission timing such that a maximum amount of the magnitude of the timing change in one adjustment being T_q (e.g., a first maximum autonomous time adjustment step); and/or a minimum aggregate adjustment rate being T_p (e.g., a first aggregate adjustment rate) per second; and/or the maximum aggregate adjustment rate being T_q per 200 ms.

For example, a timing advance command (e.g., the TAC MAC CE) of the at least one TA command may be a TA command of a random access response. The TA command may be an absolute timing advance command MAC CE. The TA command may indicate a value $T_A$ for a TAG $T_A=0, 1, 2, \ldots, 3846$. The wireless device may determine an amount of the time alignment for the TAG with SCS of $2^{\mu}\cdot 15$ KHz based on $N_{TA}=T_A\cdot 16\cdot 64/2^{\mu}$. $N_{TA}$ may be relative to the SCS of the first uplink transmission from the wireless device after the reception of the random access response or the absolute timing advance command MAC CE. In another example, a timing advance command (e.g., the TAC MAC CE), $T_A$, for a TAG indicates adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^{\mu}\cdot 15$ KHz, $N_{TA\_new}=N_{TA\_old}+(T_A-31)\cdot 16\cdot 64/2^{\mu}$. In response to receiving the TAC MAC CE on/during uplink slot n, the wireless device may apply/adjust an uplink transmission timing (e.g., for transmission of UL signals) from a beginning/start of uplink slot n+k+1 where $$k=\lceil N_{slot}^{subframe,\mu}\cdot(N_{T,1}+N_{T,2}+N_{TA,max}+0.5)/T_{sf}\rceil,\ N_{T,1}$$

is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1, $N_{TA,max}$ is a maximum timing advance value in msec that can be provided by a TA command field of 12 bits, $$N_{slot}^{subframe,\mu}$$

is the number or slots per subframe, $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu=0$, the UE assumes $N_{1,0}=14$. Slot n and $$N_{slot}^{subframe,\mu}$$

are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n may be a last/final/ending/latest slot among uplink slot(s) overlapping with the slot(s) of PDSCH reception assuming $T_{TA}$=0, where the PDSCH provides the timing advance command.

Figure 24B:
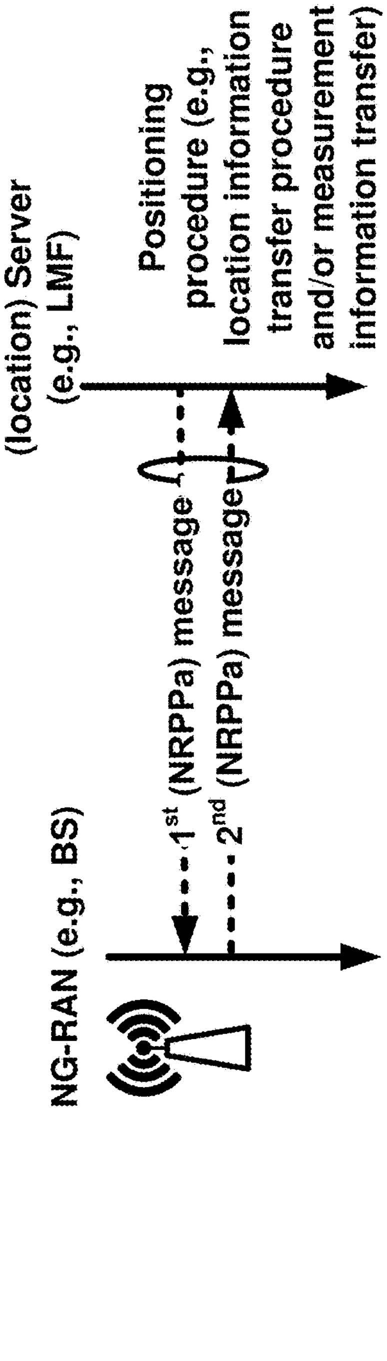
FIG. 24B illustrates an example of signaling access between the LMF and a base station based on NRPPa protocol as per an aspect of an embodiment of the present disclosure.

FIG. 24B shows an example of signaling access between the LMF and the base station based on the NRPPa protocol. For performing the positioning procedure, using NRPPa message(s) (e.g., comprising NRPPa PDUs) of the one or more positioning messages (e.g., first message and/or second message in FIG. 24B), the location server may request the base station for SRS configuration for the wireless device and the base station may accordingly respond with the SRS configuration to the location server. The SRS configuration may be SRS for positioning or another SRS configuration (e.g., SRS for MIMO). Using NRPPa message(s) of the one or more positioning messages, the base station may provide/transmit an updated SRS configuration to the location server when the SRS configuration changes. For example, if semi-persistent or aperiodic SRS is configured to the wireless device, the LMF may request to activate/deactivate the SRS (via the NRPPa messages). When the SRS is transmitted (e.g., the uplink signals) by the wireless device, the location server can request multiple TRPs to perform uplink measurements and report/transmit results (e.g., measurements) via the NRPPa messages.

The NRPPa messages (of the one or more positioning messages) may correspond to signaling access between the LMF (e.g., the location server) and the base station for non-UE associated NRPPa procedure (e.g., for transfer of information applicable to the NG-RAN node and associated TRP, including the procedures supporting the OTDOA Information Transfer, Assistance Information Transfer, TRP Information Transfer, and Measurement Information Transfer functions) or UE-associated NRPPa procedure (e.g., for transfer of information for a particular wireless device (e.g., the wireless device), including the procedures supporting Positioning Information Transfer and E-CID Location Information Transfer functions). The location server may obtain TRP information (e.g., geographical locations of the reference TRP and/or the neighbor TRPs) required for multi-RTT positioning.

For example, the NG-RAN (e.g., the base station) may exchange/communicate NRPPa messages (or NRPPa PDUs) with the core network (e.g., AMF/LMF) using/based on NGAP DL UE associated NRPPa transport (e.g., corresponding to UE associated NRPPa procedure) and/or NGAP DL Non UE associated NRPPa transport (e.g., corresponding to non-UE associated NRPPa procedure) and/or NGAP UL UE associated NRPPa transport (e.g., corresponding to UE associated NRPPa procedure) and/or NGAP UL Non UE associated NRPPa transport (e.g., corresponding to non-UE associated NRPPa procedure).

FIG. 25 and FIG. 26 show examples of NRPPa messages and corresponding NRPPa elementary procedure. The first message and/or the second message in FIG. 24B may be one or the NRPPa messages shown in FIG. 25 and/or FIG. 26. For example, an example of an initial (or starting) message in FIG. 25 and/or FIG. 26 may be the first message in FIG. 24B. For example, the response message FIG. 25 and/or FIG. 26 may be the first message or the second message.

FIG. 27 shows an example of functions that the NRPPa protocol may provide. FIG. 27 further shows the mapping between the NRPPa functions and NRPPa elementary procedures. As shown in FIG. 27, the NRPPa protocol (e.g., via the NRPPa messages) may provide at least one of the following functions: E-CID Location Information Transfer (e.g., for the NG-RAN node to exchange location information with LMF for the purpose of E-CID positioning and NR E-CID positioning); and/or OTDOA Information Transfer (e.g., for the NG-RAN node to exchange information with the LMF for the purpose of OTDOA positioning) and/or Reporting of General Error Situations (e.g., for reporting of general error situations, for which function specific error messages have not been defined) and/or Assistance Information Transfer (e.g., for the LMF to exchange information with the NG-RAN node for the purpose of assistance information broadcasting); and/or Positioning Information Transfer (e.g., for the NG-RAN node to exchange positioning information with the LMF for the purpose of positioning) and/or Measurement Information Transfer (e.g., for the LMF to exchange measurement information with the NG-RAN node for the purpose of positioning); and/or TRP Information Transfer (e.g., for the LMF to obtain TRP related information from the NG-RAN node); and/or PRS Information Transfer (e.g., for the LMF to exchange PRS related information with the NG-RAN node); and/or Measurement Preconfiguration Information Transfer (e.g., for the LMF to request the NG-RAN node to preconfigure and activate measurement gap and/or PRS processing window).

Figure 28:
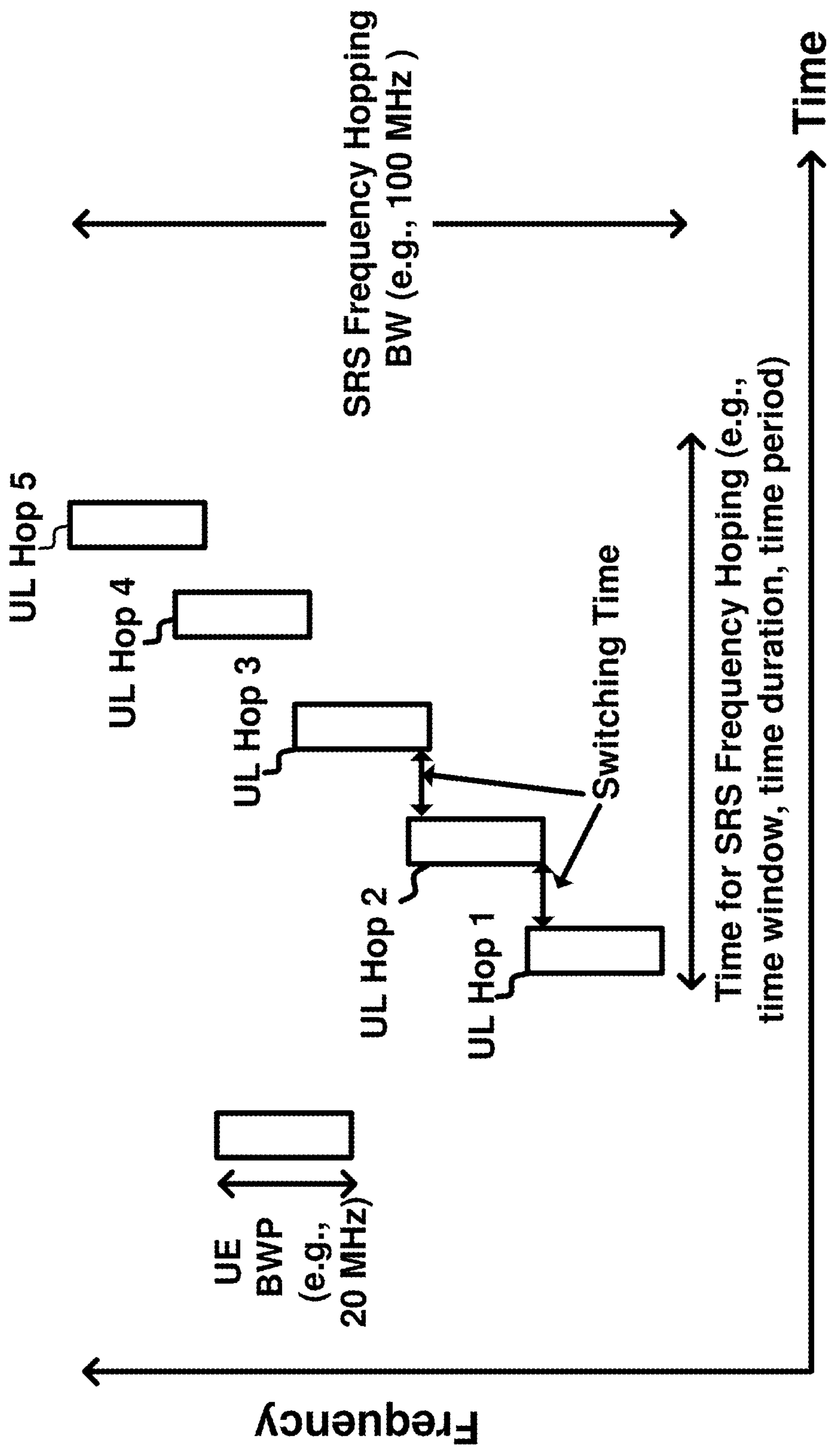
FIG. 28 illustrates an example of positioning SRS frequency hopping as per an aspect of an embodiment of the present disclosure.

FIG. 28 illustrates an example of positioning SRS frequency hopping (FH). In FIG. 28, a wireless device (e.g., a UE) may be configured (e.g., by one or more configuration parameters in one or more RRC messages) to transmit an SRS resource over multiple uplink (frequency) hops (e.g., illustrated as five hops: UL hop 1, UL hop 2, UL hop 3, UL hop 4, UL hop 5). A base station may configure a wireless device (e.g., by transmitting the one or more configuration parameters in one or more RRC messages) to perform SRS transmission over the multiple uplink hops. The multiple uplink hops may occur over a time for positioning SRS frequency hopping. The time may be referred to as, e.g., a time window, a time duration, or a time period for SRS frequency hopping. The multiple uplink hops may occur over a bandwidth for positioning SRS frequency hopping (e.g., 100 MHz). The bandwidth may be referred to as an SRS frequency hopping bandwidth, frequency resources for SRS frequency hopping, a frequency region for SRS frequency hopping, or a span for SRS frequency hopping.

In an example, a wireless device performing positioning SRS frequency hopping may be a wireless device with reduced capabilities (e.g., a capability-reduced wireless device, a reduced capability wireless device (RedCap UE)). Compared with a normal-capability wireless device, the reduced-capability wireless device may support a narrower bandwidth (e.g., 20 MHz compared to 100 MHz), a smaller number of Tx/Rx antenna (e.g., 2 antennas compared to 8 antennas), a longer processing timing, and/or a lower processing capability. The device supporting narrower bandwidth may, for example, support a smaller maximum bandwidth than a full-capability device. FIG. 28 illustrates an example of a wireless device with reduced capabilities, although the present disclosure is not limited to this example and is also applicable to full-capability wireless devices (e.g., with wider bandwidth capabilities and/or other capabilities). For example, FIG. 28 illustrates that the uplink BWP of the wireless device is 20 MHz.

One of more of the hops may be outside of the (e.g., active) uplink BWP of the wireless device. For example, FIG. 28 illustrates that a lowest frequency of UL hop 1 is lower in frequency than a lowest frequency of the BWP of the wireless device. Each hop of the positioning SRS frequency hopping may overlap in the frequency domain with another hop. For example, in FIG. 28, the highest frequency of UL hop 1 overlaps in frequency with the lowest frequency of UL hop 2. The highest frequency of UL hop 2 overlaps in frequency with the lowest frequency of UL hop 3. The UL hops may also overlap with non-consecutive hops (e.g., in another example, UL hop 1 may overlap with UL hop 3 or UL hop 5). A receiver (e.g., base station or TRP) may use the overlapping frequency region between hops to perform phase compensation of the positioning SRS transmission. The receiver (e.g., base station or TRP) may mitigate errors from phase offsets (or variations) between each frequency hop by performing phase compensation. Phase offsets between the (frequency) hops may be caused by random or unpredictable RF impairments of the device. Each (frequency) hop may use a part of an SRS sequence of the overall SRS resource (e.g., UL hop 1 may use the first part of the sequence equivalent to the UL hop 1 bandwidth) in order to transmit on that hop. The wireless device may transmit the full sequence of the SRS resource over the time period for all the hops. For example, a base station may transmit one or more configuration parameters, to the wireless device, indicating to perform SRS frequency hopping within one SRS resource. For example, the one or more configuration parameters may indicate an SRS resource configured with a parameter indicating that the SRS resource is used for positioning (e.g., SRS-PosResource) in one or more RRC messages. A wireless device may be configured to transmit positioning SRS frequency hopping outside of the active (UL) BWP of the wireless device. In the present disclosure, positioning SRS frequency hopping may be referred to as SRS frequency hopping, uplink frequency hopping, frequency hopping SRS for positioning, SRS for positioning frequency hopping, SRS frequency hopping configured with SRS-PosResource, or frequency hopping.

FIG. 28 further illustrates an example where a wireless device may have a time gap between each UL hop of the positioning SRS frequency hopping. The time gap may be referred to as a timing gap, a timing offset, a switching time, a switching delay for SRS frequency hopping, a RF switching time, or a RF switching delay. The time gap may comprise a switching delay or switching time for switching from a first hop (e.g., $FH_n$) to a second hop (e.g., $FH_{n+1}$). During the switching time, the wireless device may switch the transmitting frequency range (e.g., by retuning RF components of the wireless device) in order to transmit on a different frequency region for the next hop (e.g., the wireless device may change the center frequency). For example, FIG. 28 illustrates a switching time that occurs between UL hop 1 and UL hop 2. During this time, the wireless device switches between the frequency range for UL hop 1 to the frequency range for UL hop 2. The time gap may, for example, be one or more symbols (e.g., OFDM symbols) in length (e.g., the time gap may be 1, 2, or 4 OFDM symbols). Additionally or alternatively, the time gap may be in absolute time units (e.g., independent of the subcarrier spacing, such as 70 us or 140 μs). The time gap may be based on a subcarrier spacing (or numerology) of the wireless device (e.g., the active (UL) BWP). In existing technologies, an SRS may be treated with the lowest priority compared with other UL signals or channels (e.g., PUSCH, PUCCH, PRACH). For example, if the SRS overlaps (or collides) in the time domain with another UL signal or channel, the SRS may be dropped (e.g., not transmitted, skipped) by the wireless device, and the wireless device may transmit the other UL signal or channel during the time of the overlap (e.g., on, in, or during the symbols (e.g., OFDM symbols) during which the overlap with the SRS occurs). However, the wireless device may not be able to re-tune its RF components in time to successfully transmit the UL signal or channel when the SRS (e.g., the SRS that is dropped) is a part of SRS frequency hopping (e.g., positioning SRS frequency hopping). This may cause the wireless device to not only drop the SRS transmission but also fail to (e.g., successfully) transmit the (prioritized) UL signal or channel. The network (e.g., base station or gNB) may not receive the UL signal or channel. This may increase latency and/or decrease reliability in the transmission of the UL signal. This may also increase signaling overhead as the network may need to re-schedule the UL signal or channel.

Figure 29:
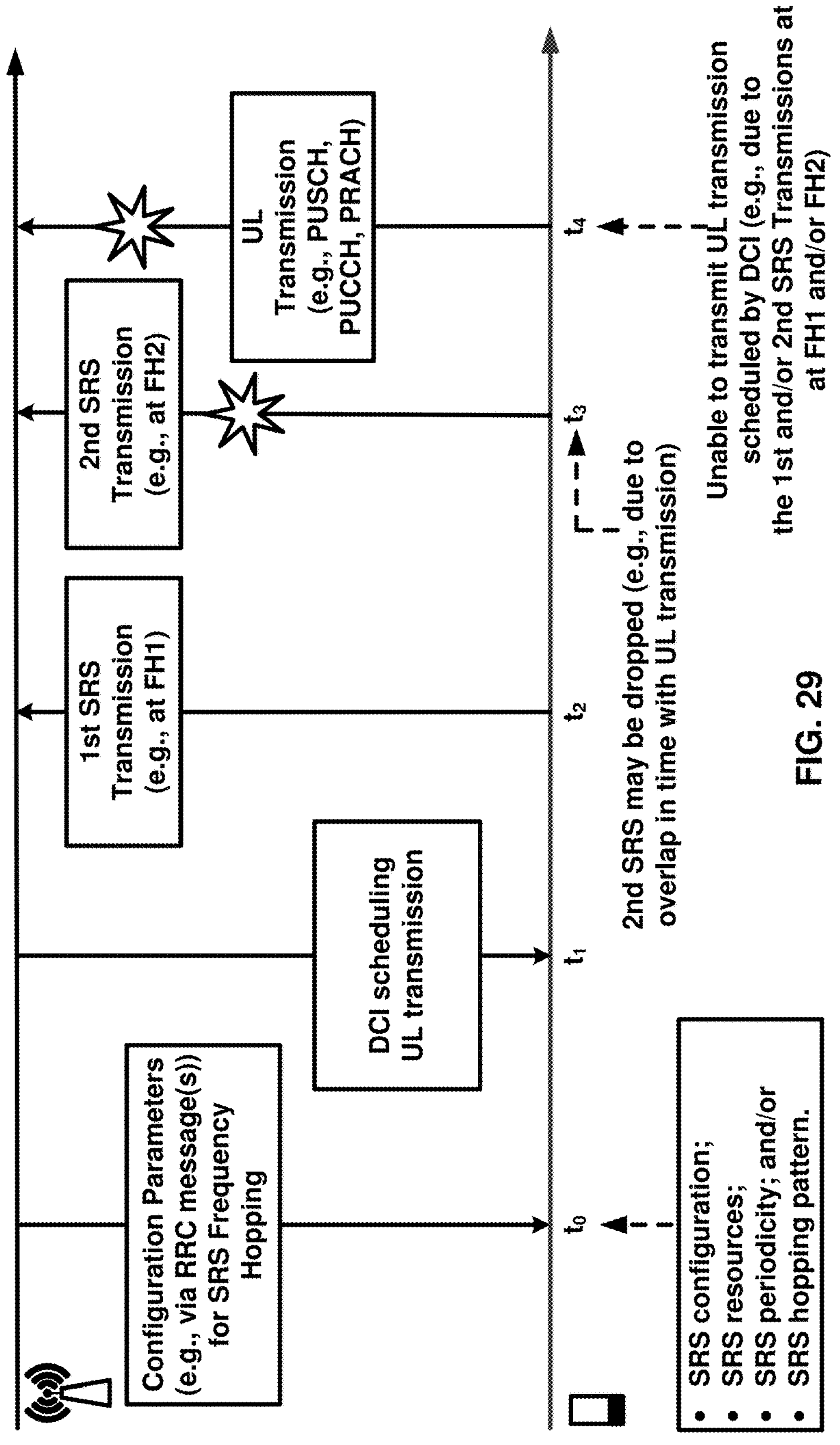
FIG. 29 illustrates an example of a wireless device being configured for positioning SRS frequency hopping and being scheduled for an uplink transmission as per an aspect of an embodiment of the present disclosure.

As an example, FIG. 29 illustrates a scenario where, at t0, a wireless device receives one or more messages (e.g., one or more RRC messages) comprising configuration parameters for SRS frequency hopping. The one or more configuration parameters may comprise, for example, one or more SRS configurations, one or more SRS resources, one or more SRS periodicities, and/or one or more SRS (frequency) hopping patterns. The one or more configuration parameters may indicate that the SRS, the one or more of the SRS configurations, the one or more SRS resources, the one or more SRS periodicities, and/or the one or more SRS hopping patterns are for positioning SRS frequency hopping. For example, a parameter may indicate a usage of at least one of the one or more configuration parameters is SRS frequency hopping (e.g., SRS-PosResource). The one or more configuration parameters may indicate (or schedule or configure) one or more SRS transmissions, such as a first SRS transmission at (frequency) hop 1 (FH1) and a second SRS transmission at FH2. The FH1 may, for example, comprise one or more SRS symbols.

At t1, the wireless device may receive a DCI that schedules an UL transmission. The UL transmission may, for example, be in/on/via an (active) UL BWP. The UL transmission may be, for example, a PUSCH transmission, a PUCCH transmission, and/or a PRACH transmission. At t2, the wireless device may transmit the first SRS transmission at FH1. FH1 may be outside of the (active) uplink BWP of the wireless device. At t3, the wireless device may be scheduled to transmit a second SRS transmission at FH2. As an example, the wireless device may drop (e.g., not transmit or delay) the second SRS transmission, due to overlapping in time with the UL transmission scheduled by the DCI. For example, FIG. 29 illustrates that the wireless device drops the second SRS transmission at FH2 at t3 due to an overlap in the time domain with the scheduled transmission of UL transmission at t4. The second SRS transmission may be dropped due to the UL transmission being prioritized over the SRS transmission.

In existing technologies, a wireless device should transmit the UL transmission, as scheduled, at t4. However, the wireless device may be unable to transmit the uplink transmission (e.g., even though the overlapping SRS transmission is dropped) when (uplink) SRS frequency hopping is performed. This may be due to, for example, the wireless device being unable to re-tune its RF components in time for the UL transmission. As illustrated in FIG. 29, the UL transmission is scheduled at t4 and the second SRS transmission (e.g., at FH2) is dropped at t3. The UL transmission is not transmitted at t4. The wireless device may not transmit the UL transmission based on being unable to switch to the operating frequency for the UL transmission (e.g., re-tune its RF components). For example, the wireless device may still be operating in the frequency range for FH1 (e.g., outside the (active) uplink BWP), the wireless device may not be able to switch in time between FH1 and the frequency range for the UL transmission (e.g., within/to the (active) uplink BWP).

The wireless device may not know (e.g., be able to determine) when the overlapping SRS transmission is dropped based on/in response to not being able to transmit the (overlapping) UL transmission. This may increase latency and/or decrease reliability in the transmission of the UL signal, along with increasing signaling overhead (e.g., due to re-scheduling of the UL signal or channel and/or SRS frequency hopping).

Embodiments of the present disclosure are related to an approach for resolving these and/or other issues that arise when positioning SRS frequency hopping is implemented and one of the (scheduled) SRS transmissions overlaps with another uplink transmission. These and other features of the present disclosure are described further below.

According to one or more embodiments of the present disclosure, a time (e.g., an uplink symbol) may be determined based on the processing time for the uplink transmission (e.g., which may occur after one or more symbols from receiving a downlink signal (e.g., DCI) scheduling the uplink signal). The processing time may be based on (at least in part) a switching delay of SRS frequency hopping (e.g., a switching time for SRS frequency hopping). The wireless device may transmit the uplink transmission (e.g., PUSCH, PUCCH, PRACH) based on (e.g., in response to, if) a symbol of the uplink transmission (e.g., a starting symbol) occurring no earlier than (e.g., equal to or later than) a last symbol of a the time the downlink signal is received (e.g., a last symbol of a PDCCH (monitoring) occasion).

Figure 30:
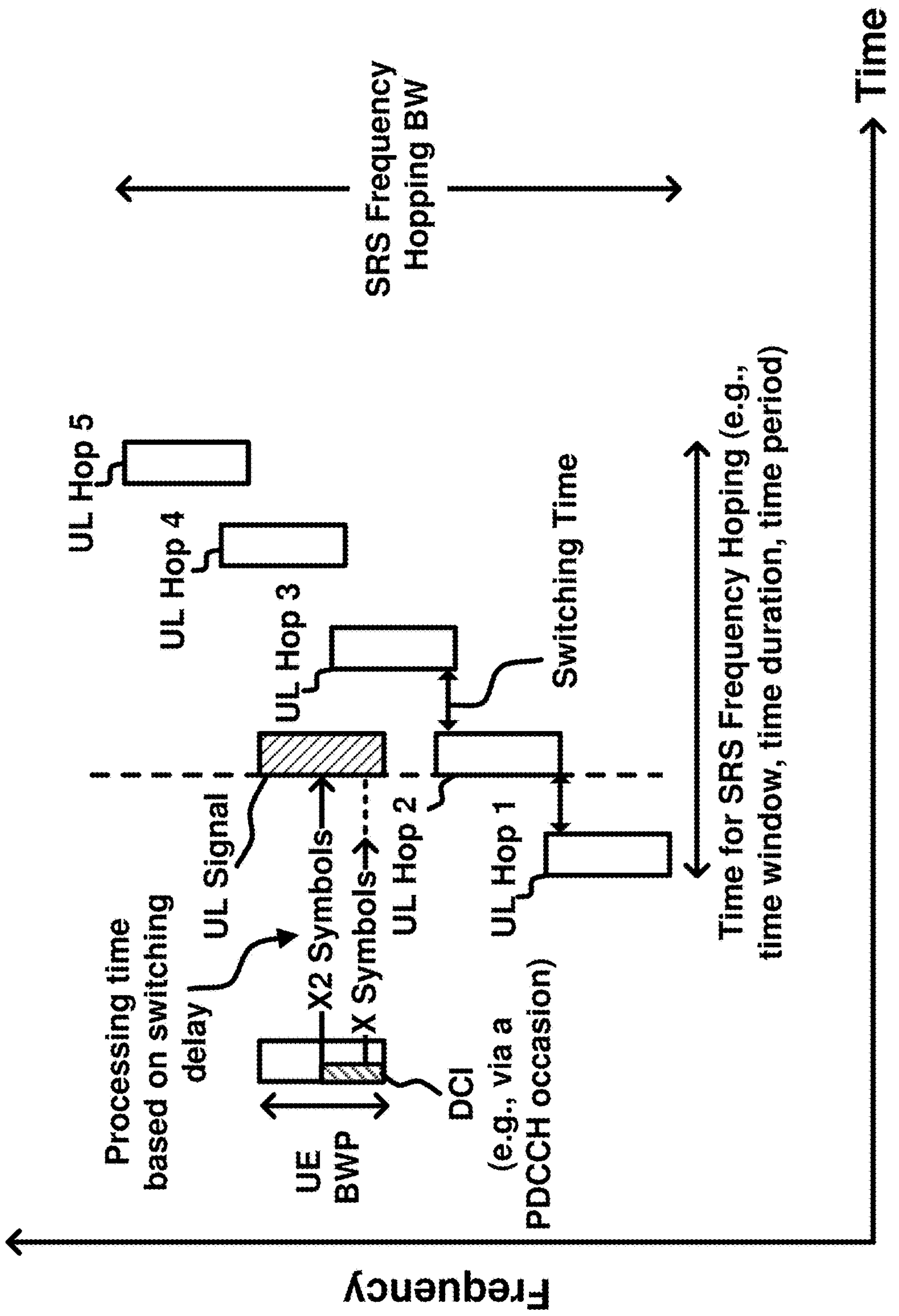
FIG. 30 illustrates an example of a wireless device transmitting an uplink signal as per an aspect of an embodiment of the present disclosure.

By using a processing time for the scheduled uplink transmission that is based on a switching delay of the SRS frequency hopping, one or more embodiments according to the present disclosure may reduce latency and/or increase reliability of transmission of uplink signals when SRS frequency hopping is implemented. For example, the wireless device may reduce the possibility of the uplink transmission not being successfully transmitted (e.g., dropped or not successfully received). Furthermore, signaling overhead may be reduced as signaling for rescheduling may be avoided. In addition, techniques for prioritization of SRS transmissions and other uplink signals, and/or transmission techniques for performing the same, may be maintained without further modification. FIG. 30 illustrates an example embodiment according to the present disclosure in which a wireless device is configured to transmit SRS based on (positioning) SRS frequency hopping. The SRS (e.g., an SRS resource or an SRS sequence) is transmitted over one or more (frequency) hops. As illustrated, the SRS is transmitted over five hops: UL hop 1, UL hop 2, UL hop 3, UL hop 4, and UL hop 5. It should be understood that the present disclosure is not limited to the number of hops illustrated. Each of the hops in FIG. 30 overlaps in frequency and one or more of the hops may be outside of the (active) uplink BWP of the wireless device, as discussed above with respect to FIGS. 28 and 30. It should be understood that the present disclosure is not limited to the case that each hop overlaps in frequency with another hop.

The five hops (e.g., UL hop 2) may comprise one or more SRS symbols (e.g., OFDM symbols. The one or more SRS symbols, per hop, may be indicated by/comprise the SRS resource.

In an example embodiment, a wireless device may receive a downlink signal (e.g., a control signal or a DCI). The downlink signal may schedule an uplink signal (e.g., PUSCH, PUCCH, PRACH). The uplink signal may overlap in time (e.g., in the time domain) with one or more of the hops of the SRS. For example, FIG. 30 illustrates that an uplink signal, scheduled by a DCI, overlaps in time with UL hop 2. As discussed above with respect to FIGS. 28 and 29, the wireless device may drop (e.g., not transmit, delay) the SRS based on (e.g., in response to, when, if) the SRS overlapping with the uplink signal (e.g., the uplink signal may be prioritized over the SRS). The one or more SRS symbol (e.g., per hop) may overlap in time with the uplink signal.

As shown in FIG. 30, a starting (e.g., first and/or initial) symbol of the UL hop 2 (e.g., of the SRS frequency hopping) may overlap with the UL signal. A starting (e.g., first and/or initial) symbol of the UL signal may overlap with the UL hop 2. The DCI may indicate the starting (e.g., first and/or initial) symbol of the UL signal.

A wireless device may receive the downlink signal via (e.g., on) a control channel occasion (e.g., a PDCCH occasion or a PDCCH monitoring occasion) of a control channel (e.g., PDCCH carrying the DCI). The wireless device may transmit the uplink transmission based on (e.g., if, in response to, when) a starting symbol of the (scheduled) uplink transmission occurring no earlier than a processing time after a last symbol of the control channel occasion. The wireless device may determine the processing time based, at least in part, on a switching delay of a sounding reference signal frequency hopping.

For example, FIG. 30 illustrates a DCI received via a PDCCH occasion. A wireless device may determine that an uplink signal (uplink transmission scheduled by the DCI) occurs X symbols after the PDCCH occasion. The number of symbols (e.g., X symbols) may be based on a time for processing the DCI and/or the uplink signal scheduled by the DCI. For example, the processing time may include, or be based on, a preparation time (e.g., a PUSCH preparation time), a time difference between component carriers, a numerology, a priority index, a BWP switching time, and/or an uplink gap time (e.g., for carrier switching). At X symbols after the PDCCH occasion, the wireless device may not be able to transmit the uplink signal. For example, the wireless device may not be able to switch (e.g., re-tune its RF components) to the frequency range for transmission of the uplink signal.

According to embodiments of the present disclosure, the processing time may be (e.g., further) based, at least in part, on a switching delay. The switching delay may be based on the switching time that the wireless device uses to switch between hops of the SRS. FIG. 30 illustrates a processing time based on the switching delay as X2 symbols. The processing time may be determined from (e.g., starting from) the PDCCH occasion via which the DCI scheduling the uplink signal is received. The wireless device may (e.g., successfully) transmit the uplink signal based on a starting symbol of the uplink signal being no earlier than the processing time based on the switching delay.

According to embodiments of the present disclosure, a base station may schedule (e.g., configure or indicate) a wireless device to transmit an uplink symbol with a starting symbol based, at least in part, on the switching delay. The base station may (e.g., successfully) receive the uplink signal based on a starting symbol of the uplink signal being no earlier than the processing time based on the switching delay.

Example embodiments of the present disclosure may provide enhancement for uplink transmission by avoiding dropping of uplink signals. The avoidance of dropping uplink signals may improve the reliability or uplink throughput of a wireless network. The avoidance of dropping uplink signals may decrease the latency of a wireless network.

Figure 31:
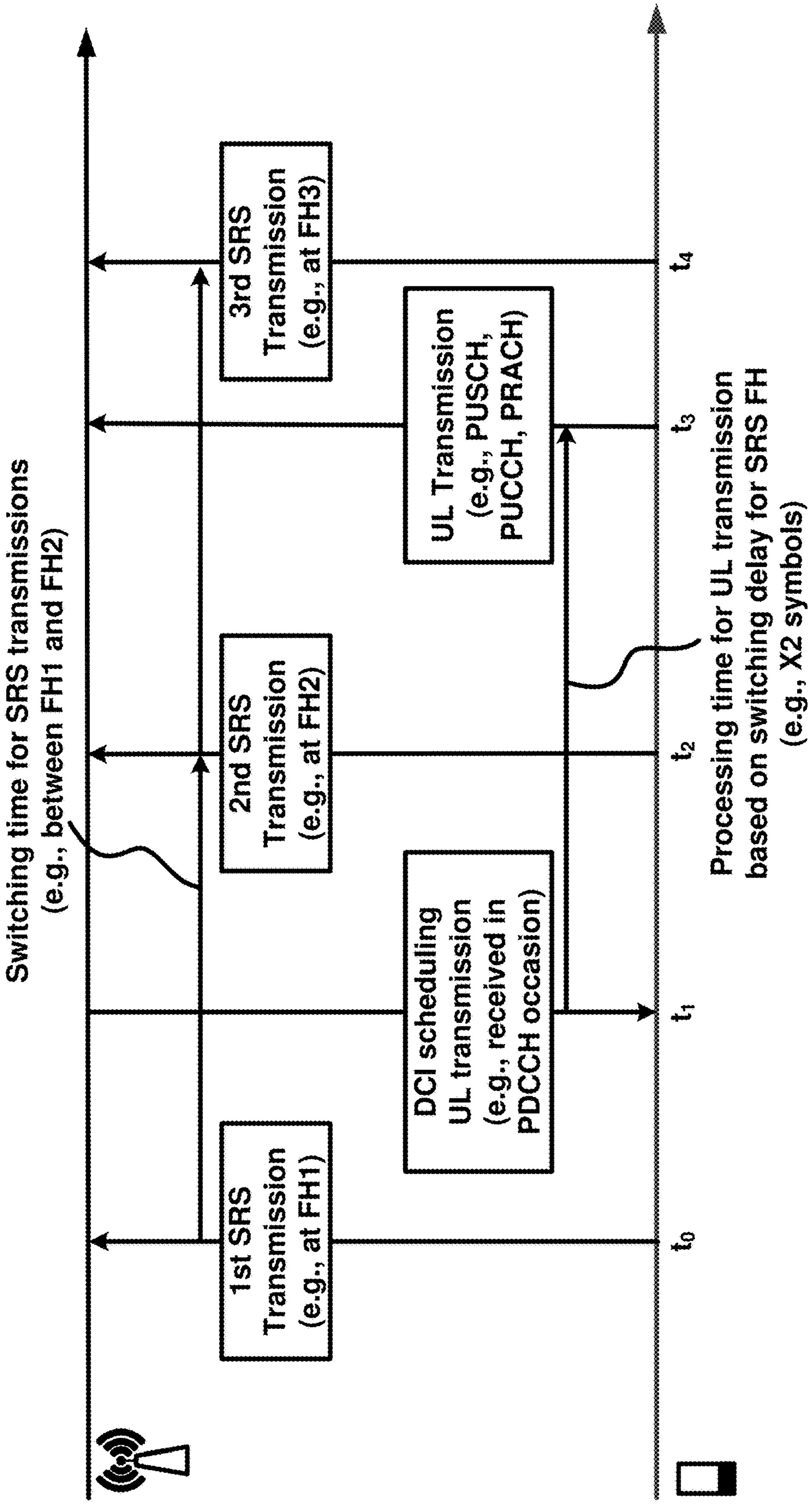
FIG. 31 illustrates an example as per an aspect of an embodiment of the present disclosure.

FIG. 31 illustrates an example embodiment according to the present disclosure in which a wireless device performs SRS frequency hopping. The aspects of FIG. 31 may be implemented using any one of the aspects discussed in FIGS. 28-30.

At t0, the wireless device may transmit a first SRS transmission for SRS frequency hopping. For example, the wireless device may transmit an SRS. The wireless device may transmit a part of the SRS sequence over one or more frequency hops (FH in FIG. 31), as discussed with respect to FIG. 28. As illustrated, the wireless device transmits (e.g., is configured to transmit, is indicated to transmit, and/or is scheduled to transmit) the first SRS transmission over one or more frequency hops. FIG. 31 illustrates an example in which the wireless device transmits the SRS over three frequency hops: FH1, FH2, and FH3.

At t1, the wireless device receives a downlink signal (e.g., a DCI, a PDCCH, a PDCCH carrying a DCI). The wireless device may receive the DCI on a PDCCH occasion (e.g., a PDCCH monitoring occasion, a control channel occasion). The DCI schedules an uplink transmission (e.g., PUSCH, PUCCH, PRACH). The wireless device may be scheduled to transmit a second SRS transmission of the one or more frequency hops at t2. The wireless device may be scheduled to transmit the uplink transmission at t3. The wireless device may be scheduled to transmit a third SRS transmission of the one or more frequency hops at t4.

FIG. 31 illustrates that a switching time for the SRS transmissions may be the time duration between two SRS transmissions of the one or more frequency hops for SRS frequency hopping. For example, the time duration may be a switching time. The switching time may be the time the wireless device uses to re-tune its RF components between the two frequency hops of the one or more frequency hops (e.g., two sequential hops).

FIG. 31 further illustrates that a processing time for the uplink transmission, scheduled by the DCI, is based on, at least in part, a switching delay for SRS frequency hopping. In FIG. 31, the wireless device (successfully) transmits the uplink transmission at t3, and a starting symbol of the uplink transmission is no earlier than the processing time for the uplink transmission based on the switching delay for SRS frequency hopping. The processing time may be based on a number of symbols (e.g., OFDM symbols) or an absolute time (e.g., 70 μs or 140 μs). FIG. 31 illustrates that the processing time is X2 symbols, as discussed with respect to FIG. 30.

In an example, the third SRS transmission at t4 may overlap in time with the uplink transmission at t3. The third SRS transmission may occur in a different frequency range than the uplink transmission. The wireless device may drop the third SRS transmission based on the third SRS transmission overlapping in time with the uplink transmission. By using the processing time based on the switching delay for SRS frequency hopping, the wireless device may (successfully) transmit the uplink transmission at t3 and/or the base station may (successfully) receive the uplink transmission. This may be due to the wireless device being provided with additional time to re-tune its RF components from operation at FH2 to the (active) uplink BWP of the wireless device (and/or the frequency resources for the uplink transmission).

Although FIG. 31 illustrates three SRS transmissions for SRS frequency hopping, it should be understood that the present disclosure is not limited to this example. Similarly, while an example is provided in which the third SRS transmission in FIG. 31 overlaps in time with the uplink transmission at t3, the present disclosure is not particularly limited to this scenario. For example, the processing time may be based on the switching delay for SRS frequency hopping regardless of the overlap. In an example, the processing time may be based on the switching delay for SRS frequency hopping in response to (e.g., if) the wireless device is configured with SRS frequency hopping. In another example based on FIGS. 30 and 31, the switching delay may be based on an overlap occurring between one or more SRS transmissions of SRS frequency hopping. For example, the processing time may be based on the switching delay for SRS frequency hopping in response to the overlap. Similarly, while an example is provided FIG. 31 in which the DCI arrives at t1, the present disclosure is not particularly limited to this order. For example, the DCI may be received before t1 or after t1.

Figure 32:
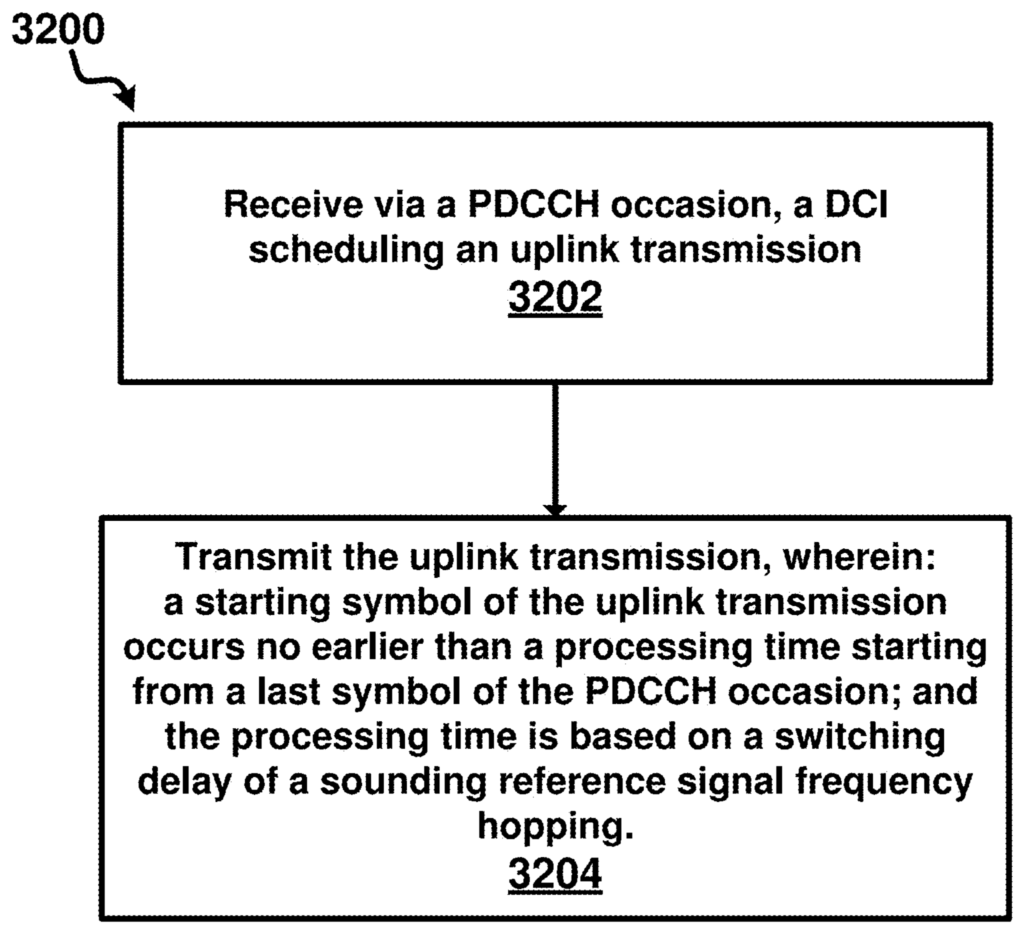
FIG. 32 illustrates an example flow diagram as per an aspect of an embodiment of the present disclosure.

FIG. 32 illustrates an example of a flow diagram as per an aspect of an embodiment of the present disclosure. The aspects of FIG. 32 may be combined with any one of the aspects in FIGS. 28-31. In an example embodiment, the method 3200 may include, at 3202, receiving by a wireless device via a PDCCH occasion, a DCI scheduling an uplink transmission. A base station may transmit, via a PDCCH occasion, a DCI scheduling an uplink transmission. At 3204, method 3200 may include transmitting the uplink transmission, wherein a starting symbol of the uplink transmission occurs no earlier than a processing time starting from a last symbol of the PDCCH occasion. The base station may receive the uplink transmission. The processing time may be based on a switching delay of a sounding reference signal frequency hopping. For example, the processing time may be determined as a time duration plus the switching delay of a sounding reference signal frequency hopping. As another example, the processing time may be determined as the maximum of a time duration plus the switching delay of a sounding reference signal frequency hopping and a constant value. The base station may determine the starting symbol of the uplink transmission based on the processing time.

Additionally or alternatively, the wireless device of method 3200 in an example embodiment may further transmit (or send) a message to the network (e.g., a base station) indicating (or reporting) a switching delay of a sounding reference signal frequency hopping. The message, for example, may comprise a UE capability message or an RRC message or an LPP message. The wireless device may transmit the message prior to receiving the DCI at 3202 in FIG. 32. A base station may receive the message from the wireless device.

Additionally or alternatively, the wireless device of method 3200 in an example embodiment may further receive one or more configuration parameters for the SRS frequency hopping. The one or more configuration messages may comprise one or more parameters discussed with respect to FIG. 29. The one or more configuration parameters may comprise one or more SRS configuration parameters for SRS frequency hopping. The one or more SRS configuration parameters may comprise one or more SRS resources. A base station may transmit to the wireless device the one or more configuration parameters for the SRS frequency hopping.

Additionally or alternatively, the wireless device of method 3200 may use the processing time with the switching delay based on the one or more configuration parameters comprising one or more SRS configuration parameters for SRS frequency hopping. The base station may use the processing time with the switching delay to receive the uplink signal in response to transmitting, to the wireless device, the one or more SRS configuration parameters for SRS frequency hopping. For example, in an aspect, the base station may receive another uplink signal, from another wireless device, not based on the switching delay (e.g., in response to not transmitting, to the wireless device, the one or more SRS configuration parameters for SRS frequency hopping). The base station may increase reliability of transmissions (e.g., for wireless devices performing SRS frequency hopping) without causing additional latency for other wireless devices (e.g., for wireless devices not performing SRS frequency hopping) by using the configuration parameters for the wireless device to indicate when the processing time includes, or does not include, the switching delay.

Additionally or alternatively, the wireless device of method 3200 in an example embodiment may further determine an uplink symbol. The uplink symbol may be the earliest symbol that the wireless device can transmit an uplink signal.

Additionally or alternatively, the wireless device of method 3200 in an example embodiment may further determine the processing time. The wireless device may use the processing time to calculate the uplink symbol. The determination may be between receiving the DCI at 3202 and transmitting the uplink transmission at 3204. The base station may calculate the processing time and determine when to schedule the uplink transmission, for the wireless device, based on the processing time.

Additionally or alternatively, the uplink transmission of method 3200 in an example embodiment may overlap in time with an SRS resource of the one or more SRS resources configured for the SRS frequency hopping. The overlap in time may be at least one symbol.

Additionally or alternatively, the processing time of method 3200 may be based on the switching delay of the SRS frequency hopping in response to the uplink transmission overlapping in time with the SRS resource.

Additionally or alternatively, the processing time of method 3200 may be based on the switching delay of the SRS frequency hopping in response to the wireless device receiving one or more configuration parameters for SRS frequency hopping.

Additionally or alternatively, the uplink transmission of method 3200 overlaps with an SRS resource of the one or more SRS resources configured for the SRS frequency hopping in response to the SRS resource being triggered (or activated) via a control command (e.g., MAC CE or DCI). The control command may comprise one or more fields. The one or more fields may be or comprise an SRS resource index (or identifier) indicating the SRS resource among the one or more SRS resources, an SRS resource set index (or identifier) indicating the SRS resource among the one or more SRS resources, a slot offset, and/or a symbol offset. A base station may transmit the control command which triggers (or activates) the SRS resource.

Additionally or alternatively, the uplink transmission of method 3200 may be a PUSCH, a PUCCH, or a PRACH. The processing time of method 3200 may be a PUSCH processing time, a PUCCH processing time, a PUSCH preparation time, a PDSCH processing time, or a PRACH processing time. The uplink transmission may be a PUCCH that comprises hybrid automatic repeat request acknowledgment information for a physical downlink shared channel.

Additionally or alternatively, the processing time of method 3200 may be based on the switching delay of the SRS frequency hopping in response to the control command activating the SRS frequency hopping.

Additionally or alternatively, the wireless device of method 3200 in an example embodiment may further receive a control command (e.g., a DCI, MAC CE, or RRC message) triggering (or activating or indicating) an uplink switching gap. A base station may transmit the control command triggering (or activating or indicating) an uplink switching gap.

Additionally or alternatively, the processing time of method 3200 may be further based on a switching delay of the uplink switching gap. The processing time may be determined as a maximum value of the switching delay of the SRS frequency hopping and the switching delay of the uplink switching gap.

Figure 33:
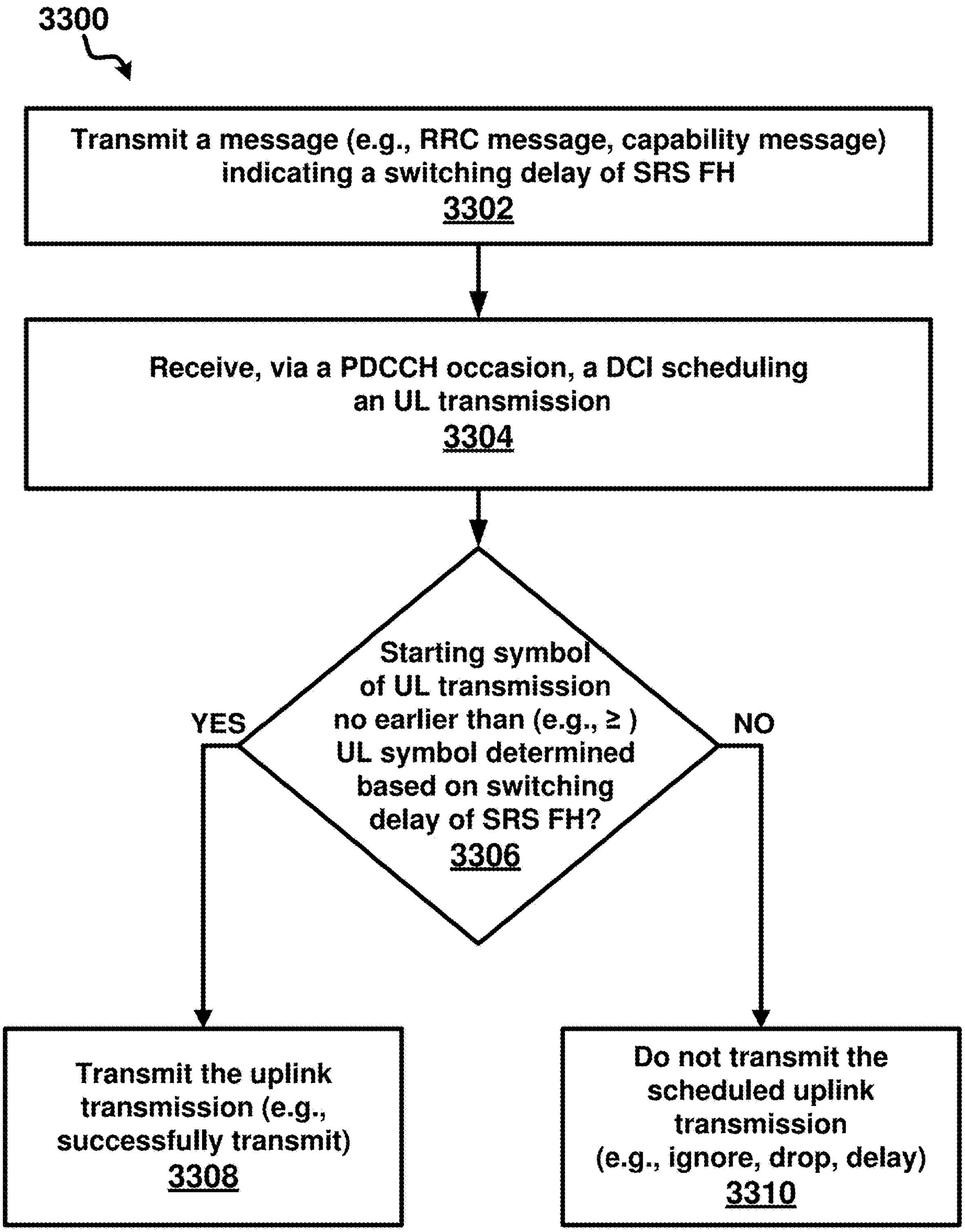
FIG. 33 illustrates an example flow diagram as per an aspect of an embodiment of the present disclosure.

FIG. 33 illustrates an example of a method 3300 in which a wireless device is scheduled to transmit an uplink signal as per an aspect of an embodiment of the present disclosure. At 3302, the wireless device transmits a message indicating a switching delay of SRS frequency hopping. The message may indicate a capability of the wireless device. The message may be an RRC message, an LPP message, or a UE capability message. The message may indicate that the wireless device is a reduced capability wireless device (e.g., a RedCap UE). The message may enable the network (e.g., a base station, a gNB) to continue scheduling other wireless devices (e.g., devices not configured for SRS frequency hopping) to perform uplink transmissions without accounting for additional processing time. A base station may receive the message.

At 3304, the wireless device receives a DCI that schedules an uplink signal X2 symbols after a last symbol of the PDCCH carrying the DCI (e.g., a last symbol of a PDCCH occasion via which the DCI is received). At 3306, the wireless device may determine whether X2 is no earlier than (e.g., equal to or larger than) an uplink symbol. The uplink symbol may be determined based on a processing time. The processing time may be based on the switching delay of SRS frequency hopping, as discussed above with respect to FIGS. 30-32. A base station may transmit the PDCCH carrying the DCI.

Additionally or alternatively, the wireless device of method 3300 may use the processing time based on the switching delay in response to transmitting the message at 3302. The base station may schedule the uplink signal based on the switching delay in response to the wireless device transmitting the message at 3302. For example, in another aspect, the base station may schedule and receive another uplink signal, from another wireless device, not based on the switching delay (e.g., in response to not receiving the message, in response to the wireless device being a full-capability wireless). By using the message and/or capability of the wireless device to (selectively) determine when the processing time includes, or does not include, the switching delay, the base station may increase reliability of transmissions (e.g., by reduced-capability wireless devices) without causing additional latency for other wireless devices (e.g., full-capability wireless devices).

Additionally or alternatively, the processing time in an example may be determined by calculating a first time duration and adding a second time duration. The first time duration may be a processing time for the uplink transmission. The second time duration may be based on a switching delay of an SRS frequency hopping. As an example, the first time duration may be determined based on the numerology and/or capabilities (e.g., UE capabilities) of the wireless device.

The processing time may be, for example, a PUSCH processing time, a PDSCH processing time, a PRACH processing time, a PUSCH preparation time, a PDSCH preparation time, or a PRACH preparation time.

FIG. 33 illustrates that, at 3308, the wireless device of method 3300 transmits the uplink transmission based on (e.g., if, in response to, when) the starting symbol is no earlier than an uplink symbol determined based on the switching delay of SRS frequency hopping. A base station may receive the uplink transmission. Additionally or alternatively, at 3310, the wireless device of method 3300 does not transmit the (scheduled) uplink transmission based on (e.g., if, in response to, when) the starting symbol being earlier than the uplink symbol determined based on the switching delay of SRS frequency hopping. By not transmitting the (scheduled) uplink transmission at 3310, the wireless device may ignore, skip, drop, and/or delay the uplink transmission. Similarly, a base station may not receive the uplink transmission.

Additionally or alternatively, in an example, the scheduled uplink signal may overlap (or collide) with the SRS frequency hopping (e.g., with an SRS frequency hopping occasion). For example, the scheduled uplink signal may overlap in time with the SRS frequency hopping (e.g., overlap in the time between which an SRS frequency hopping occasion begins and ends). The scheduled uplink signal may overlap in time and not in frequency with the SRS frequency hopping. An SRS frequency hopping occasion may begin at the time the UE starts switching the radio frequency components to transmit the SRS. An SRS frequency hopping occasion may end at the time the UE returns the radio frequency components to the active BWP after transmitting all hops of the SRS frequency hopping. As another example, the scheduled uplink signal may overlap in time with an SRS resource of the SRS frequency hopping. As another example, the scheduled uplink signal may overlap in time with at least one symbol (e.g., OFDM symbol) of an SRS resource of the SRS frequency hopping. As another example, the scheduled uplink signal may be considered overlapping in time with the SRS frequency hopping when at least one symbol (e.g., OFDM symbol) of the scheduled uplink signal occurs within a time duration of at least one symbol of an SRS resource of the SRS frequency hopping. For example, the scheduled uplink signal may be scheduled in symbols 7, 8, 9, and 10 of a particular slot while the SRS resource (of the SRS frequency hopping) may be scheduled in symbols 11 and 12 of the same slot. If the time duration is, for example, 2 symbols, the scheduled uplink signal and the SRS resource may be considered overlapping in time.

Additionally or alternatively, in an example, the SRS resource of the SRS frequency hopping may be periodic, semi-persistent, or aperiodic. The SRS resource may be configured outside of an active BWP. The SRS resource may be configured within a single carrier.

Additionally or alternatively, in an example, the wireless device of method 3300 may drop, ignore, or skip one or more symbols of the SRS resource in response to transmitting the uplink signal.

Additionally or alternatively, in an example, the wireless device of method 3300 may receive via a second PDCCH monitoring occasion, a second DCI scheduling a second uplink transmission that does not overlap in time with an SRS resource of the one or more SRS resources. The wireless device may determine a second uplink symbol that occurs after a second processing time starting from a last symbol of the second PDCCH monitoring occasion. The second processing time may not be based on the switching delay of the SRS frequency hopping. The wireless device may transmit the second uplink transmission in response to the second uplink transmission being no earlier than the second uplink transmission. The wireless device transmitting the second uplink transmission may improve the uplink throughput and decrease the latency. A base station may transmit, via the second PDCCH monitor occasion, the second DCI scheduling the second uplink transmission.

Additionally or alternatively, in an example, the wireless device of method 3300 may receive via a second PDCCH monitoring occasion, and before (or prior to) receiving a control command indication activation of the SRS frequency hopping, a second DCI scheduling a second uplink transmission. The wireless device may determine a second uplink symbol that occurs after a second processing time starting from a last symbol of the second PDCCH monitoring occasion. The second processing time may not be based on the switching delay of the SRS frequency hopping. The wireless device may transmit the second uplink transmission in response to the second uplink transmission being no earlier than the second uplink transmission.

Additionally or alternatively, in an example, the wireless device of method 3300 may set the second processing time to zero based on the second processing time not being based on the switching delay of the SRS frequency hopping. The wireless device may be able to determine that an earlier symbol is available for the uplink transmission based on the second processing time being set to zero (e.g., the wireless device may experience a decreased latency).

Although FIG. 33 illustrates a message indicating a switching delay of the wireless device for SRS frequency hopping, the present disclosure is not particularly limited to this example. In this example in which the message is sent, the determination at 3306 may be based on transmitting the message at 3302. For example, a processing time used to determine the uplink symbol may be based on the switching delay in response to the message at 33022 being transmitted.

In the present disclosure, indicating a switching delay may refer to a field in a message that defines a switching delay, a field in a message that configures a switching delay, a bit in a message that defines a location in table that defines a switching delay, bits in a message that define a location in a table that defines a switching delay, or bits that represent a number of symbols which define the switching delay. As an example, a wireless device may transmit a message to the base station (e.g., via RRC) indicating a switching delay.

In the present disclosure, switching delay of an SRS frequency hopping may refer to a minimum time duration between two hops of an SRS frequency hopping, a minimum time length between two hops of an SRS frequency hopping, a shortest time length between two hops of an SRS frequency hopping, a smallest time length between two hops of an SRS frequency hopping, a minimum number of OFDM symbols between two hops of an SRS frequency hopping, a radio frequency switching time between two hops of an SRS frequency hopping, a minimum time gap prior to one hop of an SRS frequency hopping, or a minimum time gap after one hop of an SRS frequency hopping.

In the present disclosure, SRS frequency hopping may refer to positioning SRS frequency hopping, SRS for positioning frequency hopping, frequency hopping SRS for positioning, frequency hopping SRS, SRS frequency hopping for positioning, or positioning SRS configured for frequency hopping.

In the present disclosure, PDCCH occasion may refer to a set of configured symbols for receiving the PDCCH, a PDCCH reception occasion, or a PDCCH monitoring occasion.

In the present disclosure, scheduling an uplink transmission may refer to indicating an uplink transmission, providing an uplink transmission grant, or configuring an uplink transmission.

In the present disclosure, configuration parameters may refer to RRC configuration parameters, RRC reconfiguration parameters, LPP parameters, or MAC-CE parameters.

In the present disclosure, indicating activation may refer to triggering or triggering activation.

In the present disclosure, ignoring may refer to dropping, skipping, not transmitting, or delaying.

In the present disclosure, an uplink switching gap may refer to an SRS carrier switching gap or an SRS antenna switching gap.

In an example embodiment according to the present disclosure in combination with, or in alternative to, any of the aspects of FIGS. 28-33, if the first uplink symbol in a PUSCH allocation for a transport block, including the DM-RS, as defined by a slot offset (e.g., K2 and Koffset), if configured, and a start S and length L of the PUSCH allocation indicated by a field (e.g., 'Time domain resource assignment') of a scheduling DCI and including the effect of the timing advance, is no earlier than at symbol L2, the UE shall transmit the transport block. L2 may be defined as the next uplink symbol with its CP starting $$T_{proc,2} = \max((N_2 + d_{2,1} + d_2)(2048 + 144)\cdot\kappa 2^{-\mu}\cdot T_C + T_{ext} + T_{switch} + T_{RF,switch},\ d_{2,2})$$

after an end of a reception of a last symbol of the PDCCH carrying the DCI scheduling the PUSCH. When the PDCCH reception includes two PDCCH candidates from two respective search space sets, for the purpose of determining the last symbol of the PDCCH carrying the DCI scheduling the PUSCH, the PDCCH candidate that ends later in time may be used.

N2 is based on u and UE PUSCH processing capability 1 and 2, where μ corresponds to the one of (μDL, μUL) resulting with the largest $T_{proc,2}$, where the μDL corresponds to the subcarrier spacing of the downlink with which the PDCCH carrying the DCI scheduling the PUSCH was transmitted and μUL corresponds to the subcarrier spacing of the uplink channel with which the PUSCH is to be transmitted, and κ is a constant value. For example, κ may be equal to 64.

For operation with shared spectrum channel access in FR1, $T_{ext}$ is calculated according to a rule based on at least the cyclic prefix, otherwise $T_{ext}$=0.

If the first symbol of the PUSCH allocation consists of DM-RS only, then $d_{2,1}$=0, otherwise $d_{2,1}$=1.

If the UE is configured with multiple active component carriers, the first uplink symbol in the PUSCH allocation further includes the effect of timing difference between component carriers.

If the scheduling DCI triggered a switch of BWP, $d_{2,2}$ equals to the switching time of BWP switching, otherwise $d_{2,2}$=0.

If a PUSCH of a larger priority index would overlap with PUCCH of a smaller priority index and the UE is not provided a parameter for multiplexing with different priorities (e.g., uci-MuxWithDiffPrio) for the primary PUCCH group or a parameter for multiplexing with different priorities (e.g., uci-MuxWithDiffPrioSecondaryPUCCHgroup) for the secondary PUCCH group, $d_2$ for the PUSCH of a larger priority is set as reported by the UE; otherwise $d_2$=0.

For a UE that supports capability 2 on a given cell, the processing time according to UE processing capability 2 is applied if the high layer parameter for processing type 2 being enabled (e.g., processingType2Enabled) in the PUSCH configuration of a serving cell (e.g., PUSCH-ServingCellConfig) is configured for the cell and set to 'enable'.

If the PUSCH indicated by the DCI is overlapping with one or more PUCCH channels, then the transport block is multiplexed, otherwise the transport block is transmitted on the PUSCH indicated by the DCI.

If a uplink switching gap is triggered, $T_{switch}$ equals to the switching gap duration and for the UE configured with a higher layer parameter for UL transmit switching options (e.g. uplinkTxSwitchingOption) set to 'dualUL' for uplink carrier aggregation $\mu_{UL}$=min ($\mu_{UL,carrier1}$, $\mu_{UL,carrier2}$), otherwise $T_{switch}$=0).

If SRS frequency hopping is configured and activated $T_{RF,switch}$ equals to the switching time reported by a higher layer parameter for SRS frequency hopping switching delay (e.g., SRSfreqHoppingRFSwitching or RRC parameter). For example, the higher layer parameter may indicate a UE capability for a switching delay of SRS frequency hopping. If SRS frequency hopping is not configured and activated $T_{RF,switch}$ may be equal to zero.

In an example embodiment according to the present disclosure in combination with, or in alternative to, any of the aspects of FIGS. 28-33, a UE is not expected to be scheduled to transmit PUCCH carrying HARQ-ACK information for PDSCH scheduled by a PDCCH if positioning SRS frequency hopping is configured, and triggered, and a first symbol of PUCCH starts earlier than $T_{RF,switch}$ plus a processing time (e.g., PUCCH preparation time) from the last symbol of the PDCCH, where $T_{RF,switch}$ is equal to the value reported in a higher layer parameter for SRS frequency hopping switching delay (e.g., SRSfreqHoppingRFSwitching).

In an example embodiment according to the present disclosure in combination with, or in alternative to, any of the aspects of FIGS. 28-33, if a random access procedure is initiated by a PDCCH order, a UE, if requested by higher layers, transmits a PRACH in the selected PRACH occasion for which a time between the last symbol of the PDCCH order reception and the first symbol of the PRACH transmission is larger than or equal to $N_{T,2}+\Delta_{BWPSwitching}+\Delta_{Delay}+T_{switch}+T_{RF,switch}$ msec, where $N_{T,2}$ is a time duration of $N_2$ symbols corresponding to a PUSCH preparation time for UE processing capability 1 assuming u corresponds to the smallest SCS configuration between the SCS configuration of the PDCCH order and the SCS configuration of the corresponding PRACH transmission.

$\Delta_{BWPSwitching}$=0 if the active UL BWP does not change and $\Delta_{BWPSwitching}$ is the defined BWP switching times otherwise.

$\Delta_{Delay}$=0.5 msec for FR1 and $\Delta_{Delay}$=0.25 msec for FR2.

$T_{switch}$ is a switching gap duration for an uplink switching gap.

$T_{RF,switch}$ is the switching time for positioning SRS frequency hopping.

In the present disclosure, it should be understood that any discussion of operations from the perspective of wireless device may also be applied to a base station. Reciprocal operations may not be stated explicitly for each and every operation, although it is implied and a part of the present disclosure. For example, when the present disclosure describes one or more embodiments in which a transmitter device (e.g., a wireless device or a base station) transmits a signal starting from a symbol and/or determines a starting symbol for the signal, a receiver device (e.g., a wireless device or a base station) receives the signal starting from the symbol and/or determines the starting symbol for the symbol. Reciprocal determinations and/or timer operations may occur to ensure alignment between operations of the transmitter device and receiver device. Furthermore, as an example of reciprocal operations, a wireless device may determine a time to transmit a signal based on a grant and a base station may determine the time to receive the signal and/or determine the time to schedule the signal for the wireless device to transmit via the grant. Similarly, as another reciprocal operation, if a receiver device (e.g., a wireless device or a base station) monitors for a signal or monitors a channel, a transmitter device (e.g., a wireless device or a base station) transmits the signal or transmits the channel.

What is claimed is:

1. A method comprising:

transmitting, by a wireless device, a user equipment (UE) capability message indicating a switching time for a sounding reference signal (SRS) frequency hopping;

receiving one or more configuration parameters indicating one or more SRS resources for the SRS frequency hopping, wherein the SRS frequency hopping is configured within a carrier;

receiving, via a physical downlink control channel (PDCCH) monitoring occasion, a downlink control information (DCI) scheduling an uplink transmission;

transmitting the uplink transmission; and dropping an SRS transmission, on one or more SRS symbols of the one or more SRS resources, based on:

a time interval from a last symbol of the PDCCH monitoring occasion, wherein the time interval is at least a preparation time for the uplink transmission plus the switching time for the SRS frequency hopping; and an overlap between the uplink transmission and the one or more SRS symbols.

2. The method of claim 1, wherein the transmitting the uplink transmission is based on a starting symbol of the uplink transmission being no earlier than the time interval from the last symbol of the PDCCH monitoring occasion.

3. The method of claim 1, further comprising:

receiving, via a second PDCCH monitoring occasion, a second DCI scheduling a second uplink transmission; and dropping the second uplink transmission based on a starting symbol of the second uplink transmission being within the time interval from a last symbol of the second PDCCH monitoring occasion.

4. The method of claim 1, wherein the one or more configuration parameters are separate from a bandwidth part configuration.

5. The method of claim 1, wherein at least one of the one or more SRS resources is configured outside an active bandwidth part of the wireless device.

6. The method of claim 1, wherein the wireless device is a reduced capability device.

7. The method of claim 1, wherein the time interval is between the last symbol of the PDCCH monitoring occasion and a starting symbol of the SRS transmission.

8. A wireless device comprising:

one or more processors; and memory storing instructions that, when executed by the one or more processors, cause the wireless device to:

transmit a user equipment (UE) capability message indicating a switching time for a sounding reference signal (SRS) frequency hopping;

receive one or more configuration parameters indicating one or more SRS resources for the SRS frequency hopping, wherein the SRS frequency hopping is configured within a carrier;

receive, via a physical downlink control channel (PDCCH) monitoring occasion, a downlink control information (DCI) scheduling an uplink transmission;

transmit the uplink transmission; and drop an SRS transmission, on one or more SRS symbols of the one or more SRS resources, based on:

a time interval from a last symbol of the PDCCH monitoring occasion, wherein the time interval is at least a preparation time for the uplink transmission plus the switching time for the SRS frequency hopping; and an overlap between the uplink transmission and the one or more SRS symbols.

9. The wireless device of claim 8, wherein transmitting the uplink transmission is based on a starting symbol of the uplink transmission being no earlier than the time interval from the last symbol of the PDCCH monitoring occasion.

10. The wireless device of claim 8, wherein the instructions further cause the wireless device to:

receive, via a second PDCCH monitoring occasion, a second DCI scheduling a second uplink transmission; and drop the second uplink transmission based on a starting symbol of the second uplink transmission being within the time interval from a last symbol of the second PDCCH monitoring occasion.

11. The wireless device of claim 8, wherein the one or more configuration parameters are separate from a bandwidth part configuration.

12. The wireless device of claim 8, wherein at least one of the one or more SRS resources is configured outside an active bandwidth part of the wireless device.

13. The wireless device of claim 8, wherein the wireless device is a reduced capability device.

14. The wireless device of claim 8, wherein the time interval is between the last symbol of the PDCCH monitoring occasion and a starting symbol of the SRS transmission.

15. A non-transitory computer-readable medium comprising instructions that, when executed by one or more processors of a wireless device, cause the wireless device to:

transmit a user equipment (UE) capability message indicating a switching time for a sounding reference signal (SRS) frequency hopping;

receive one or more configuration parameters indicating one or more SRS resources for the SRS frequency hopping, wherein the SRS frequency hopping is configured within a carrier;

receive, via a physical downlink control channel (PDCCH) monitoring occasion, a downlink control information (DCI) scheduling an uplink transmission;

transmit the uplink transmission; and drop an SRS transmission, on one or more SRS symbols of the one or more SRS resources, based on:

a time interval from a last symbol of the PDCCH monitoring occasion, wherein the time interval is at least a preparation time for the uplink transmission plus the switching time for the SRS frequency hopping; and an overlap between the uplink transmission and the one or more SRS symbols.

16. The non-transitory computer-readable medium of claim 15, wherein transmitting the uplink transmission is based on a starting symbol of the uplink transmission being no earlier than the time interval from a last symbol of the PDCCH monitoring occasion.

17. The non-transitory computer-readable medium of claim 15, wherein the instructions further cause the wireless device to:

receive, via a second PDCCH monitoring occasion, a second DCI scheduling a second uplink transmission; and drop the second uplink transmission based on a starting symbol of the second uplink transmission being within the time interval from the last symbol of the second PDCCH monitoring occasion.

18. The non-transitory computer-readable medium of claim 15, wherein the one or more configuration parameters are separate from a bandwidth part configuration.

19. The non-transitory computer-readable medium of claim 15, wherein at least one of the one or more SRS resources is configured outside an active bandwidth part of the wireless device.

20. The non-transitory computer-readable medium of claim 15, wherein the time interval is between the last symbol of the PDCCH monitoring occasion and a starting symbol of the SRS transmission.

* * * * *